(12) United States Patent
Kamada

(10) Patent No.: US 10,523,843 B2
(45) Date of Patent: Dec. 31, 2019

(54) IMAGE PROCESSING APPARATUS, IMAGE PROCESSING METHOD, AND NON-TRANSITORY COMPUTER-READABLE STORAGE MEDIUM

(71) Applicant: RICOH COMPANY, LTD., Tokyo (JP)

(72) Inventor: Takuji Kamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/153,919

(22) Filed: Oct. 8, 2018

(65) Prior Publication Data
US 2019/0149695 A1    May 16, 2019

(30) Foreign Application Priority Data

Nov. 14, 2017    (JP) ................................. 2017-219147

(51) Int. Cl.
*H04N 1/40*    (2006.01)
*H04N 1/58*    (2006.01)
(Continued)

(52) U.S. Cl.
CPC ..... *H04N 1/40062* (2013.01); *G06K 9/00456* (2013.01); *H04N 1/4092* (2013.01); *H04N 1/58* (2013.01)

(58) Field of Classification Search
CPC ..... G09G 2300/0408; G09G 2310/027; G09G 2330/021; G09G 2340/02; G09G 2340/0428; G09G 2360/18; G09G 3/2051; G09G 3/3688; G09G 5/006; G09G 5/02; H04N 19/184; H04N 19/426; H04N 19/59;
(Continued)

(56) References Cited

U.S. PATENT DOCUMENTS 5,148,495 A    9/1992  Imao et al.
7,912,291 B2*  3/2011  Berkner .............. G06F 16/5838
                                                     382/190
(Continued)

FOREIGN PATENT DOCUMENTS

JP    4-035167       2/1992
JP    2005-301672    10/2005
(Continued)

*Primary Examiner* — Negussie Worku
(74) *Attorney, Agent, or Firm* — Xsensus LLP

(57) ABSTRACT

An image processing apparatus includes circuitry. The circuitry irreversibly compresses an input image to generate an irreversibly compressed image. The circuitry decompresses the irreversibly compressed image to generate a decompressed image. The circuitry corrects a surround of a target area in the decompressed image to generate a corrected image. The target area corresponds to a line drawing image included in the input image. The circuitry generates first to third image layers from the corrected image. The first image layer is a binary image including a line drawing alone. The second image layer includes a line drawing area. The third image layer includes a background area. The circuitry reversibly compresses the first image layer and irreversibly compress the second and third image layers. The circuitry generates an output file based on the first to third image layers compressed.

19 Claims, 41 Drawing Sheets

(51) Int. Cl.
*G06K 9/00* (2006.01)
*H04N 1/409* (2006.01)

(58) Field of Classification Search
CPC ............... H04N 1/00095; H04N 1/413; H04N 2201/0094
USPC .......... 382/232; 375/E7.095, E7.184, E7.248
See application file for complete search history.

(56) References Cited

U.S. PATENT DOCUMENTS

| | | | |
|---|---|---|---|
| 9,596,380 B1* | 3/2017 | Gopalakrishnan | H04N 1/413 |
| 2004/0252891 A1* | 12/2004 | Sasaki | G09G 3/3688 |
| | | | 382/232 |
| 2005/0180645 A1 | 8/2005 | Hasegawa et al. | |
| 2011/0033124 A1* | 2/2011 | Kuno | H04N 1/32256 |
| | | | 382/233 |
| 2014/0092442 A1* | 4/2014 | Ooyanagi | H04N 1/4105 |
| | | | 358/3.06 |
| 2017/0054873 A1* | 2/2017 | Ouchi | H04N 1/411 |
| 2017/0134607 A1* | 5/2017 | Nakayama | H04N 1/32149 |
| 2017/0270359 A1* | 9/2017 | Ouchi | G06K 9/00463 |
| 2017/0272613 A1* | 9/2017 | Kamada | H04N 1/6027 |
| 2018/0210327 A1* | 7/2018 | Miyagi | H04N 9/31 |
| 2018/0211106 A1* | 7/2018 | Kamada | G06K 9/00449 |

FOREIGN PATENT DOCUMENTS

| | | |
|---|---|---|
| JP | 2006-197178 | 7/2006 |
| JP | 2010-273121 | 12/2010 |
| JP | 2010-278535 | 12/2010 |
| JP | 2016-119528 | 6/2016 |
| JP | 2017-117331 | 6/2017 |
| JP | 2017-118433 | 6/2017 |
| JP | 2017-175213 | 9/2017 |

* cited by examiner

TEXT ON SOLID BACKGROUND

AFTER LOSSY COMPRESSION
AND DECOMPRESSION

INPUT IMAGE $Im_0$

INPUT IMAGE Im₀

DECOMPRESSED INPUT IMAGE Im₀ₐ

INPUT IMAGE Im$_0$

DECOMPRESSED INPUT IMAGE Im$_{0A}$

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application No. 2017-219147, filed on Nov. 14, 2017, in the Japan Patent Office, the entire disclosure of which is hereby incorporated by reference herein.

BACKGROUND

Technical Field

Embodiments of the present disclosure relate to an image processing apparatus, an image processing method, and a non-transitory computer-readable storage medium.

Related Art

There are various methods for efficiently compressing images. For example, in Portable Document Format (PDF), compression methods are determined for line drawings such as text and for photographic images to reduce data amount. High compression PDF is known as a technique of increasing the compressibility of PDF while improving the image quality. In the high compression PDF, compression processes are performed on a text image layer and a design image layer generated by image area separation of an original image, according to the respective characteristics. The text image layer includes a text or line drawing image. The design image layer includes a design image. For example, lossless compression is applied to the text image layer by a Modified Modified READ (MMR; READ is Relative Element Address Designate codes) method while lossy compression is applied to the design image layer by a Joint Photographic Experts Group (JPEG) method.

SUMMARY

In one embodiment of the present disclosure, a novel image processing apparatus includes circuitry. The circuitry is configured to irreversibly compress an input image to generate an irreversibly compressed image. The circuitry is further configured to: decompress the irreversibly compressed image to generate a decompressed image; and correct a surround of a target area in the decompressed image to generate a corrected image. The target area corresponds to a line drawing image included in the input image. The circuitry is further configured to generate a first image layer, a second image layer, and a third image layer from the corrected image. The first image layer is a binary image including a line drawing alone. The second image layer includes a line drawing area. The third image layer includes a background area. The circuitry is further configured to: reversibly compress the first image layer and irreversibly compress the second image layer and the third image layer; and generate an output file based on the first image layer, the second image layer, and the third image layer compressed.

Also described are novel image processing method and non-transitory, computer-readable storage medium storing computer-readable program code that causes a computer to perform the image forming method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
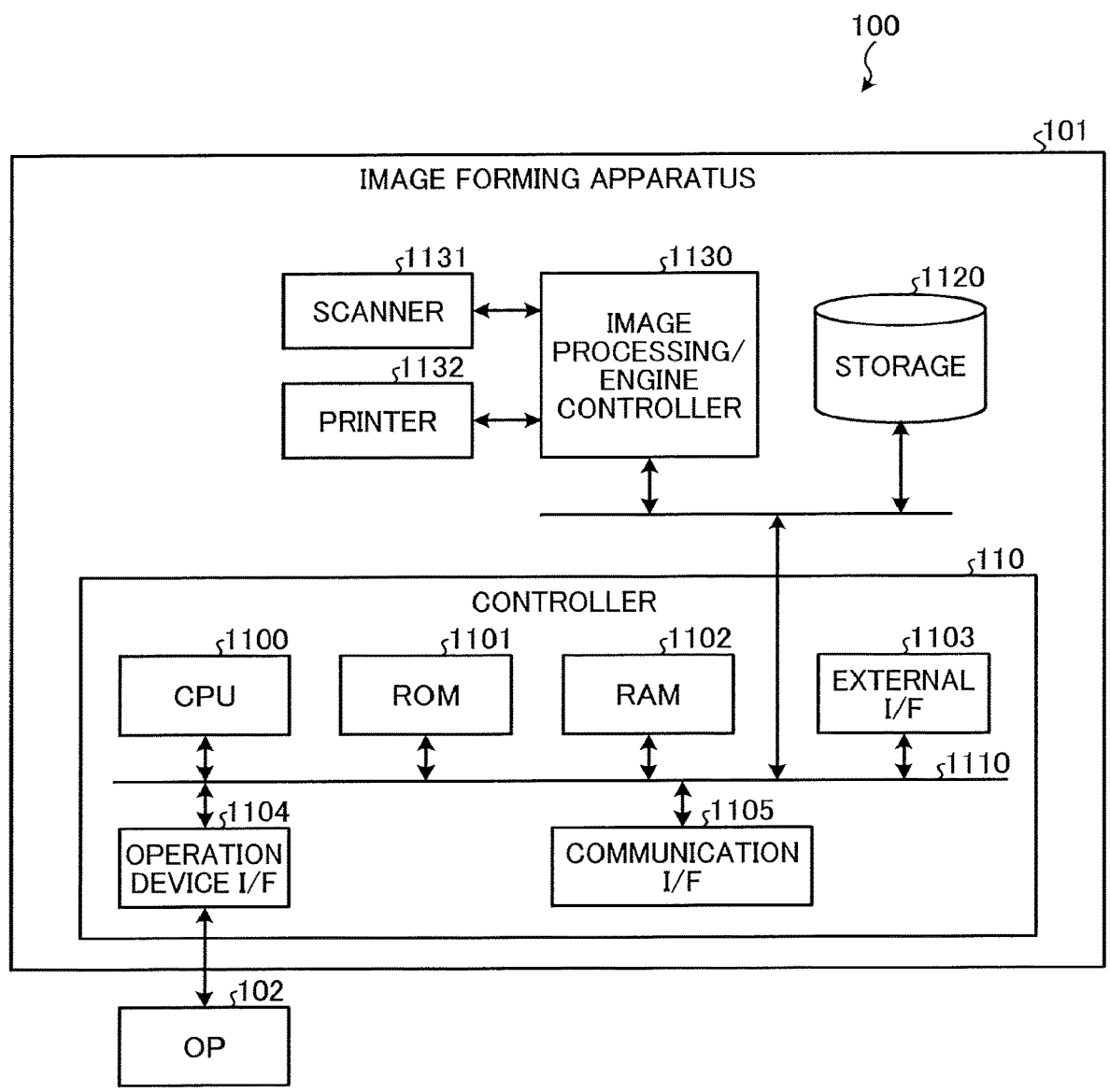
FIG. 1 is a block diagram illustrating a hardware configuration of an image processing apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

<Hardware Configuration>

Referring now to FIG. 1, a description is given of a hardware configuration of an image processing apparatus according to an embodiment of the present disclosure.

FIG. 1 is a block diagram illustrating a hardware configuration of an image forming apparatus 100 as an image processing apparatus according to an embodiment of the present disclosure.

FIG. 1 illustrates the image forming apparatus 100 as a multifunction peripheral (MFP) having at least two of copier, printer, scanner, facsimile, and plotter functions.

The image forming apparatus 100 includes a controller 110, a storage 1120, an image processing/engine controller 1130, a scanner 1131, and a printer 1132 in a housing 101. The controller 110 includes a central processing unit (CPU) 1100, a read only memory (ROM) 1101, a random access memory (RAM) 1102, an external interface (I/F) 1103, an operation device I/F 1104, and a communication I/F 1105, each being communicably connected to each other by a bus 1110.

The storage 1120 is a non-volatile storage medium to store data and programs that cause the CPU 1100 to perform a desired sequence of operations. The storage 1120 further stores application programs that cause the image forming apparatus 100 to implement given functions as described above. The storage 1120 is, e.g., a hard disk drive or a flash memory.

The image forming apparatus 100 herein has, e.g., printer, scanner, and copier functions. To implement such functions, the image forming apparatus 100 includes the image processing/engine controller 1130, the scanner 1131, and the printer 1132. The storage 1120 and the image processing/engine controller 1130 are connected to the bus 1110 in the controller 110.

According to a program stored in advance in, e.g., the ROM 1101 or the storage 1120, the CPU 1100 controls overall operation of the image forming apparatus 100 with the RAM 1102 as a working memory.

The operation device I/F 1104 is an interface linking the controller 110 with an operation panel (OP) 102. The OP 102 includes an input receiver and an operation panel as an operation device. The input receiver receives, e.g., user instructions. The operation panel includes a display that displays information for, e.g., a user. In response to a user instruction, the OP 102 generates and outputs a signal to the CPU 1100 via the operation device I/F 1104.

The communication I/F 1105 performs communication via a network such as a local area network (LAN), according to instructions from the CPU 1100. The external I/F 1103 is an interface linking the controller 110 with external devices. For example, the external I/F 1103 is a universal serial bus (USB).

With an optical sensor such as a contact image sensor (CIS) or a charge coupled device (CCD) sensor, the scanner 1131 scans or reads an image of an original placed on a document tray or platen to generate and output image data. The printer 1132 forms an image on a recording medium according to the image data by electrophotography or in an inkjet printing system.

The image processing/engine controller 1130 controls operation of the scanner 1131 and the printer 1132 according to the instructions from the CPU 1100. In addition, according to the instructions from the CPU 1100, the image processing/engine controller 1130 performs image processing on the image data read by the scanner 1131 and outputs the image data processed to the controller 110. On the other hand, the image processing/engine controller 1130 receives the image data from the controller 110 and performs image processing on the image data. The image processing/engine controller 1130 then outputs the image data to the printer 1132.

<Creation of Highly Compressed PDF File>

In order to provide a fuller understanding of the embodiments of the present disclosure, a description is now given of a basic process to create a highly compressed Portable Document Format (PDF) file or high compression PDF file with reference to FIGS. 2 to 8.

Initially, a description is given of an outline of high compression PDF.

The high compression PDF is an image compression technique of creating highly compressed PDF files from images including line drawings such as text. Here, the line drawing refers to text or an object represented by a line desired to be handled as text. By contrast, an object represented by a line desired to be handled as a design is referred to as a design, instead of the line drawing. A design is an object other than the line drawing, such as an object represented by dots (e.g., photograph) or an object not desired to be handled as text (e.g., figure).

Figure 2:
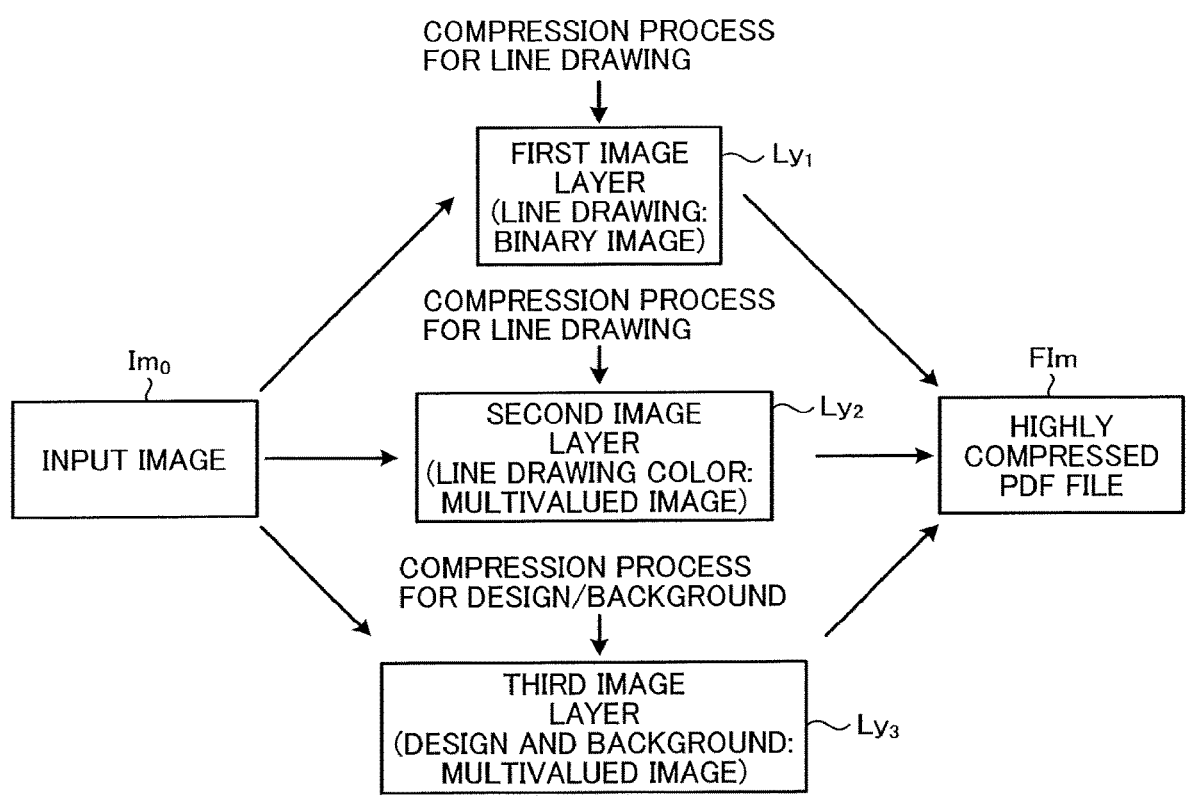
FIG. 2 is a schematic diagram illustrating a general procedure of creating a highly compressed PDF file.

FIG. 2 is a schematic diagram illustrating a general procedure of creating a highly compressed PDF file.

In order to create a highly compressed PDF file, a plurality of image layers is firstly generated from an image to be processed (hereinafter referred to as an input image $Im_0$). The plurality of image layers herein includes a first image layer $Ly_1$, a second image layer $Ly_2$, and a third image layer $Ly_3$. The first image layer $Ly_1$ is a binary image including a line drawing alone. The second image layer $Ly_2$ is a multivalued image representing a line drawing color. The third image layer $Ly_3$ is a multivalued image representing a design and a background other than the line drawing.

The first image layer $Ly_1$ and the second image layer $Ly_2$ are compressed by a compression method suitable for compression of line drawings. On the other hand, the third image layer $Ly_3$ is compressed by a compression method suitable for compression of designs and backgrounds. The first image layer $Ly_1$, the second image layer $Ly_2$, and the third image layer $Ly_3$ thus compressed are combined into a single image PDF file. Thus, a highly compressed PDF file FIm of the input image $Im_0$ is generated.

Specifically, for example, the first image layer $Ly_1$ is compressed through a compression process using a coding method such as Modified Modified READ (MMR; READ is Relative Element Address Designate codes) for coding binary images. The second image layer $Ly_2$ is compressed through a compression process using a coding method such as Joint Photographic Experts Group (JPEG) for coding multivalued images, with a resolution lower than a resolution of the third image layer $Ly_3$ compressed. Since the first image layer $Ly_1$ and the second image layer $Ly_2$ are compressed through the compression processes suitable for compression of line drawings, the compression processes for the first image layer $Ly_1$ and the second image layer $Ly_2$ are hereinafter collectively referred to as a first compression process.

The third image layer $Ly_3$ is compressed through a compression process using a coding method such as JPEG for coding multivalued images, with a resolution higher than the resolution of the second image layer $Ly_2$ compressed. Since the third image layer $Ly_3$ is compressed through the compression process suitable for compression of designs and backgrounds, the compression process for the third image layer $Ly_3$ is hereinafter referred to as a second compression process to distinguish between the compression processes for the first image layer $Ly_1$ and the second image layer $Ly_2$ and the compression process for the third image layer $Ly_3$.

Note that each of the coding methods described above is merely an example. The compression processes may be performed according to coding methods different from the above-described examples.

As described above, in the high compression PDF, the input image $Im_0$, as a processing target, is divided into a line drawing area and the other area, that is, a design and background area. The first compression process is performed on the line drawing area while the second compression process is performed on the other area, that is, the design and background area. Thus, the compression efficiency is enhanced. Here, the compression efficiency refers to how much the compressibility is increased without impairing the image quality or reproducibility upon reproduction of an image. That is, efficient compression leads to obtaining high compressibility while maintaining the reproducibility.

Various modifications are possible for the high compression PDF described above. For example, the first image layer $Ly_1$ described above may be divided into an image layer including a black line drawing alone and an image layer including a line drawing of white or chromatic color alone. A configuration may be employed in which the line drawing color is provided as information corresponding to the coordinates of the line drawing, instead of the second image layer $Ly_2$ that represents the line drawing color.

Figure 3:
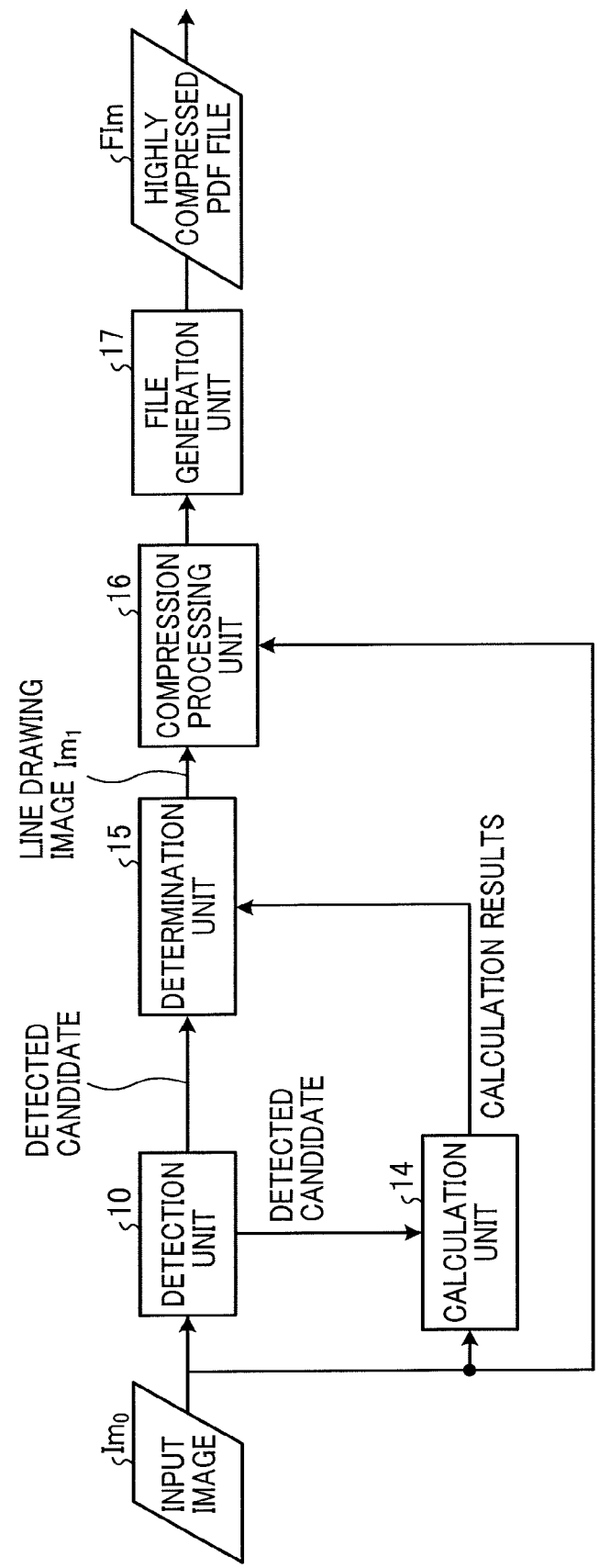
FIG. 3 is a functional block diagram illustrating a functional configuration of an image processing apparatus for creating a highly compressed PDF file according to the general procedure of FIG. 2.

FIG. 3 is a functional block diagram illustrating a functional configuration of an image processing apparatus for creating a highly compressed PDF file FIm according to the general procedure described above with reference to FIG. 2.

In FIG. 3, the image processing apparatus includes a detection unit 10, a calculation unit 14, a determination unit 15, a compression processing unit 16, and a file generation unit 17. In the configuration of FIG. 3, an image acquired as a processing target (i.e., input image $Im_0$) is input into the detection unit 10, the calculation unit 14, and the compression processing unit 16. The file generation unit 17 outputs, as output data, a highly compressed PDF file FIm of the input image $Im_0$.

The detection unit 10 detects a candidate line drawing from the input image $Im_0$ (i.e., processing target). The detection unit 10 outputs, as a detected candidate, the candidate line drawing thus detected from the input image $Im_0$ to the calculation unit 14 and the determination unit 15. The calculation unit 14 uses the detected candidate received from the detection unit 10 to specify a position of each candidate line drawing included in the input image $Im_0$ (i.e., processing target), thereby calculating, e.g., the number of colors of each candidate line drawing, the background color of each candidate line drawing, and the color of each candidate line drawing. The calculation unit 14 outputs calculation results to the determination unit 15.

Based on the calculation results received from the calculation unit 14 and each candidate line drawing detected by the detection unit 10, the determination unit 15 determines a line drawing area including a line drawing as a target of the first compression process. The determination unit 15 outputs, as a line drawing image $Im_1$, an image of the line drawing area thus determined to the compression processing unit 16.

That is, the compression processing unit 16 receives the line drawing image $Im_1$ in addition to the input image $Im_0$. The compression processing unit 16 uses the line drawing image $Im_1$ received from the determination unit 15 to generate the first image layer $Ly_1$, the second image layer $Ly_2$, and the third image layer $Ly_3$ from the input image $Im_0$ (i.e., processing target). As described above, the first image layer $Ly_1$ is a binary image including a line drawing alone. The second image layer $Ly_2$ is a multivalued image representing a line drawing color. The third image layer $Ly_3$ is a multivalued image representing a design and a background other than the line drawing.

The compression processing unit 16 performs the first compression process, which is suitable for compression of line drawings, on the first image layer $Ly_1$ and the second image layer $Ly_2$. Meanwhile, the compression processing unit 16 performs the second compression process, which is suitable for compression of designs and backgrounds, on the third image layer $Ly_3$. Note that the compression method is not particularly limited provided that the first image layer $Ly_1$ and the second image layer $Ly_2$ are compressed by a compression method suitable for compression of line drawings while the third image layer $Ly_3$ is compressed by a compression method suitable for compression of designs and backgrounds. The compression processing unit 16 outputs, to the file generation unit 17, the first image layer $Ly_1$, the second image layer $Ly_2$, and the third image layer $Ly_3$ thus compressed as a first compressed image layer $Ly_{1A}$, a second compressed image layer $Ly_{2A}$, and a third compressed image layer $Ly_{3A}$ (illustrated in FIG. 8), respectively.

The file generation unit 17 combines the first compressed image layer $Ly_{1A}$, a second compressed image layer $Ly_{2A}$, and a third compressed image layer $Ly_{3A}$ received from the compression processing unit 16 into a single image PDF file, thereby generating a highly compressed PDF file FIm of the input image $Im_0$.

Note that the format of the image file into which the first compressed image layer $Ly_{1A}$, a second compressed image layer $Ly_{2A}$, and a third compressed image layer $Ly_{3A}$ are combined is not limited to the PDF. Various formats may be used for superimposing a plurality of image layers one atop another into a single image, such as JPM, which is JPEG 2000 Multi-layer Image Format (ISO 15444-6). The highly compressed PDF file FIm generated by the file generation unit 17 may be stored in a storage provided in the image processing apparatus or may be output from the image processing apparatus.

Now, a detailed description is given of processes performed by the units described above.

Figure 4:
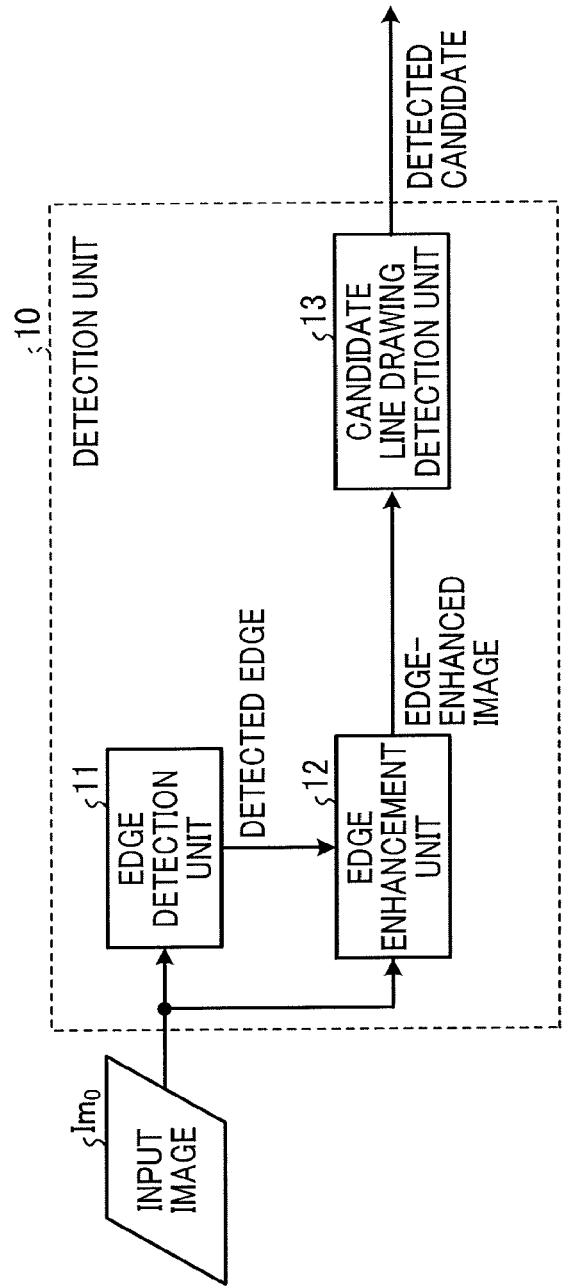
FIG. 4 is a functional block diagram illustrating a functional configuration of a detection unit according to first, second and fourth embodiments of the present disclosure.
Figure 5:
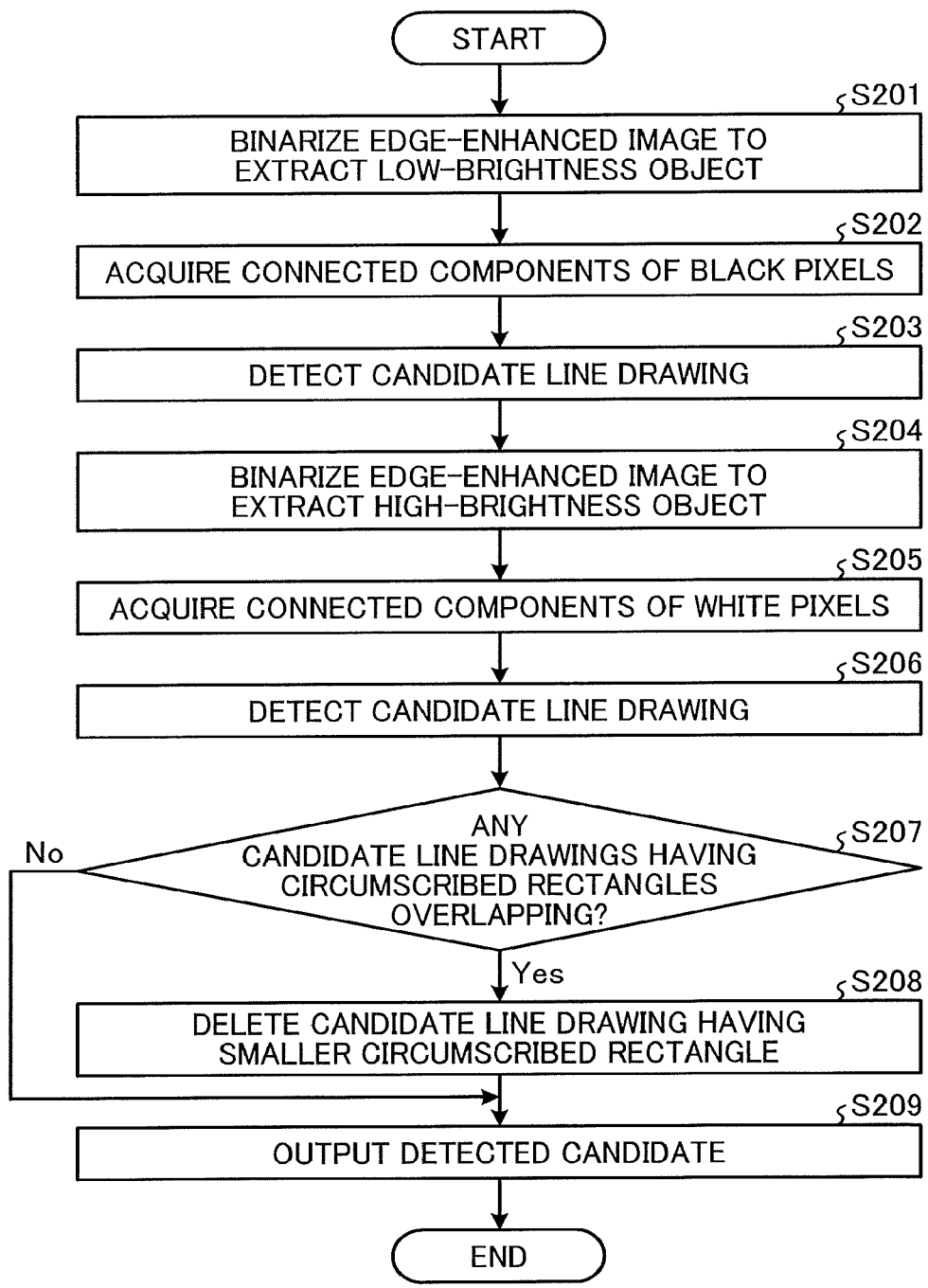
FIG. 5 is a flowchart illustrating a process performed by a candidate line drawing detection unit according to an embodiment of the present disclosure.

Initially with reference to FIGS. 4 and 5, a detailed description is given of the detection unit 10.

FIG. 4 is a functional block diagram illustrating a functional configuration of the detection unit 10 according to first, second, and fourth embodiments of the present disclosure.

In FIG. 4, the detection unit 10 includes an edge detection unit 11, an edge enhancement unit 12, and a candidate line drawing detection unit 13.

The edge detection unit 11 detects and outputs an edge of a candidate line drawing included in the input image $Im_0$ (i.e., processing target) as a detected edge. Specifically, the edge detection unit 11 separates a line drawing such as text from dots by use of the continuity and patterns of black pixels and white pixels obtained by a ternary input image $Im_0$ to detect an edge constructing the candidate line drawing. The detected edge output from the edge detection unit 11 is, e.g., coordinate data indicating a coordinate position, in the input image $Im_0$, of a pixel group detected as the edge of the candidate line drawing. The detected edge is input into the edge enhancement unit 12.

The edge enhancement unit 12 uses the detected edge received from the edge detection unit 11 to enhance the edge of the candidate line drawing included in the input image $Im_0$ (i.e., processing target), thereby generating an edge-enhanced image, which is the candidate line drawing with the edge enhanced. Since the edge enhancement unit 12 performs the edge enhancement by use of the detected edge received from the edge detection unit 11, the edge enhancement unit 12 rarely enhances an edge of a design included in the input image $Im_0$. Therefore, the edge enhancement unit 12 increases the degree of edge enhancement, thereby generating the edge-enhanced image, which is the candidate line drawing with the edge clearly enhanced. The edge-enhanced image thus generated by the edge enhancement unit 12 is input into the candidate line drawing detection unit 13.

The candidate line drawing detection unit 13 detects the candidate line drawing from the edge-enhanced image received from the edge enhancement unit 12. The candidate line drawing detection unit 13 then outputs, as a detected candidate, the candidate line drawing thus detected. Specifically, for example, the candidate line drawing detection unit 13 extracts connected components of black pixels and white pixels from a binary edge-enhanced image. Based on, e.g., the size of a circumscribed rectangle of the connected components, the candidate line drawing detection unit 13 detects the candidate line drawing. That is, the process prior to extraction of a text line in a typical method corresponds to an example of the process performed by the candidate line drawing detection unit 13. The detected candidate is, e.g., coordinate data indicating a coordinate position, in the input image $Im_0$, of a pixel group detected as the candidate line drawing by the candidate line drawing detection unit 13. The candidate line drawing detection unit 13 outputs the detected candidate, as a detection result of the detection unit 10, to the calculation unit 14 and the determination unit 15.

Referring now to FIG. 5, a description is given of a flow of a process performed by the candidate line drawing detection unit 13 according to an embodiment of the present disclosure.

FIG. 5 is a flowchart illustrating the process performed by the candidate line drawing detection unit 13 according to an embodiment of the present disclosure.

In step S201, the candidate line drawing detection unit 13 binarizes the edge-enhanced image generated by the edge enhancement unit 12 to acquire a binary image (i.e., binary edge-enhanced image). The binarization in step S201 is performed to extract a low-brightness object having a lower brightness than the background brightness. A threshold is set, as appropriate, to distinguish between the low-brightness object and the background. Dynamic threshold binarization may be performed to accurately separate the low-brightness object from the background. For the sake of simplicity, the pixels constructing the low-brightness object are hereinafter referred to as "black pixels".

In step S202, the candidate line drawing detection unit 13 connects a horizontal line of black pixels aligned in a horizontal direction and a vertical line of black pixels aligned in a vertical direction in the binary image acquired in step S201, thereby acquiring connected components from the binary image.

In step S203, based on the sizes of circumscribed rectangles of the connected components, for example, the candidate line drawing detection unit 13 detects, as a candidate line drawing, a connected component distinguished from a design from the connected components acquired in step S202.

In step S204, the candidate line drawing detection unit 13 binarizes again the edge-enhanced image generated by the edge enhancement unit 12. The binarization is herein performed to extract a high-brightness object having a higher brightness than the background brightness. A threshold is set, as appropriate, to distinguish between the high-brightness object and the background. Dynamic threshold binarization may be performed to accurately separate the high-brightness object from the background. For the sake of simplicity, the pixels constructing the high-brightness object are hereinafter referred to as "white pixels".

In step S205, the candidate line drawing detection unit 13 connects a horizontal line of white pixels aligned in the horizontal direction and a vertical line of white pixels aligned in the vertical direction in the binary image acquired in step S204, thereby acquiring connected components from the binary image.

In step S206, based on the sizes of circumscribed rectangles of the connected components, for example, the candidate line drawing detection unit 13 detects, as a candidate line drawing, a connected component distinguished from a design from the connected components acquired in step S205.

Note that, in step S203 described above, the candidate line drawing detection unit 13 can detect a plurality of candidate line drawings of black pixels from the single input image $Im_0$. Similarly, in step S206 described above, the candidate line drawing detection unit 13 is capable of detecting a plurality of candidate line drawings of white pixels from the single input image $Im_0$.

In step S207, the candidate line drawing detection unit 13 determines whether the candidate line drawing detected in step S203 has a circumscribed rectangle overlapping a circumscribed rectangle of the candidate line drawing detected in step S206. When the candidate line drawing detection unit 13 determines that the candidate line drawing detected in step S203 does not have a circumscribed rectangle overlapping the circumscribed rectangle of the candidate line drawing detected in step S206 (NO in step S207), the candidate line drawing detection unit 13 proceeds to step S209. On the other hand, when the candidate line drawing detection unit 13 determines that the candidate line drawing detected in step S203 has a circumscribed rectangle overlapping the circumscribed rectangle of the candidate line drawing detected in step S206 (YES in step S207), the candidate line drawing detection unit 13 proceeds to step S208.

In step S208, the candidate line drawing detection unit 13 compares the sizes of the overlapping circumscribed rectangles of the candidate line drawings and deletes the candidate line drawing having a smaller circumscribed rectangle.

In step S209, the candidate line drawing detection unit 13 detects, as a final candidate line drawing, the candidate line drawing remaining without being deleted in step S208 out of the candidate line drawings detected in steps S203 and S206 described above. The candidate line drawing detection unit 13 outputs the final candidate line drawing as a detected candidate. Thus, the candidate line drawing detection unit 13 completes a sequence of processes according to the flowchart of FIG. 5.

Now, a detailed description is given of a process performed by the calculation unit 14.

As described above, by use of the detected candidate received from the detection unit 10, the calculation unit 14 specifies the position of each candidate line drawing included in the input image $Im_0$ (i.e., processing target), thereby calculating, e.g., the number of colors of each candidate line drawing, the background color of each candidate line drawing, and the color of each candidate line drawing. For example, the number of colors and the color are calculated based on the hue-saturation-value (HSV) color model, which is an alternative representation of the red-green-blue (RGB) color model. Specifically, the number of colors and the color are calculated based on an HSV value into which an RGB value is converted. The RGB value includes values indicating colors of red (R), green (G), and blue (B) of each pixel of the input image $Im_0$. The HSV color model is a color space that describes colors by hue (H), saturation (S), and value (V).

The calculation unit 14 calculates, e.g., an aspect ratio of the circumscribed rectangle of each candidate line drawing and a line width (i.e., character thickness) of each candidate line drawing. Specifically, the calculation unit 14 calculates the aspect ratio of the circumscribed rectangle of the candidate line drawing from the number of pixels aligned in a vertical direction of the circumscribed rectangle and the number of pixels aligned in a lateral direction. The calculation unit 14 calculates the line width of the candidate line drawing from, e.g., a distance (i.e., the number of pixels) between edges of the candidate line drawing. Alternatively, the calculation unit 14 may calculate the line width of the candidate line drawing from the ratio of the number of pixels in the line drawing area to the total number of pixels of the circumscribed rectangle of the candidate line drawing. Such calculation determines whether the candidate line drawing is bold text. The calculation unit 14 outputs, to the determination unit 15, the calculation results including the number of colors of each candidate line drawing, the background color of each candidate line drawing, the color of each candidate line drawing, the aspect ratio of the circumscribed rectangle of each candidate line drawing, and the line width of each candidate line drawing.

Figure 6:
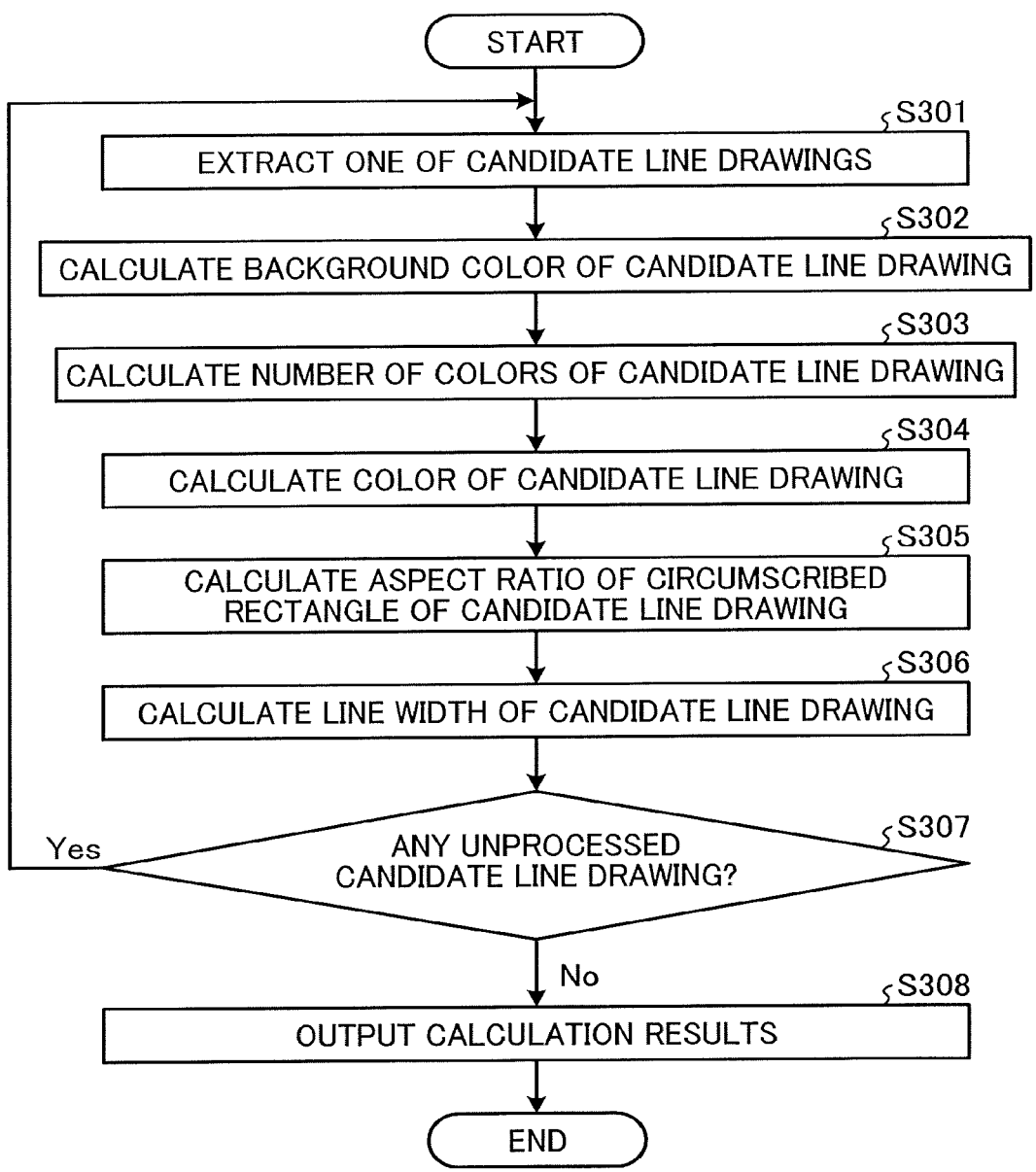
FIG. 6 is a flowchart illustrating a process performed by a calculation unit according to an embodiment of the present disclosure.

Referring now to FIG. 6, a description is given of a flow of the process performed by the calculation unit 14 according to an embodiment of the present disclosure.

FIG. 6 is a flowchart illustrating the process performed by the calculation unit 14 according to an embodiment of the present disclosure.

In step S301, based on the detected candidate received from the detection unit 10, the calculation unit 14 extracts one of the candidate line drawings included in the input image $Im_0$ (i.e., processing target).

In step S302, the calculation unit 14 selects an area having a given size and a given shape and being adjacent to the candidate line drawing extracted in step S301. The area may be apart from the candidate line drawing at about one pixel. The calculation unit 14 converts an RGB value of each pixel in the area into an HSV value to calculate an average of the HSV values of the pixels in the area as a background color of the candidate line drawing.

In step S303, the calculation unit 14 converts the respective RGB values of the pixels constructing the candidate line drawing extracted in step S301 into HSV values. The calculation unit 14 uses the respective HSV values of the pixels to calculate the number of colors of the candidate line drawing.

In step S304, the calculation unit 14 calculates the color of the candidate line drawing by use of the respective HSV values of the pixels constructing the candidate line drawing. Note that the calculation unit 14 may exclude, from the pixels constructing the candidate line drawing, a pixel having a color close to the background color of the candidate line drawing calculated in step S302, (for example, at an Euclidean distance within a given value in the HSV color space), to calculate the number of colors of the candidate line drawing in step S303 and the color of the candidate line drawing in step S304.

In step S305, the calculation unit 14 obtains a circumscribed rectangle of the candidate line drawing extracted in step S301. The calculation unit 14 counts the number of pixels aligned in the vertical direction of the circumscribed rectangle and the number of pixels aligned in the lateral direction of the circumscribed rectangle, thereby calculating the aspect ratio of the circumscribed rectangle of the candidate line drawing.

In step S306, the calculation unit 14 calculates the line width of the candidate line drawing from, e.g., the distance (i.e., the number of pixels) between the edges of the candidate line drawing extracted in step S301.

In step S307, the calculation unit 14 determines whether there is an unprocessed candidate line drawing. When the calculation unit 14 determines that there is at least one unprocessed candidate line drawing (YES in step S307), the calculation unit 14 returns to step S301 and proceeds again from step S301. On the other hand, when the calculation unit 14 determines that all the candidate line drawings are processed, that is, there is no unprocessed candidate line drawing (NO in step S307), the calculation unit 14 proceeds to step S308.

In step S308, the calculation unit 14 outputs the calculation results of steps S302 to S306 for each candidate line drawing. Thus, the calculation unit 14 completes a sequence of processes according to the flowchart of FIG. 6.

Now, a detailed description is given of a process performed by the determination unit 15 according to the first, second, and fourth embodiments of the present disclosure.

As described above, based on the calculation results received from the calculation unit 14 and each of the candidate line drawings detected by the detection unit 10, the determination unit 15 determines a line drawing area including a line drawing as a target of the first compression process.

Figure 7:
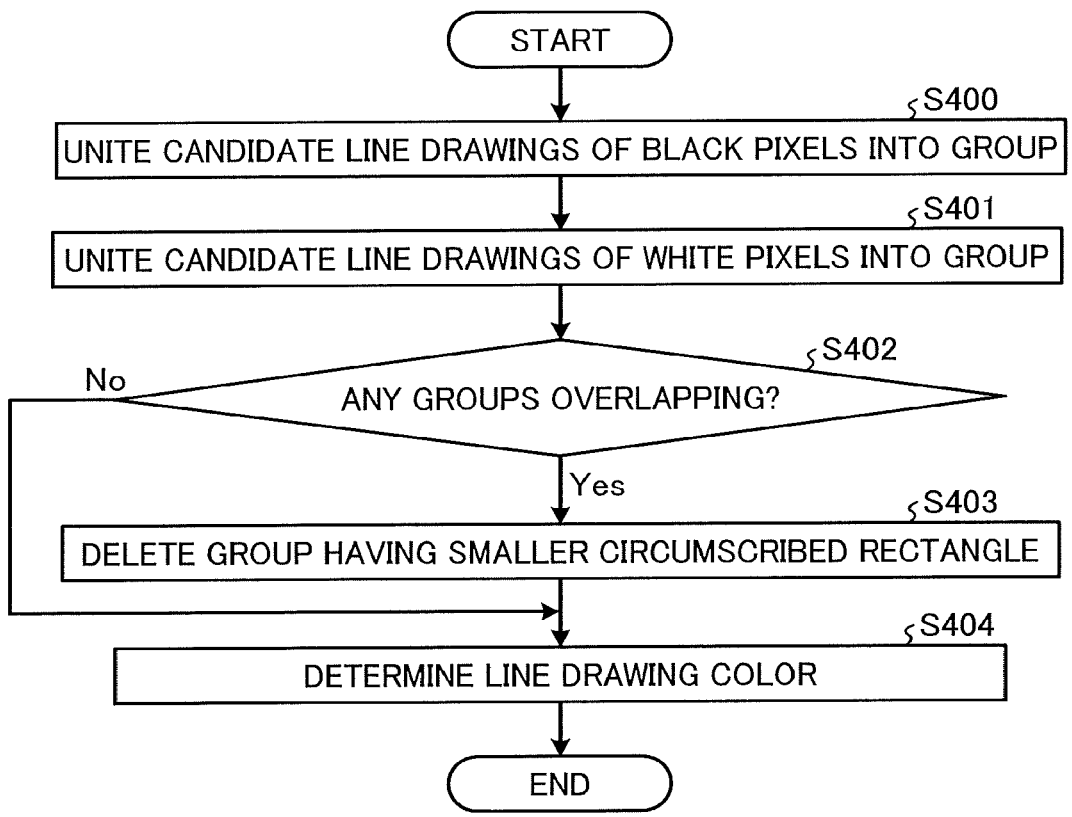
FIG. 7 is a flowchart illustrating a process performed by a determination unit according to the first, second, and fourth embodiments of the present disclosure.

Referring now to FIG. 7, a description is given of a flow of the process performed by the determination unit 15 according to the first, second, and fourth embodiments of the present disclosure.

FIG. 7 is a flowchart illustrating the process performed by the determination unit 15 according to the first, second, and fourth embodiments of the present disclosure.

In step S400, the determination unit 15 unites, into a group, the candidate line drawings of black pixels out of the candidate line drawings received from the detection unit 10, based on the sizes and relative positions of the circumscribed rectangles of the candidate line drawings, for example. Note that the sizes and relative positions of the circumscribed rectangles of the candidate line drawings are obtainable based on the calculation results received from the calculation unit 14. The grouping herein obeys predetermined rules such as grouping characters, which are representative line drawings, by line basis. Therefore, some connected components may not be grouped.

In step S401, the determination unit 15 unites, into a group, the candidate line drawings of white pixels out of the candidate line drawings received from the detection unit 10, based on the sizes and relative positions of the circumscribed rectangles of the candidate line drawings, for example. Similarly to step S400, the grouping herein obeys predetermined rules such as grouping characters, which are representative line drawings, by line basis. Therefore, some connected components may not be grouped.

In step S402, the determination unit 15 determines whether a group of candidate line drawings of black pixels united in step S400 is positioned overlapping a group of candidate line drawings of white pixels united in step S401 in the edge-enhanced image. When the determination unit 15 determines that the group of candidate line drawings of black pixels united in step S400 is not positioned overlapping the group of candidate line drawings of white pixels united in step S401 (NO in step S402), the determination unit 15 proceeds to step S404. On the other hand, when the determination unit 15 determines that the group of candidate line drawings of black pixels united in step S400 is positioned overlapping the group of candidate line drawings of white pixels united in step S401 (YES in step S402), the determination unit 15 proceeds to step S403.

In step S403, the determination unit 15 compares the sizes of the circumscribed rectangles of the groups positioned overlapping, thereby deleting the group having a smaller circumscribed rectangle. Then, the determination unit 15 proceeds to step S404.

In step S404, based on the calculation results received from the calculation unit 14, the determination unit 15 determines a line drawing color of the group (or groups) remaining because of the process in step S402 or S403. The determination unit 15 outputs, as a line drawing image $Im_1$, the group having the line drawing color determined. With output of the line drawing image $Im_1$, the determination unit 15 completes a sequence of processes according to the flowchart of FIG. 7.

Note that, in steps S400 and S401, the grouping is executed according to rules for grouping characters or line drawings related to characters by line basis. The group (or groups) remaining as a consequence of the process in step S402 or S403 is a circumscribed rectangle of characters (i.e., line drawings) grouped by line basis. Therefore, such a group is hereinafter referred to as a line rectangle.

Figure 8:
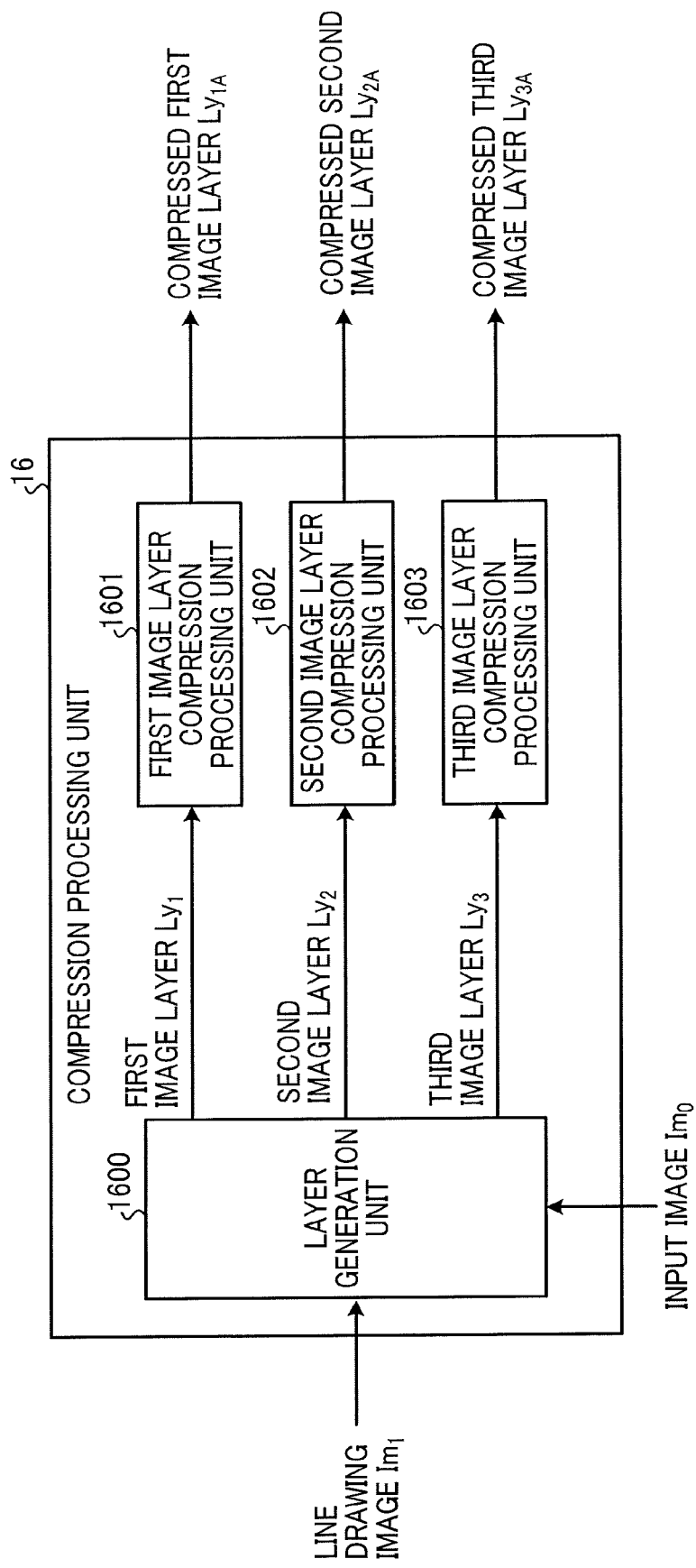
FIG. 8 is a functional block diagram illustrating a functional configuration of a compression processing unit for creating a highly compressed PDF file according to the general procedure.

Referring now to FIG. 8, a description is given of a basic configuration of the compression processing unit 16.

FIG. 8 is a functional block diagram illustrating a functional configuration of the compression processing unit 16 for creating a highly compressed PDF file FIm according to the general procedure.

In FIG. 8, the compression processing unit 16 includes a layer generation unit 1600, a first image layer compression processing unit 1601, a second image layer compression processing unit 1602, and a third image layer compression processing unit 1603.

The layer generation unit 1600 receives an input image $Im_0$ and a line drawing image $Im_1$ output from the determination unit 15. The layer generation unit 1600 generates a first image layer $Ly_1$, a second image layer $Ly_2$, and a third image layer $Ly_3$ from the input image $Im_0$ by image area separation using the line drawing image $Im_1$. The first image layer $Ly_1$, the second image layer $Ly_2$, and the third image layer $Ly_3$ generated by the layer generation unit 1600 are input into the first image layer compression processing unit 1601, the second image layer compression processing unit 1602, and the third image layer compression processing unit 1603, respectively.

The first image layer compression processing unit 1601 receives and binarizes the first image layer $Ly_1$. The first image layer compression processing unit 1601 then compresses the first image layer $Ly_1$ by a compression method, such as the MMR method, suitable for compression of binary images such as line drawings. The first image layer compression processing unit 1601 outputs, as a compressed first image layer $Ly_{1A}$, the first image layer $Ly_1$ thus compressed. The third image layer compression processing unit 1603 receives and compresses the third image layer $Ly_3$ by a compression method, such as the JPEG method, suitable for compression of multivalued images such as designs. The third image layer compression processing unit 1603 then outputs, as a compressed third image layer $Ly_{3A}$, the third image layer $Ly_3$ thus compressed. The second image layer compression processing unit 1602 receives and compresses the second image layer $Ly_2$ by a compression method, such as the JPEG method, suitable for compression of multivalued images. The second image layer compression processing unit 1602 then outputs, as a compressed second image layer $Ly_{2A}$, the second image layer $Ly_2$ thus compressed. Preferably, the second image layer compression processing unit 1602 performs the compression process with a reduced resolution compared to the compression process performed by the third image layer compression processing unit 1603.

The compression methods employed by the first image layer compression processing unit 1601, the second image layer compression processing unit 1602, and the third image layer compression processing unit 1603 are not limited to the examples described above.

Thus, the compression processing unit 16 outputs the compressed first image layer $Ly_{1A}$, the compressed second image layer $Ly_{2A}$, and the compressed third image layer $Ly_{3A}$ to the file generation unit 17.

<First Embodiment>

Now, a description is given of the first embodiment of the present disclosure.

In the first embodiment, an input image $Im_0$ is compressed and stored in a storage medium. The input image $Im_0$ compressed is read from the storage medium and decompressed. The first image layer $Ly_1$, the second image layer $Ly_2$, and the third image layer $Ly_3$ are generated based on the input image $Im_0$ decompressed. As a consequence, a highly compressed PDF file FIm is created.

Figure 9:
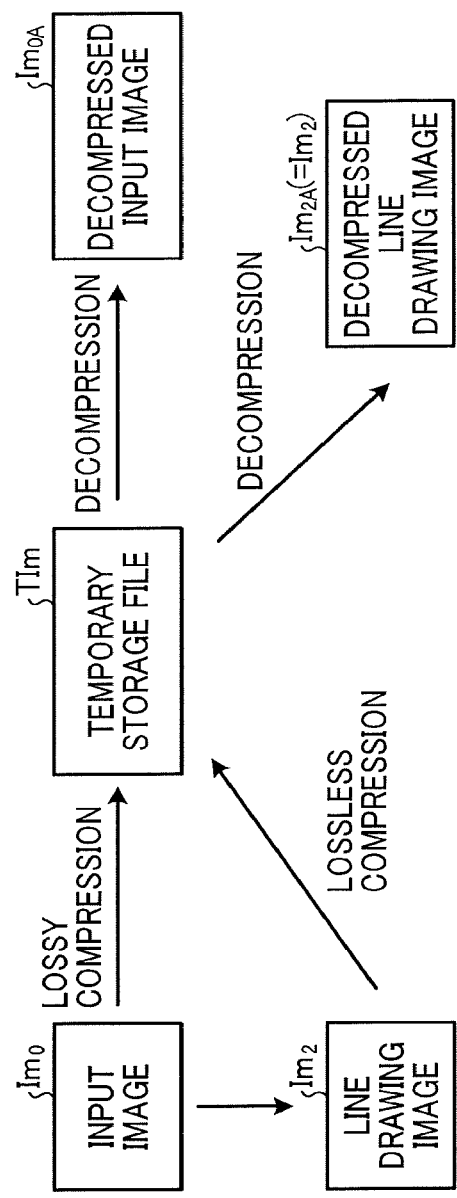
FIG. 9 is a schematic diagram of a procedure of creating a highly compressed PDF file according to the first embodiment of the present disclosure, particularly illustrating compression and decompression of an input image.
Figure 10:
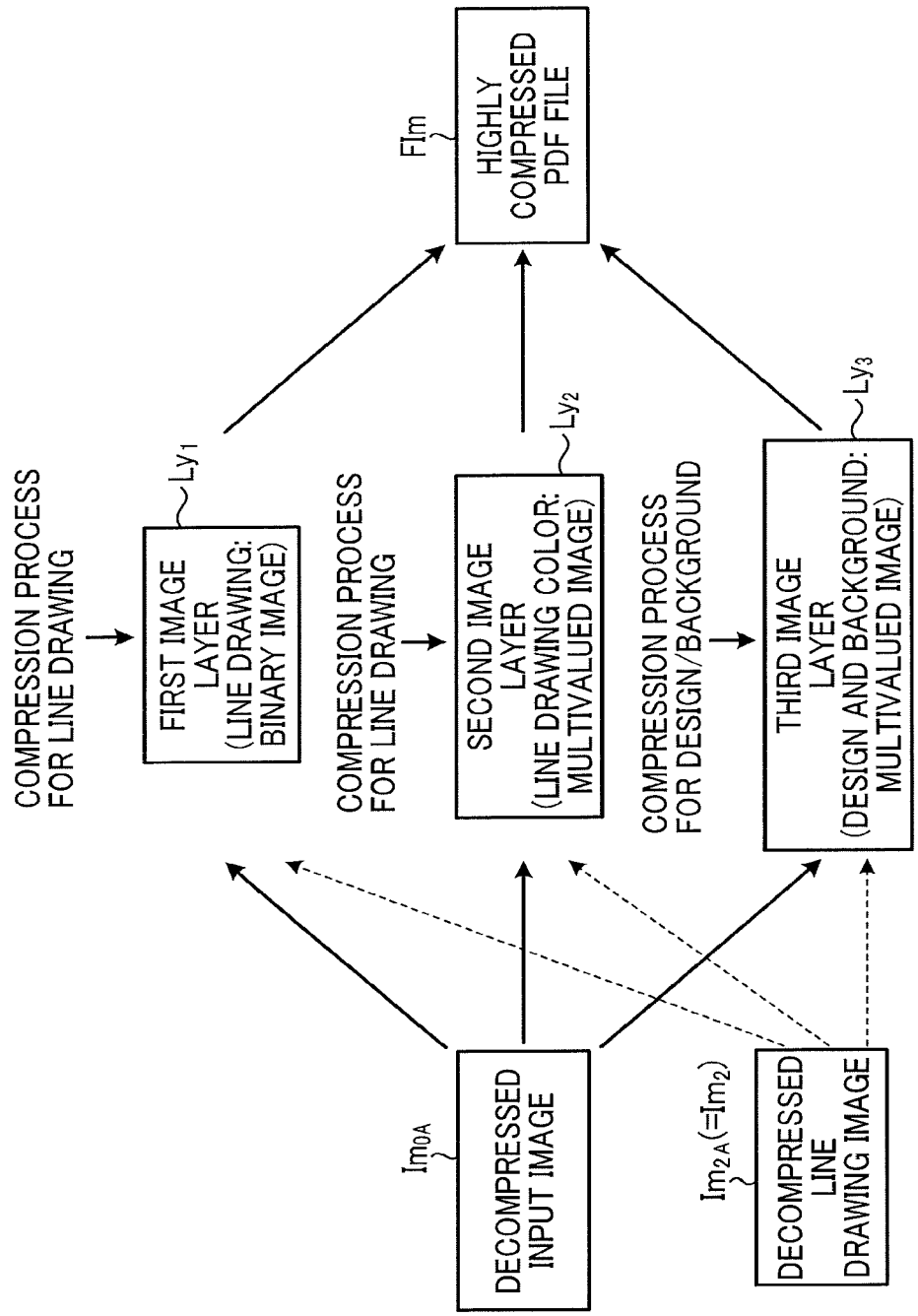
FIG. 10 is a schematic diagram of a procedure of creating a highly compressed PDF file according to the first embodiment of the present disclosure, particularly illustrating creation of the highly compressed PDF file from a decompressed input image.

Referring now to FIGS. 9 and 10, a description is given of a procedure of creating the highly compressed PDF file FIm.

FIG. 9 is a schematic diagram of a procedure of creating a highly compressed PDF file FIm according to the first embodiment of the present disclosure, particularly illustrating compression and decompression of an input image. FIG. 10 is a schematic diagram of a procedure of creating a highly compressed PDF file FIm according to the first embodiment of the present disclosure, particularly illustrating creation of the highly compressed PDF file FIm from a decompressed input image.

In FIG. 9, the input image $Im_0$ is irreversibly compressed and stored in a temporary storage file TIm. Meanwhile, the image area separation is applied to the input image $Im_0$ to extract a line drawing image $Im_2$ from the input image $Im_0$. Here, the line drawing image $Im_2$ is extracted more simply than extraction of a line drawing image with the detection unit 10, the calculation unit 14, and the determination unit 15 described above. The line drawing image $Im_2$ is irreversibly compressed and stored in the temporary storage file TIm.

Note that, the input image $Im_0$ and the line drawing image $Im_2$ are compressed and stored in the common temporary storage file TIm as illustrated in FIG. 9. Alternatively, the input image $Im_0$ and the line drawing image $Im_2$ may be compressed and stored in different temporary storage files.

The input image $Im_0$ compressed and stored in the temporary storage file TIm is then decompressed as a decompressed input image $Im_{0A}$. Since the input image $Im_0$ is irreversibly compressed, the decompressed input image $Im_{0A}$ includes changes (e.g., mosquito noise) caused by the irreversible compression and decompression of the original input image $Im_0$.

On the other hand, the line drawing image $Im_2$ compressed and stored in the temporary storage file TIm is then decompressed as a decompressed line drawing image $Im_{2A}$. Since the line drawing image $Im_2$ is reversibly compressed, the decompressed line drawing image $Im_{2A}$ is identical to the original line drawing image $Im_2$.

In the first embodiment, as exemplified in FIG. 10, the first image layer $Ly_1$, the second image layer $Ly_2$, and the third image layer $Ly_3$ are generated based on the decompressed input image $Im_{0A}$. At this time, an area corresponding to the line drawing image $Im_2$ included in the input image $Im_0$ is specified as a target area in the decompressed input image $Im_{0A}$ based on the decompressed line drawing image $Im_{2A}$, to correct a surround of the target area. Such correction cancels out the changes due to irreversible compression and decompression included in the decompressed input image $Im_{0A}$, thereby enhancing the image quality of the first image layer $Ly_1$, the second image layer $Ly_2$, and the third image layer $Ly_3$.

According to the procedure illustrated in FIGS. 9 and 10, the line drawing image $Im_2$ is generated before the temporary storage file TIm is created. Therefore, as exemplified in FIG. 10, the first image layer $Ly_1$, the second image layer $Ly_2$, and the third image layer $Ly_3$ are generated from a combination of the decompressed input image $Im_{0A}$ and the decompressed line drawing image $Im_{2A}$. As described above with reference to FIG. 9, the input image $Im_0$ irreversibly compressed is read from the temporary storage file TIm and decompressed as the decompressed input image $Im_{0A}$. The line drawing image $Im_2$ reversibly compressed is read from the temporary storage file TIm and decompressed as the decompressed line drawing image $Im_{2A}$.

According to the first embodiment, the process for creating the highly compressed PDF file FIm is increased in speed. Specifically, in the procedure of creating the highly compressed PDF file FIm described above with reference to FIG. 2, a subsequent input image $Im_0$ is processed after a highly compressed PDF file FIm is created from the prior input image $Im_0$. By contrast, in the procedure of creating the high compression PDF file FIm according to the first embodiment illustrated in FIGS. 9 and 10, the input image $Im_0$ and the line drawing image $Im_2$ extracted from the input image $Im_0$ are compressed and stored in the temporary storage file TIm, thereby allowing the subsequent input image $Im_0$ to be processed.

Figure 11:
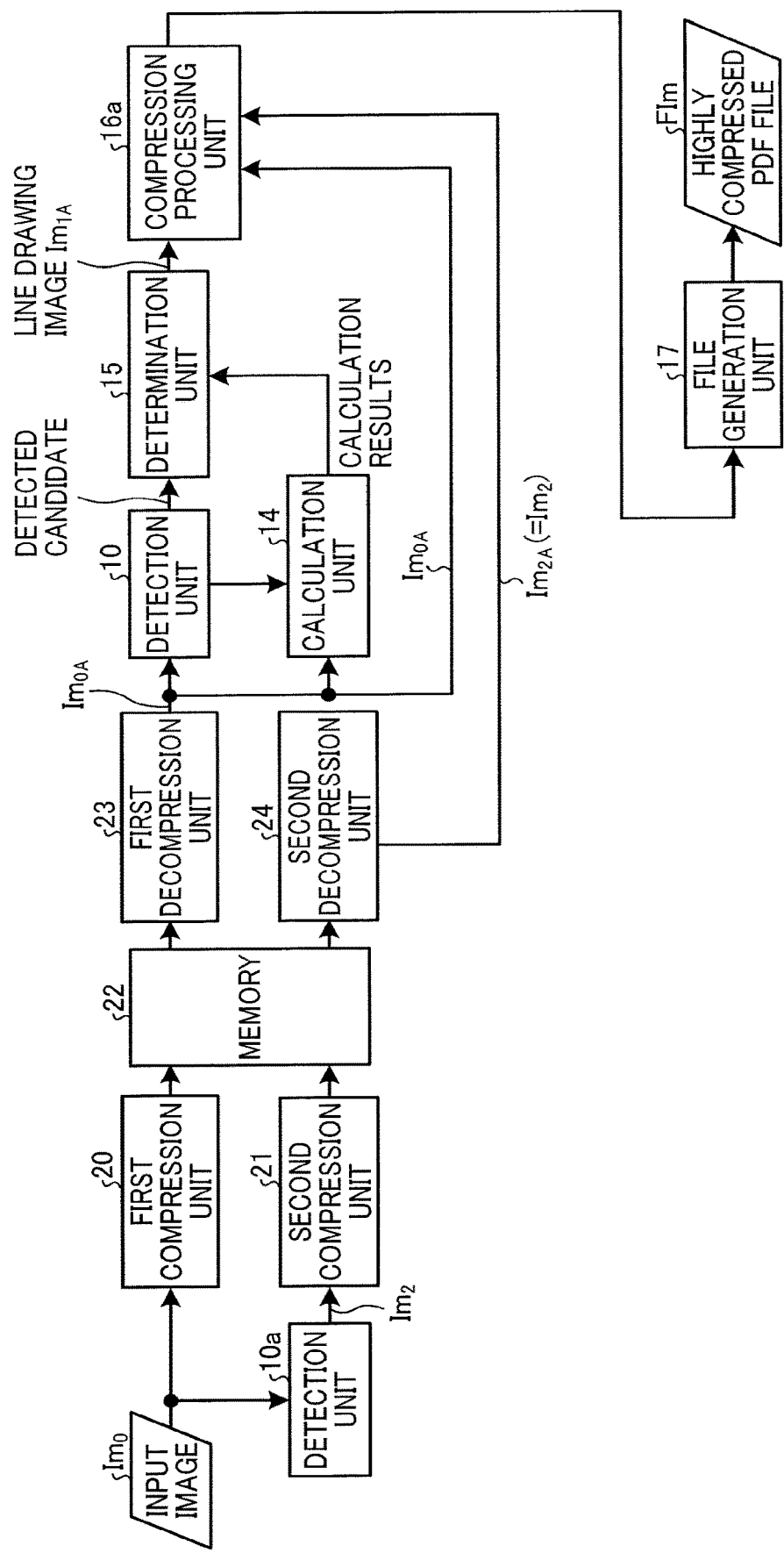
FIG. 11 is a functional block diagram illustrating a functional configuration of an image processing apparatus according to the first embodiment of the present disclosure.

Referring now to FIG. 11, a description is given of a functional configuration of the image forming apparatus 100 as an image processing apparatus according to the first embodiment of the present disclosure.

FIG. 11 is a functional block diagram illustrating the functional configuration of the image forming apparatus 100 according to the first embodiment of the present disclosure.

Note that, in FIGS. 3 and 11, for the sake of simplicity, like reference numerals are given to identical or corresponding constituent elements having substantially the same functions. Redundant descriptions thereof are herein omitted unless otherwise required.

Similarly, to the configuration illustrated in FIG. 3, the image forming apparatus 100 of FIG. 11 includes the detection unit 10, the calculation unit 14, the determination unit 15, and the file generation unit 17. Different from the configuration illustrated in FIG. 3, the image forming apparatus 100 of FIG. 11 includes a compression processing unit 16a having a function in addition to the function of the compression processing unit 16 illustrated in FIG. 3. A detailed description of the additional function is deferred.

The image forming apparatus 100 of FIG. 11 further includes a detection unit 10a, a first compression unit 20, a second compression unit 21, a memory 22, a first decompression unit 23, and a second decompression unit 24. The input image $Im_0$ is input into the first compression unit 20 and the detection unit 10a. The detection unit 10a has substantially the same configuration as the configuration of the detection unit 10 described above with reference to FIG. 4. That is, the detection unit 10a includes the edge detection unit 11, the edge enhancement unit 12, and the candidate line drawing detection unit 13. The detection unit 10a performs, on the input image $Im_0$, substantially the same process as the process performed by the detection unit 10 described above, to output a detected candidate from the candidate line drawing detection unit 13. Thus, the detection unit 10a serves as a first detection unit. The detected candidate is herein used as the line drawing image $Im_2$. The line drawing image $Im_2$ is input into the second compression unit 21.

The first compression unit 20 irreversibly compresses the input image $Im_0$ by an irreversible compression method serving as a first compression method. Thus, the first compression unit 20 serves as a first compression processing unit. The first compression method employed by the first compression unit 20 for the irreversible compression or lossy compression includes, e.g., the JPEG method. Note that the compression method applicable to the first compression unit 20 is not limited to the JPEG method. The input image $Im_0$ compressed by the first compression unit 20 (herein serving as an irreversibly compressed image or a first compressed image) is input into the memory 22.

The second compression unit 21 reversibly compresses, by a reversible compression method serving as a second compression method, the line drawing image $Im_2$ output from the detection unit 10a. Thus, the second compression unit 21 serves as the first compression processing unit. The second compression method employed by the second compression unit 21 for the reversible compression or lossless compression includes, e.g., the MMR method. Note that the compression method applicable to the second compression unit 21 is not limited to the MMR method. That is, the second compression unit 21 may reversibly compresses the line drawing image $Im_2$ by another compression method.

The line drawing image $Im_2$ compressed by the second compression unit 21 (herein serving as a reversibly compressed image or a second compressed image) is input into the memory 22. That is, the memory 22 receives the input image $Im_0$ (i.e., first compressed image) and the line drawing image $Im_2$ (i.e., second compressed image) from the first compression unit 20 and the second compression unit 21, respectively. The memory 22 stores, in the temporary storage file TIm, the input image $Im_0$ (i.e., first compressed image) and the line drawing image $Im_2$ (i.e., second compressed image) thus received. The memory 22 then stores the temporary storage file TIm in a recording medium. For example, referring to FIG. 1, the memory 22 stores the temporary storage file TIm storing the input image $Im_0$ (i.e., first compressed image) and the line image $Im_2$ (i.e., second compressed image) in the storage 1120. Note that, the memory 22 may store the input image $Im_0$ (i.e., first compressed image) and the line drawing image $Im_2$ (i.e., second compressed image) in the common temporary storage file TIm or in different temporary storage files.

The temporary storage file TIm is read from the memory 22, allowing the input image $Im_0$ (i.e., first compressed image) to be input into the first decompression unit 23 from the temporary storage file TIm. The first decompression unit 23 receives and decompresses the input image $Im_0$ (i.e., first compressed image) by a decompression method corresponding to the first compression method. The first decompression unit 23 then outputs, as a decompressed input image $Im_{OA}$, the input image $Im_0$ thus decompressed. Thus, the first decompression unit 23 serves as a decompression processing unit. As described above, the decompressed input image $Im_{OA}$ includes changes caused by the irreversible compression and decompression of the original input image $Im_0$.

Meanwhile, the temporary storage file TIm is read from the memory 22, allowing the compressed line drawing image $Im_2$ is input into the second decompression unit 24 from the temporary storage file TIm. The second decompression unit 24 receives and decompresses the compressed line drawing image $Im_2$ by a decompression method corresponding to the second compression method. The second decompression unit 24 then outputs, as a decompressed line drawing image $Im_{2A}$, the line drawing image $Im_2$ thus decompressed.

Thus, the second decompression unit 24 serves as the decompression processing unit. As described above, the decompressed line drawing image $Im_{2A}$ is identical to the original line drawing image $Im_2$. The decompressed line drawing image $Im_{2A}$ is input into the compression processing unit 16a from the second decompression unit 24.

On the other hand, the decompressed input image $Im_{OA}$ is input into the detection unit 10, the calculation unit 14, and the compression processing unit 16a from the first decompression unit 23. As described above with reference to the flowchart of FIG. 5, the detection unit 10 detects a candidate line drawing from the decompressed input image $Im_{OA}$ and outputs the detected candidate to the determination unit 15 and the calculation unit 14. As described above with reference to the flowchart of FIG. 6, the calculation unit 14 calculates color information of the candidate line drawing and size information such as line width information of the candidate line drawing based on the detected candidate, and outputs the calculation results to the determination unit 15.

As described above with reference to the flowchart of FIG. 7, the determination unit 15 determines a line drawing area in the decompressed input image $Im_{OA}$, based on the detected candidate output from the detection unit 10 and the calculation results output from the calculation unit 14. The determination unit 15 outputs, as a line drawing image $Im_{1A}$, an image of the line drawing area thus determined. The compression processing unit 16a receives the line drawing image $Im_{1A}$ from the determination unit 15.

The compression processing unit 16a generates a first image layer $Ly_1$, a second image layer $Ly_2$, and a third image layer $Ly_3$ based on the decompressed input image $Im_{OA}$ and the line drawing image $Im_{1A}$. Specifically, the compression processing unit 16a corrects the decompressed input image $Im_{OA}$ based on the line drawing image $Im_{2A}$. The compression processing unit 16a uses the decompressed input image $Im_{OA}$ thus corrected (hereinafter referred to as a correct decompressed input image $Im_{OB}$) to generate the first image layer $Ly_1$, a second image layer $Ly_2$, and a third image layer $Ly_3$.

Figure 12:
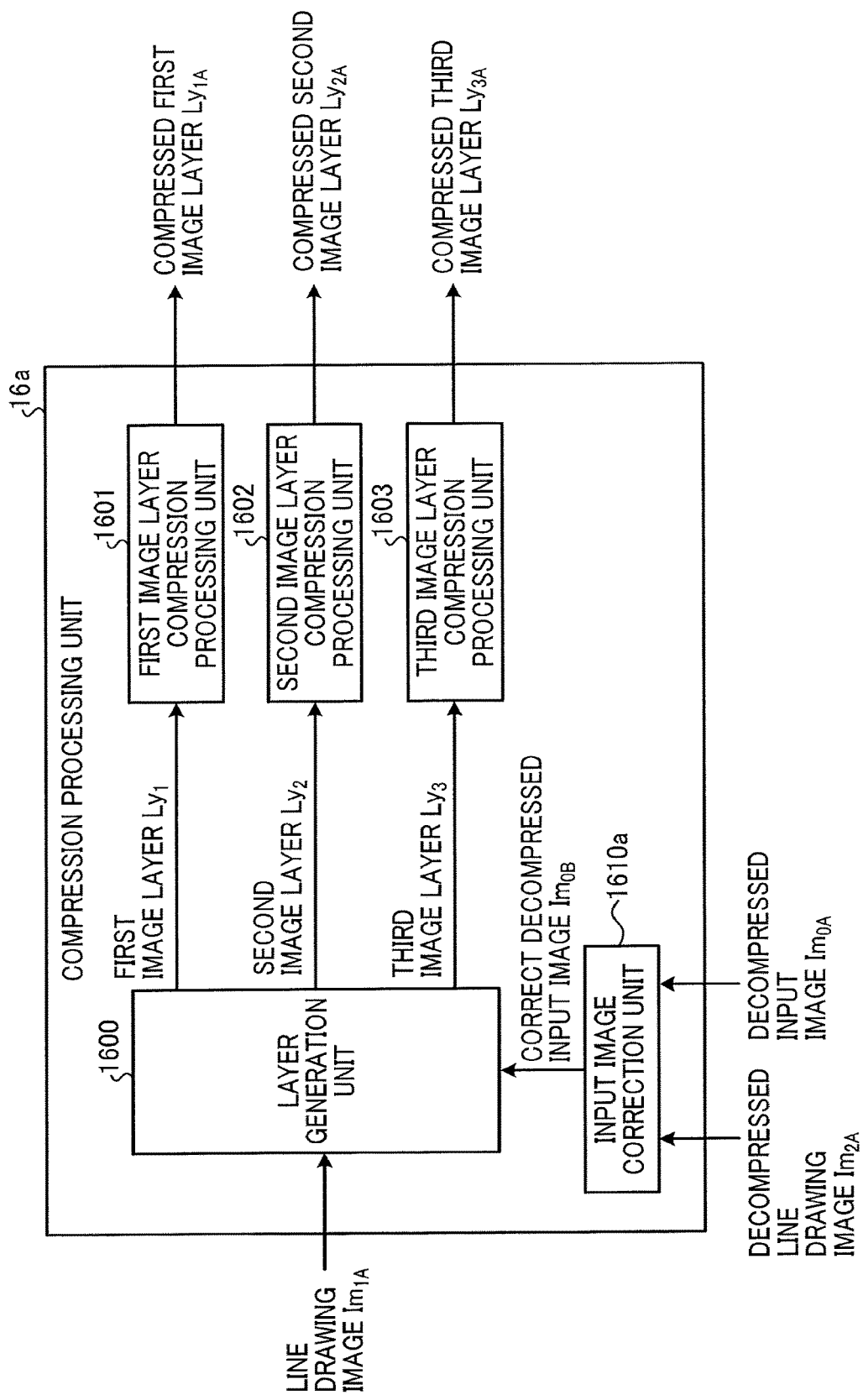
FIG. 12 is a functional block diagram illustrating a function of a compression processing unit according to the first embodiment of the present disclosure.

Referring now to FIG. 12, a description is given of the function of the compression processing unit 16a according to the first embodiment of the present disclosure.

FIG. 12 is a functional block diagram illustrating the function of the compression processing unit 16a according to the first embodiment of the present disclosure.

Note that, in FIGS. 8 and 12, for the sake of simplicity, like reference numerals are given to identical or corresponding constituent elements having substantially the same functions. Redundant descriptions thereof are herein omitted unless otherwise required.

Compared to the configuration of the compression processing unit 16 illustrated in FIG. 8, the compression processing unit 16a illustrated in FIG. 12 further includes an input image correction unit 1610a.

In the compression processing unit 16a, the layer generation unit 1600 receives the line drawing image $Im_{1A}$ from the determination unit 15. Meanwhile, the input image correction unit 1610a receives the decompressed input image $Im_{OA}$ from the first decompression unit 23 and the decompressed line drawing image $Im_{2A}$ from the second decompression unit 24.

The input image correction unit 1610a specifies a target area in the decompressed input image $Im_{OA}$ based on the decompressed line drawing image $Im_{2A}$. As described above, the target area corresponds to the line drawing image $Im_2$ included in the input image $Im_0$. Then, by use of the decompressed input image $Im_{OA}$, the input image correction unit 1610a corrects at least the surround of the area corresponding to the line drawing image $Im_2$ specified as the target area in the decompressed input image $Im_{OA}$. Thus, the input image correction unit 1610a serves as a first correction unit. As an example of correction, the input image correction unit 1610a solidifies the surround of the target area (i.e., area corresponding to the line drawing image $Im_2$) in the decompressed input image $Im_{OA}$. In other words, the input image correction unit 1610a corrects, as a solid surround, the surround of the target area in the decompressed input image $Im_{OA}$.

Then, the input image correction unit 1610a outputs, as a correct decompressed input image $Im_{OB}$ serving as a corrected image, the decompressed input image $Im_{OA}$ thus corrected to the layer generation unit 1600. Based on the line drawing image $Im_{1A}$ and the correct decompressed input image $Im_{OB}$, the layer generation unit 1600 generates a first image layer $Ly_1$, a second image layer $Ly_2$, and a third image layer $Ly_3$. Thus, the layer generation unit 1600 serves as a generation unit.

The first image layer compression processing unit 1601, the second image layer compression processing unit 1602, and the third image layer compression processing unit 1603 respectively compress the first image layer $Ly_1$, the second image layer $Ly_2$, and the third image layer $Ly_3$ generated by the layer generation unit 1600, according to the compression methods suitable for the respective images. Then, the first image layer compression processing unit 1601, the second image layer compression processing unit 1602, and the third image layer compression processing unit 1603 outputs the first image layer $Ly_1$, the second image layer $Ly_2$, and the third image layer $Ly_3$ thus compressed as a first compressed image layer $Ly_{1A}$, the second compressed image layer $Ly_{2A}$, and the third compressed image layer $Ly_{3A}$, respectively. Thus, the first image layer compression processing unit 1601, the second image layer compression processing unit 1602, and the third image layer compression processing unit 1603 collectively serve as a second compression processing unit. The file generation unit 17 receives the first compressed image layer $Ly_{1A}$, the second compressed image layer $Ly_{2A}$, and the third compressed image layer $Ly_{3A}$ from the compression processing unit 16a. Based on the first compressed image layer $Ly_{1A}$, the second compressed image layer $Ly_{2A}$, and the third compressed image layer $Ly_{3A}$, the file generation unit 17 generates a highly compressed PDF file FIm as an output file.

As described above, in the first embodiment, the input image correction unit 1610a corrects the surround of the target area (i.e., area corresponding to the line drawing image $Im_2$) in the decompressed input image $Im_{OA}$. Such correction suppresses image quality degradation that may be caused by lossy compression or irreversible compression of the input image $Im_0$ performed by the first compression unit 20 while preventing separation of a design portion as a line drawing (e.g., text). Accordingly, the highly compressed PDF file FIm is generated at high quality.

Note that, for example, the CPU 1100 executes an image processing program according to the present embodiment, thereby implementing the detection unit 10a, the first compression unit 20, the second compression unit 21, the memory 22, the first decompression unit 23, the second decompression unit 24, the detection unit 10, the calculation unit 14, the determination unit 15, the compression processing unit 16a, and the file generation unit 17 illustrated in FIG. 11. Alternatively, for example, provided that the image processing/engine controller 1130 has substantially the same configuration as a configuration of a computer including, e.g., a CPU, a ROM, and a RAM, the CPU of the image processing/engine controller 1130 may execute the image processing program according to the present embodiment, thereby implementing the detection unit 10a, the first compression unit 20, the second compression unit 21, the memory 22, the first decompression unit 23, the second decompression unit 24, the detection unit 10, the calculation unit 14, the determination unit 15, the compression processing unit 16a, and the file generation unit 17 illustrated in FIG. 11.

A hardware circuit may be constructed of a part or all of the detection unit 10a, the first compression unit 20, the second compression unit 21, the memory 22, the first decompression unit 23, the second decompression unit 24, the detection unit 10, the calculation unit 14, the determination unit 15, the compression processing unit 16a, and the file generation unit 17 operating in cooperation with each other.

A non-transitory, computer-readable storage medium or recording medium, such as a compact disk (CD), a flexible disk (FD), and a digital versatile disc (DVD), stores, in an installable or executable format file, the image processing program or image processing program code for implementing each function of the image forming apparatus 100 according to the embodiments of the present disclosure. Thus, the image processing program is providable. Alternatively, the image processing program may be stored in a computer connected to a network such as Internet. In such a case, the image processing program may be downloaded via the Internet, thereby being providable. The image processing program may be provided or distributed via a network such as the Internet.

The image processing program is constructed of modules including the detection unit 10a, the first compression unit 20, the second compression unit 21, the memory 22, the first decompression unit 23, the second decompression unit 24, the detection unit 10, the calculation unit 14, the determination unit 15, the compression processing unit 16a, and the file generation unit 17. As actual hardware, the CPU 1100 reads the image processing program code from a storage medium such as the storage 1120 and executes the image processing program, thereby loading and generating, on a main storage device such as the RAM 1102, the modules described above, namely, the detection unit 10a, the first compression unit 20, the second compression unit 21, the memory 22, the first decompression unit 23, the second decompression unit 24, the detection unit 10, the calculation unit 14, the determination unit 15, the compression processing unit 16a, and the file generation unit 17.

<Detailed Correction Process According to First Embodiment>

Referring now to FIGS. 13A to 15, a description is given of a correction process performed by the input image correction unit 1610a according to the first embodiment of the present disclosure.

Figure 13A:
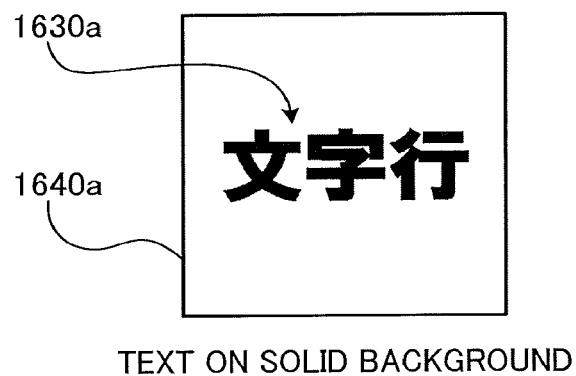
FIG. 13A is a plan view of an image including a line drawing image formed on a solid background.

FIG. 13A is a plan view of an image 1640a including a line drawing image 1630a (in this case, a text image) formed on a solid background (i.e., single colored background).

The image 1640a corresponds to the input image $Im_0$ illustrated in FIG. 12, for example. In the example of FIG. 13A, the image 1640a maintains the solid background as a portion other than the line drawing image 1630a having a clear outline.

Figure 13B:
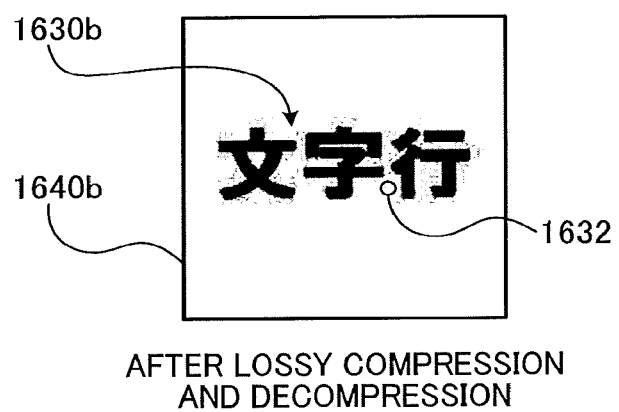
FIG. 13B is a plan view of an image equivalent to the image of FIG. 13A irreversibly compressed and decompressed.

FIG. 13B is a plan view of an image 1640b equivalent to the image 1640a of FIG. 13A irreversibly compressed by the first compression unit 20 and decompressed by the first decompression unit 23, for example.

Generally, in the JPEG method as an example of irreversible compression, an image is divided into blocks of a given size and encoded in units of blocks. Therefore, noise called block noise may occur at boundaries of the blocks. In addition, the image is transformed to frequency domain by discrete cosine transformation per block for coarser quantization with high frequency components. Therefore, noise called mosquito noise may occur in an area subjected to steep changes, such as edges of the image.

In the example of FIG. 13B, the lossy compression and decompression affects and reduces the clarity of the outline of the line drawing image 1630b, compared to the line drawing image 1630a of FIG. 13A, while generating mosquito noise 1632 around the line drawing image 1630b.

When, e.g., the layer generation unit 1600 of FIG. 8 performs image area separation on the image 1640b, the mosquito noise 1632 remains on the third image layer $Ly_3$. As a consequence, when the third image layer compression processing unit 1603 compresses the third image layer $Ly_3$ including the mosquito noise 1632 by, e.g., the JPEG method and an image of a highly compressed PDF file FIm including the third image layer $Ly_3$ thus compressed (i.e., third compressed image layer $Ly_{3A}$) is displayed, the influence of the mosquito noise 1632 may appear on the image thus displayed.

To address such a situation, in the first embodiment, the position or area corresponding to the line drawing image $Im_2$ in the decompressed input image $Im_{OA}$ is specified based on the decompressed line drawing image $Im_{2A}$ to correct at least the surround of the position corresponding to the line drawing image $Im_2$ thus specified in the decompressed line drawing image $Im_{2A}$. Such correction removes, from the decompressed input image $Im_{OA}$, the mosquito noise 1632 generated around the position corresponding to the line drawing image $Im_2$. Accordingly, an image of a highly compressed PDF file FIm including the third compressed image layer $Ly_{3A}$ is displayed at high quality.

In addition, compared to compression without removal of the mosquito noise 1632, the compression efficiency is enhanced by the removal of the mosquito noise 1632 from the surround of the position corresponding to the line drawing image $Im_2$ in the decompressed input image $Im_{OA}$ to be compressed. Accordingly, compression after the removal of the mosquito noise 1632 leads to generation of a reduced-size of highly compressed PDF file FIm including the compressed third image layer $Ly_{3A}$.

Figure 14:
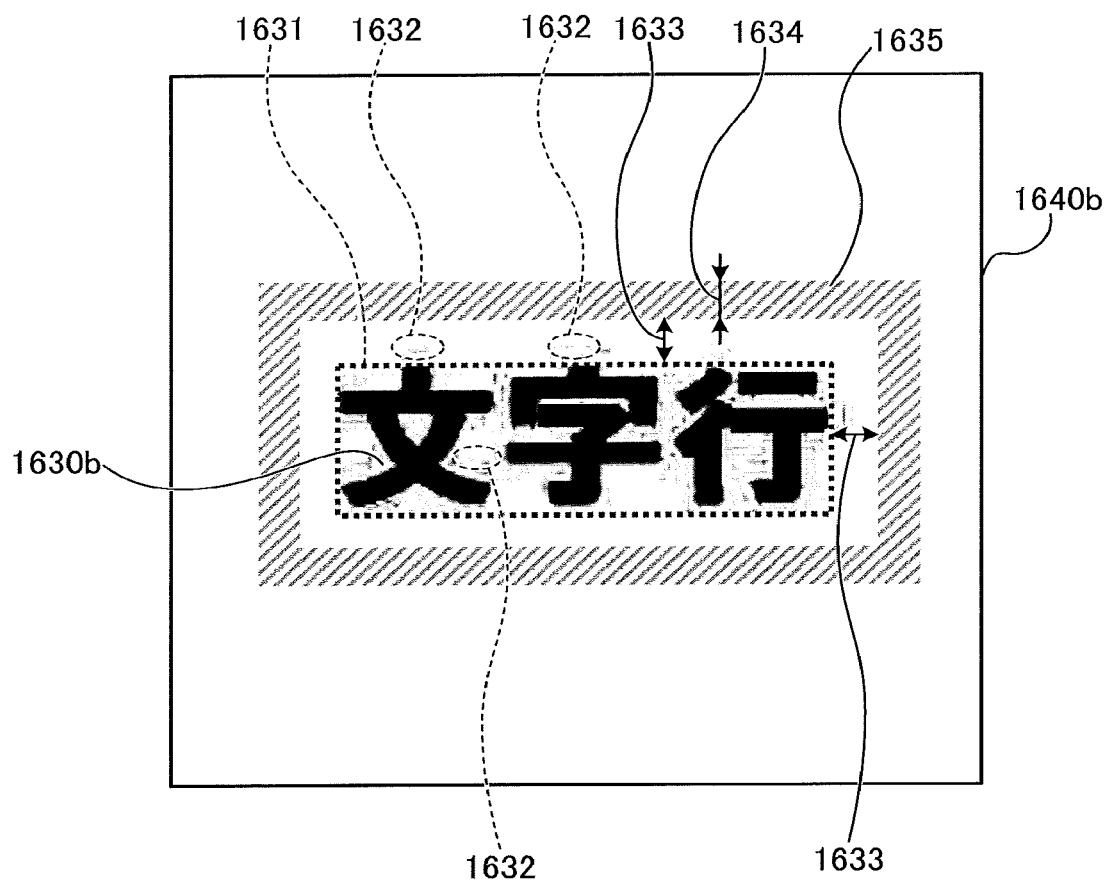
FIG. 14 is a plan view of an image corresponding to the image of FIG. 13B as a correction target.

Referring now to FIG. 14, a detailed description is given of the correction process according to the first embodiment.

FIG. 14 is a plan view of an image corresponding to the image 1640b of FIG. 13B as a correction target.

In the image, the mosquito noise 1632 appears around the line drawing image 1630b. A line rectangle 1631 is a rectangle that circumscribes the line drawing image 1630b. As described above, the position of the line rectangle 1631 in the decompressed input image $Im_{OA}$ is set or specified based on the decompressed line drawing image $Im_{2A}$.

In the first embodiment, the input image correction unit 1610a provides a solid background determination area 1635, which is an area for determining the solid background, around the line rectangle 1631. To reduce the influence of the mosquito noise 1632, the solid background determination area 1635 is provided outside the line rectangle 1631 at an interval corresponding to an offset 1633. The offset 1633 may have a width of a plurality of pixels less than twenty. The width of the offset 1633 is settable according to compression and decompression methods applied to the input image $Im_0$, such as the first compression method and the compressibility.

On the other hand, a wider solid background determination area 1635 may enhance the accuracy of determination of the solid portion or background. However, when another line rectangle or a design area exists near the solid background determination area 1635, such a line rectangle or a design area might be erroneously included in the solid background determination area 1635. Note that the solid background determination area 1635 herein has a width 1634 of two pixels. The width 1634 is hereinafter referred to as a solid background determination width 1634.

Figure 15:
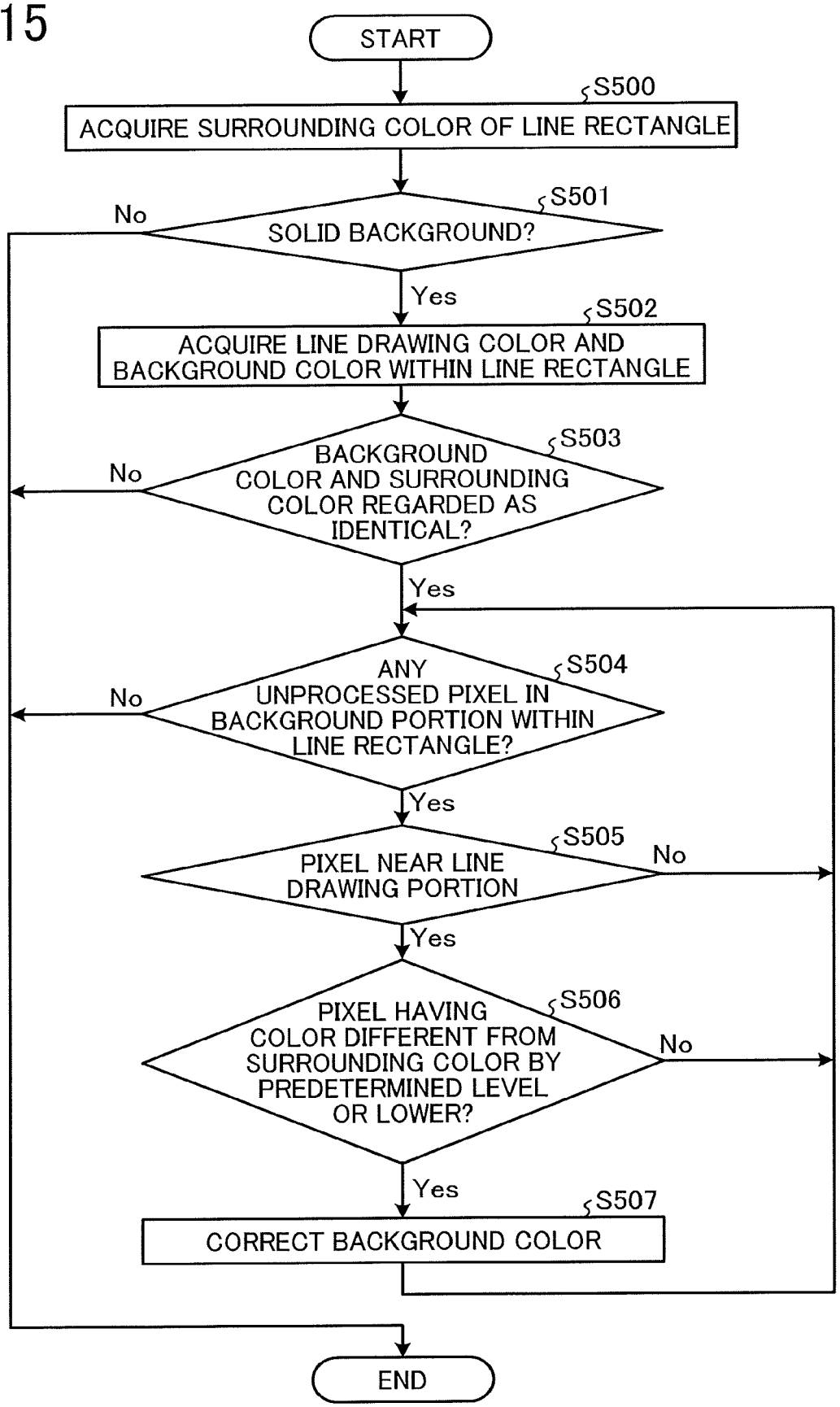
FIG. 15 is a flowchart illustrating a correction process performed by an input image correction unit according to the first embodiment of the present disclosure.

Referring now to FIG. 15, a description is given of a flow of the correction process performed by the input image correction unit 1610a according to the first embodiment of the present disclosure.

FIG. 15 is a flowchart illustrating the correction process performed by the input image correction unit 1610a according to the first embodiment of the present disclosure.

Note that, with respect to color information, each of the RGB values is herein represented by tones from 0 to 255.

In step S500, the input image correction unit 1610a acquires a color around the line rectangle 1631 (hereinafter referred to as a surrounding color).

Specifically, in step S500, the input image correction unit 1610a sets, in the decompressed input image $Im_{OA}$ as a target, the solid background determination area 1635 described above with reference to FIG. 14, thereby acquiring a color within the solid background determination area 1635. For example, the input image correction unit 1610a acquires the RGB values for each pixel within the solid background determination area 1635.

In step S501, the input image correction unit 1610a determines whether the solid background determination area 1635 is a solid background based on the RGB values acquired in step S500. When the input image correction unit 1610a determines that the solid background determination area 1635 is not a solid background (NO in step S501), the input image correction unit 1610a completes a sequence of processes according to the flowchart of FIG. 15.

Specifically, for example, the input image correction unit 1610a determines whether the solid background determination area 1635 is a solid background based on variance calculated from the RGB values acquired. In such a case, the input image correction unit 1610a calculates the variance of each of the RGB values acquired. When each variance is equal to or less than a threshold, the input image correction unit 1610a determines that the solid background determination area 1635 is a solid background. Note that a common threshold or individual thresholds may be set for the RGB values.

Alternatively, for example, the input image correction unit 1610a may determine whether the solid background determination area 1635 is a solid background based on averages calculated from the RGB values acquired. In such a case, the input image correction unit 1610a calculates respective averages of the RGB values as RGB averages. Then, for each pixel within the solid background determination area 1635, the input image correction unit 1610a calculates respective differences, as RGB differences, between the RGB values and the RGB averages. When the input image correction unit 1610a determines that each of the RGB differences is equal to or less than a threshold for each pixel within the solid background determination area 1635, the input image correction unit 1610a determines that the solid background determination area 1635 is a solid background. The threshold may be a tone of about 70, for example. Note that a common threshold or individual thresholds may be set for the RGB values.

When the calculated averages construct a color close to white or black, for example, the input image correction unit 1610a may determine whether the solid background determination area 1635 is a solid background based on the averages alone. For example, when each of the RGB averages is a tone of 240 or greater, the input image correction unit 1610a determines that the solid background determination area 1635 is a solid background close to white. By contrast, when each of the RGB averages is a tone of 50 or less, the input image correction unit 1610a determines that the solid background determination area 1635 is a solid background close to black.

Alternatively, the input image correction unit 1610a may calculate the number of colors of the solid background determination area 1635 based on the RGB values acquired, to determine whether the solid background determination area 1635 is a solid background based on the number of colors thus calculated.

Referring to the flowchart of FIG. 15, when the input image correction unit 1610a determines that the solid background determination area 1635 is a solid background in step S501 (YES in step S501), the input image correction unit 1610a proceeds to step S502.

In step S502, the input image correction unit 1610a acquires a color of a line drawing portion (hereinafter referred to as a line drawing color) and a color of a background portion (hereinafter referred to as a background color) other than the line drawing portion within the line rectangle 1631.

Based on the decompressed line drawing image $Im_{2A}$ received from the second decompression unit 24, the input image correction unit 1610a specifies the line drawing portion within the line rectangle 1631. More specifically, based on positional or coordinate information indicating where the original line drawing image $Im_2$ of the decompressed line drawing image $Im_{2A}$ is positioned in the input image $Im_0$, the input image correction unit 1610a specifies the line drawing portion within the line rectangle 1631. The positional information is acquired by, e.g., the detection unit 10a.

As described above, the line drawing image $Im_2$ extracted from the input image $Im_0$ is reversibly compressed and then decompressed as the decompressed line drawing image $Im_{2A}$. In short, the decompressed line drawing image $Im_{2A}$ is identical to the line drawing image $Im_2$. Accordingly, the input image correction unit 1610a specifies the line drawing portion within the line rectangle 1631 without being affected by the irreversible compression performed by the first compression unit 20.

With respect to the line drawing color, the irreversible compression performed by the first compression unit 20 may dull an edge of the line drawing portion. In a case in which the input image $Im_0$ is an image read from an original by the scanner 1131, the modulation transfer function (MTF) characteristics of the scanner 1131 may also dull the edge of the line drawing portion. That is, the irreversible compression and the MTF may affect and dull the edge of the line drawing portion. In consideration of such a dull edge of the line drawing portion, the input image correction unit 1610a preferably acquires a color inside the line drawing portion as the line drawing color. Specifically, for example, when the line drawing portion has a width of nine pixels, the input image correction unit 1610a may acquire the color of the line drawing portion based on a central pixel of the nine pixels or a plurality of pixels including the central pixel and pixels situated on both sides of the central pixels.

Acquisition of the color inside the line drawing portion may be difficult in a case in which the line drawing portion includes a thin-line character. In such a case, when the line drawing portion has a lower brightness than the surround thereof, the input image correction unit 1610a acquires a color of a "swamp" of the line drawing portion, that is, a darkest or lowest-brightness color of the line drawing portion with respect to the surrounding color. By contrast, when the line drawing portion has a higher brightness than the surround thereof, the input image correction unit 1610a acquires a color of a "ridge" of the line drawing portion, that is, a lightest or highest-brightness color of the line drawing portion with respect to the surrounding color. Such acquisition of the line drawing color reduces the influence of a dull edge of the line drawing portion.

With respect to the background color, the input image correction unit 1610a calculates the RGB averages of all the pixels constructing the background portion, which is a portion other than the portion specified as the line drawing portion within the line rectangle 1631. The RGB averages represent the background color. Alternatively, the input image correction unit 1610a may acquire the RGB values of pixels situated one to several pixels apart from the line drawing portion within the line rectangle 1631, thereby calculating the RGB averages.

Alternatively, when a tone difference between the color of the line drawing portion and the color of a pixel of the background portion adjacent to the line drawing portion is equal to or less than a threshold, the input image correction unit 1610a may acquire the RGB values of pixels situated one to several pixels apart from the line drawing portion, thereby calculating the RGB averages. This is a response to a case in which the background portion starts from the vicinity of the line drawing portion, (specifically within one to several pixels from the line drawing portion), for example, a case in which a line drawing portion is marked with a highlighter or the like. For example, when the tone difference between a pixel of the line drawing portion and a pixel adjacent to the line drawing portion of the background portion is 50 or less, the input image correction unit 1610a may acquire a pixel situated one pixel apart from the line drawing portion for calculation of the RGB averages.

Note that the vicinity of the line drawing portion refers to a pixel position that is not adjacent to the line drawing portion and is situated at a distance within two to several pixels (e.g., within two pixels) from the line drawing portion.

In step S503, the input image correction unit 1610a determines whether the background color and the surrounding color are regarded as identical or the same color. More specifically, the input image correction unit 1610a determines whether a tone difference between each of the RGB values of the background color and each of the RGB values of the surrounding color is equal to or less than a threshold. Since the background color includes the influence of the mosquito noise 1632, a lower tone (e.g., 30) is preferably given as the threshold.

When the input image correction unit 1610a determines that the tone difference exceeds the threshold and that the background color and the surrounding color are not regarded as identical (NO in step S503), the input image correction unit 1610a completes a sequence of processes according to the flowchart of FIG. 15. On the other hand, when the input image correction unit 1610a determines that the background color and the surrounding color are regarded as identical (YES in step S503), the input image correction unit 1610a proceeds to step S504.

In step S504, the input image correction unit 1610a determines whether there is an unprocessed pixel in the background portion within the line rectangle 1631. When the input image correction unit 1610a determines that all the pixels are processed in the background portion within the line rectangle 1631 (NO in step S504), the input image correction unit 1610a completes a sequence of processes according to the flowchart of FIG. 15. On the other hand, when the input image correction unit 1610a determines that there is at least one unprocessed pixel in the background portion within the line rectangle 1631 (YES in step S504), the input image correction unit 1610a proceeds to step S505.

Through the steps S505 and S506, the input image correction unit 1610a replaces the unprocessed pixel with a pixel having the surrounding color in step S507 to correct the background portion to be solid.

In step S505, the input image correction unit 1610a extracts, as a processing target pixel, one pixel out of the at least one unprocessed pixel within the line rectangle 1631 to determine whether the processing target pixel thus extracted is a pixel near the line drawing portion within the line rectangle 1631. For example, the input image correction unit 1610a determines whether the processing target pixel is situated at a distance within two pixels from the line drawing portion. When the input image correction unit 1610a determines that the processing target pixel is not a pixel near the line drawing portion (NO in step S505), the input image correction unit 1610a returns to step S504 in which the input image correction unit 1610a processes the next unprocessed pixel within the line rectangle 1631. In such a case, the correction process in step S507 is not performed on the processing target pixel.

Alternatively, when the tone difference between each of the RGB values of the unprocessed pixel and each of the RGB values of the surrounding color is relatively small, for example, when the tone difference is within 30, the input image correction unit 1610a may replace the color of the unprocessed pixel with the surrounding color to solidify the background portion. The pixel subjected to solidification here is treated as a processed pixel and excluded from the determination in step S504.

On the other hand, when the input image correction unit 1610a determines that the processing target pixel is a pixel near the line drawing portion (YES in step S505), the input image correction unit 1610a proceeds to step S506.

In step S506, the input image correction unit 1610a determines whether a difference between the color of the processing target pixel and the surrounding color is equal to or less than a given value. More specifically, the input image correction unit 1610a determines whether a tone difference between each of the RGB values of the processing target pixel and each of the RGB values of the surrounding color is equal to or less than a threshold.

The mosquito noise 1632 affects a pixel near the line drawing portion, thereby increasing the tone difference between the pixel and the surrounding color. In a case in which the tone difference is very large, another image (e.g., design) may exist near the line drawing portion. Therefore, when the input image correction unit 1610a determines that the tone difference between each of the RGB values of the processing target pixel and each of the RGB values of the surrounding color exceeds the threshold (NO in step S506), the input image correction unit 1610a returns to step S504 in which the input image correction unit 1610a processes the next unprocessed pixel within the line rectangle 1631. In such a case, the correction process in step S507 is not performed on the processing target pixel.

Note that the threshold in step S506 may be a tone of about 70, for example. Note that a common threshold or individual thresholds may be set for the RGB values.

When the input image correction unit 1610a determines that the tone difference between each of the RGB values of the processing target pixel and each of the RGB values of the surrounding color is equal to or less than the threshold (YES in step S506), the input image correction unit 1610a proceeds to step S507.

In step S507, the input image correction unit 1610a replaces the processing target pixel with a pixel having the surrounding color to correct the background portion to be solid. Thereafter, the input image correction unit 1610a returns to step S504 for processing of a next unprocessed pixel.

Note that, in the present example, when the input image correction unit 1610a determines that the background color and the surrounding color are regarded as identical (YES in step S503), each of the pixels of the background portion is corrected according to the flow from step S504. Alternatively, for example, when the input image correction unit 1610a determines that the background color and the surrounding color are regarded as identical (YES in step S503), the input image correction unit 1610a may replace all the pixels of the background portion with pixels having the surrounding color, thereby solidifying the background portion and completing a sequence of processes according to the flowchart of FIG. 15.

<Advantageous Effects of Correction Process According to First Embodiment>

Referring now to FIGS. 16A to 18E, a description is schematically given of advantageous effects of the correction process according to the first embodiment of the present disclosure.

Figure 16A:
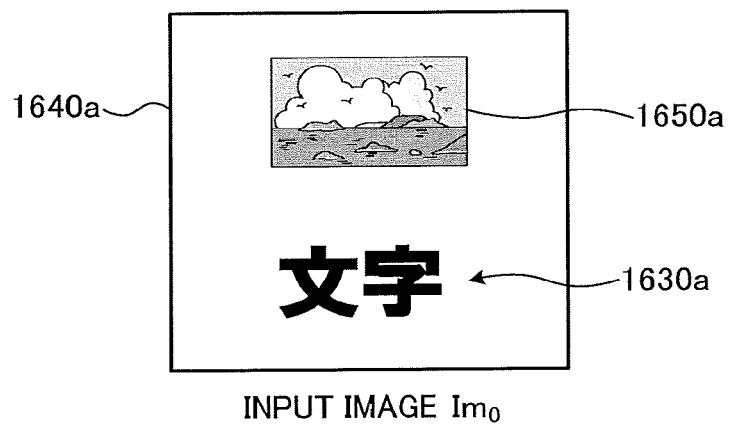
FIG. 16A is a plan view of an input image.
Figure 16B:
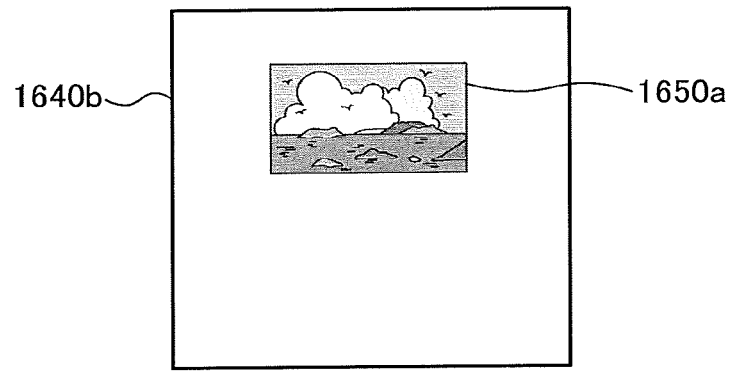
FIG. 16B is a plan view of an image equivalent to the input image of FIG. 16A from which a line drawing image is separated.
Figure 16C:
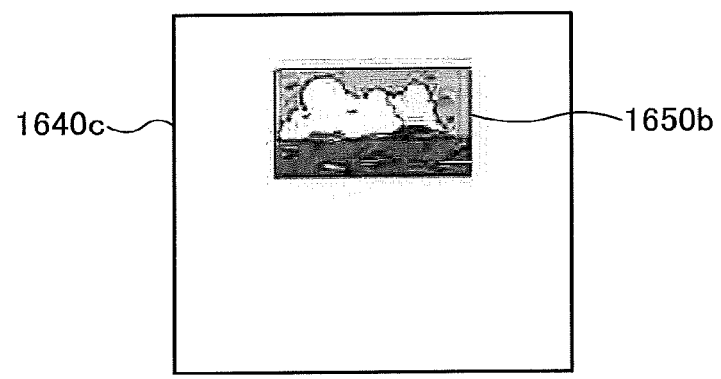
FIG. 16C is a plan view of an image equivalent to the input image of FIG. 16B after compression and decompression.

FIGS. 16A to 16C illustrate images generated upon creation of a highly compressed PDF file FIm of an input image $Im_O$ according to the procedure described above with reference to FIG. 2.

Specifically, FIG. 16A is a plan view of the image 1640a as the input image $Im_O$. In the example of FIG. 16A, the image 1640a as the input image $Im_O$ includes the line drawing image 1630a as a binary image and a design image 1650a as a multivalued image. FIG. 16A illustrates the line drawing image 1630a and the design image 1650a as clear images in the image 1640a. In addition, a background area as a background with respect to the line drawing image 1630a is a white, solid background (excluding the design image 1650a).

Referring to FIGS. 3 and 8, in the compression processing unit 16, the layer generation unit 1600 separates the line drawing image 1630a (i.e., line drawing image $Im_1$) from the image 1640a by image area separation, thereby generating the third image layer $Ly_3$.

FIG. 16B is a plan view of the image 1640b as the third layer image $Ly_3$ generated. In the image 1640b, the white, solid background includes an area corresponding to the line drawing image 1630a and the background area with respect to the line drawing image 1630a.

In the compression processing unit 16, the third image layer compression processing unit 1603 irreversibly compresses the image 1640b by, e.g., the JPEG method.

FIG. 16C is a plan view of an image 1640c equivalent to the image 1640b of FIG. 16B irreversibly compressed and decompressed. A design image 1650b corresponds to the design image 1650a that is dulled through the irreversible compression and decompression and surrounded by mosquito noise. On the other hand, the white, solid background including the area corresponding to the line drawing image 1630a and the background area with respect to the line drawing image 1630a in the image 1640b before compression remains as is after irreversible compression and decompression.

FIGS. 17A to 17E illustrate images generated upon creation of a highly compressed PDF file FIm of an input image $Im_O$ according to the procedure described above with reference to FIG. 2.

In the present example, the input image $Im_O$ is irreversibly compressed and decompressed as a decompressed input image $Im_{OA}$. A highly compressed PDF file FIm of the decompressed input image $Im_{OA}$ is created according to the procedure described above with reference to FIG. 2.

Figure 17A:
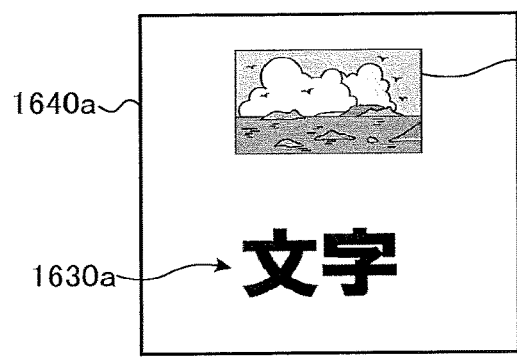
FIG. 17A is a plan view of the input image of FIG. 16A.

Specifically, FIG. 17A is a plan view of the image 1640a as the input image $Im_O$ substantially the same as the image 1640a illustrated in FIG. 16A. The image 1640a includes the line drawing image 1630a and the design image 1650a. The background area is a white, solid background.

Figure 17B:
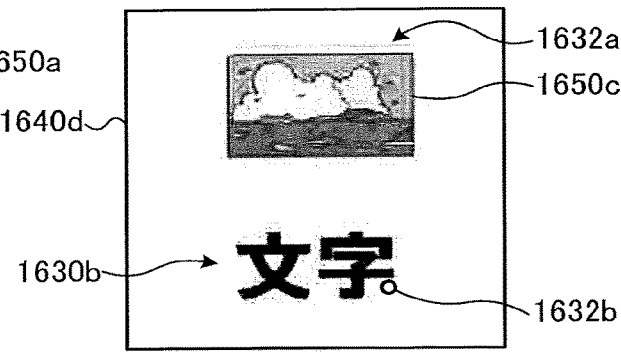
FIG. 17B is a plan view of an image equivalent to the input image of FIG. 17A irreversibly compressed and decompressed.

FIG. 17B is a plan view of an image 1640d as the decompressed input image $Im_{OA}$. That is, the image 1640d is equivalent to the image 1640a of FIG. 17A irreversibly compressed and decompressed. The image 1640d includes a line drawing image 1630b and a design image 1650c. The irreversible compression and decompression dulls the line drawing image 1630a and the design image 1650a in the image 1640a of FIG. 17A, resulting in the line drawing image 1630b and the design image 1650c in the image 1640d of FIG. 17B. In addition, mosquito noises 1632a and 1632b are generated in edge areas of the design image 1650c and the line drawing image 1630b, respectively.

Figure 17C:
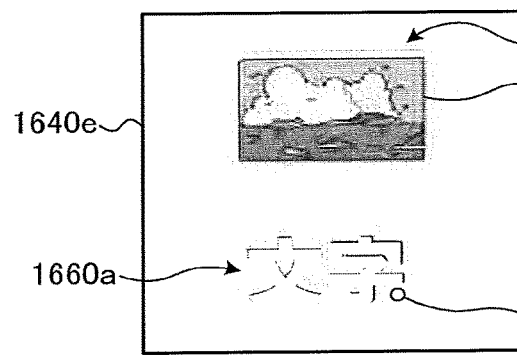
FIG. 17C is a plan view of an image equivalent to the input image of FIG. 17B from which an area corresponding to a line drawing image is extracted and removed.

FIG. 17C is a plan view of an image 1640e equivalent to the image 1640d of FIG. 17B from which an area corresponding to the line drawing image 1630a is extracted and removed by the layer generation unit 1600 of the compression processing unit 16, for example. In the image 1640e, the mosquito noise 1632b has failed to be removed and therefore remains in an area 1660a that includes the area corresponding to the line drawing image 1630a and the surrounding area. In the area 1660a, an area corresponding to an edge of the line drawing image 1630a includes an expanded portion of the original line drawing image 1630a that is dulled due to the irreversible compression and decompression.

The area 1660a in the image 1640e of FIG. 17C is corrected to suppress the influences of the mosquito noise 1632b generated in the area 1660a and the expanded portion of the line drawing image 1630a. Thereafter, the third image layer $Ly_3$ is generated. The correction includes, e.g., filling the area corresponding to the line drawing image 1630a with a color based on information on a design around the target area and the background area.

Figure 17D:
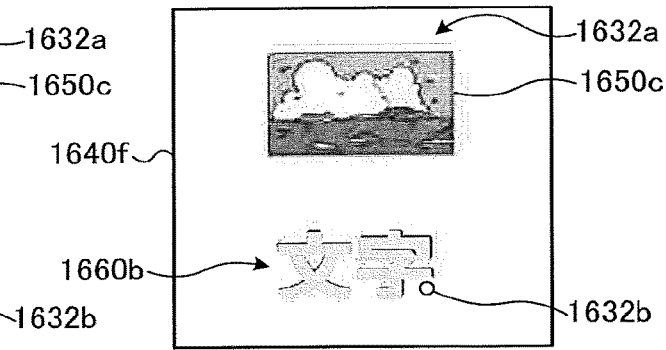
FIG. 17D is a plan view of an image equivalent to the input image of FIG. 17C in which the area corresponding to the line drawing image is filled.

FIG. 17D is a plan view of an image 1640f as the third image layer $Ly_3$. The image 1640f is equivalent to the image 1640e of FIG. 17C in which the area corresponding to the line drawing image 1630a is filled by use of an average based on the design around the target area and the background area. In such a case, the mosquito noise 1632b around the line drawing image 1630b is also used for calculation of the average. Therefore, in the image 1640f, the influence of the mosquito noise 1632b discolors an area corresponding to the line drawing image 1630a included in an area 1660b corresponding to the area 1660a, with respect to the area corresponding to the line drawing image 1630a included in the area 1660a.

Figure 17E:
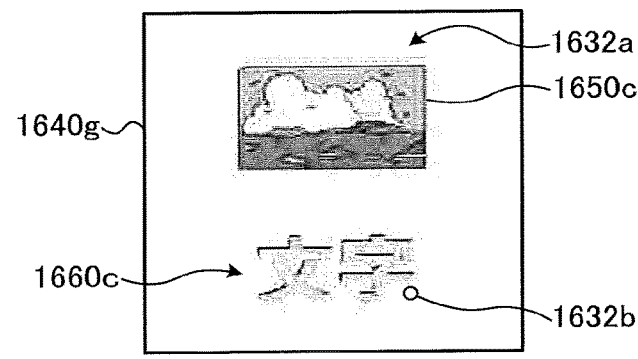
FIG. 17E is a plan view of an image equivalent to the input image of FIG. 17D irreversibly compressed and decompressed.

FIG. 17E is a plan view of an image 1640g equivalent to the image 1640f of FIG. 17D irreversibly compressed by the third image layer compression processing unit 1603 and decompressed. In the image 1640g, the mosquito noise 1632b remains in the background area with respect to the line drawing image 1630a. The shape of the original line drawing image 1630a remains in an area 1660c including the area corresponding to the line drawing image 1630a and the surrounding area.

Even when a periphery of an edge of an image that is not the line drawing image 1630a (e.g., a periphery of an edge of the design image 1650c) is corrected to remove the mosquito noise 1632 (e.g., mosquito noise 1632a) at the stage of FIG. 17D, the mosquito noise 1632a may be generated again around an area corresponding to the design image 1650c of a decompressed image due to irreversible compression performed by the third image layer compression processing unit 1603. Therefore, correcting an edge area other than the area corresponding to the line drawing image 1630a merely exhibit a little effect.

FIGS. 18A to 18E illustrate images generated upon creation of a highly compressed PDF file FIm of an input image $Im_O$ according to the first embodiment of the present disclosure.

In the preset example, the input image $Im_O$ is irreversibly compressed and decompressed as a decompressed input image $Im_{OA}$. A highly compressed PDF file FIm of the decompressed input image $Im_{OA}$ is created through the correction process according to the first embodiment of the present disclosure. The images of FIGS. 18A and 18B are substantially the same as the images described above with reference to FIGS. 17A and 17B, respectively.

Figure 18A:
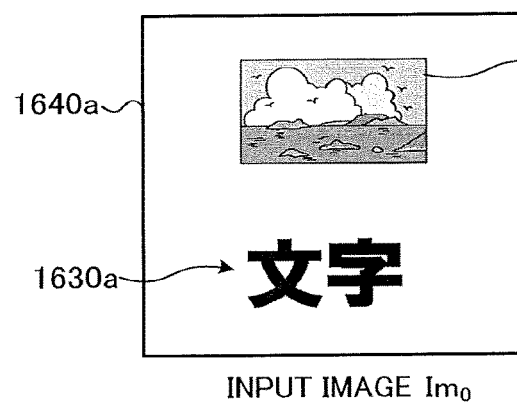
FIG. 18A is a plan view of the input image of FIG. 17A.

Specifically, FIG. 18A illustrates the image 1640a as the input image $Im_O$. FIG. 18B illustrates the image 1640d as the decompressed input image $Im_{OA}$. That is, the image 1640d is equivalent to the image 1640a of FIG. 18A irreversibly compressed by the first compression unit 20 and decompressed by the first decompression unit 23.

Figure 18B:
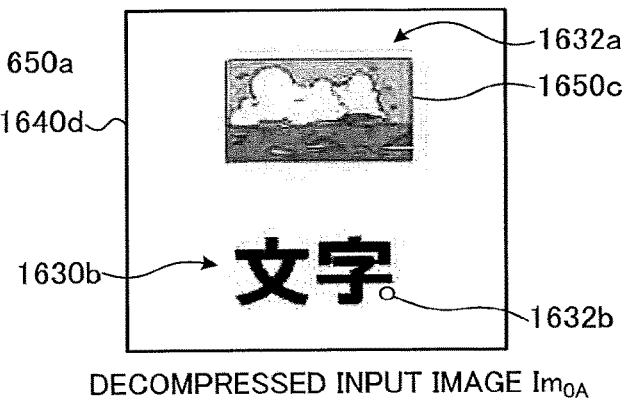
FIG. 18B is a plan view of an image equivalent to the input image of FIG. 18A irreversibly compressed and decompressed.
Figure 18C:
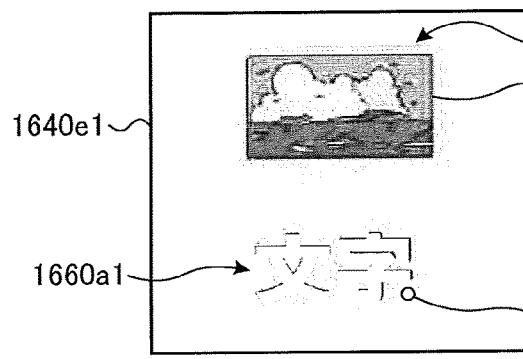
FIG. 18C is a plan view of an image equivalent to the input image of FIG. 18B from which an area corresponding to a line drawing image is removed.

FIG. 18C is a plan view of an image 1640e1 equivalent to the image 1640d of FIG. 18B from which the area corresponding to the line drawing image 1630a is removed. Similarly to the image 1640e of FIG. 17C, in the image 1640e1, the mosquito noise 1632b has failed to be removed and therefore remains in an area 1660a1 that includes the area corresponding to the line drawing image 1630a and the surrounding area. In addition, in the area 1660a1 of the image 1640e1, an edge area of the line drawing image 1630a (i.e., area corresponding to the edge of the line drawing image 1630a) includes an expanded portion of the original line drawing image 1630a that is dulled due to the irreversible compression and decompression.

As described above, in the first embodiment, the input image correction unit 1610a of the compression processing unit 16a corrects the decompressed input image $Im_{O4}$.

Figure 18D:
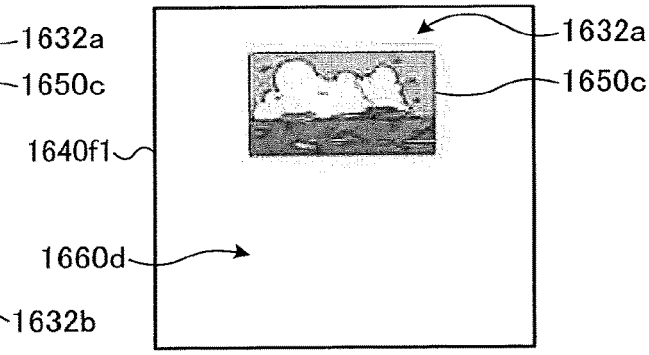
FIG. 18D is a plan view of an image equivalent to the input image of FIG. 18C corrected according to the first embodiment of the present disclosure.

FIG. 18D is a plan view of an image 1640f1 equivalent to the image 1640e1 of FIG. 18C corrected according to the first embodiment of the present disclosure. Specifically, the surround of the area corresponding to the line drawing image 1630a in the area 1660a1 of the image 1640e1 of FIG. 18C is corrected according to the first embodiment, resulting in the image 1640f1. Note that FIG. 18D illustrates the image 1640f1 excluding the area corresponding to the line drawing image 1630a.

As described above, in the first embodiment, the surround of the area corresponding to the line drawing image 1630a is corrected. As a consequence, the image 1640f1 of FIG. 18D includes a solid surround of the area corresponding to the line drawing image 1630a in an area 1660d corresponding to the area 1660a1.

Figure 18E:
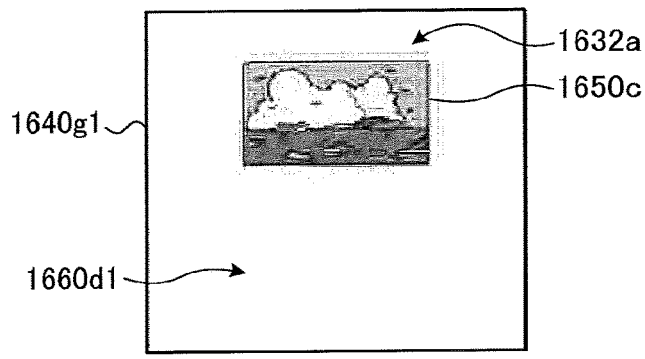
FIG. 18E is a plan view of an image equivalent to the input image of FIG. 18D irreversibly compressed and decompressed.

FIG. 18E is a plan view of an image 1640g1 equivalent to the image 1640f1 of FIG. 18D irreversibly compressed by the third image layer compression processing unit 1603 and decompressed. In the image 1640g1, the mosquito noise 1632b is removed, by correction, from the background area with respect to the line drawing image 1630a. That is, the background area is solid as illustrated in FIG. 18E as an area 1660d1. Similarly to the image 1640c of FIG. 16C, the image 1640g1 is generated as a flat image. Thus, according to the present embodiment, an image of a highly compressed PDF file FIm is generated at high quality. In addition, since a solid image is efficiently compressed by, e.g., the JPEG method, a reduced size of highly compressed PDF file FIm is created.

<Specific Examples Of Correction Process According To First Embodiment>

Referring now to FIGS. 19A to 22F and the flowchart described above with reference to FIG. 15, a description is given of specific examples of the correction process according to the first embodiment of the present disclosure.

<First Example of Correction Process>

Initially with reference to FIGS. 19A to 19E, a description is given of a first example of the correction process according to the first embodiment of the present disclosure.

The first example is an example of the correction process performed for an image including a line drawing image on a solid background.

Figure 19A:
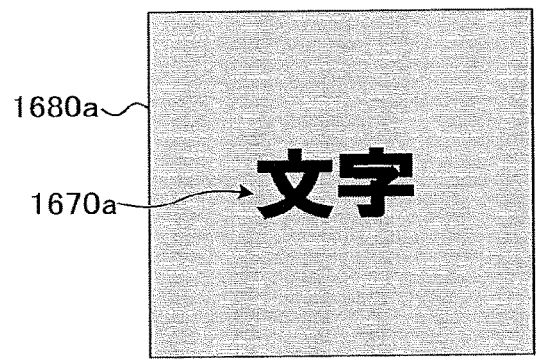
FIG. 19A is a plan view of an image that includes a line drawing image on a solid background.

FIG. 19A is a plan view of an image 1680a that includes a line drawing image 1670a on a solid background.

Referring to FIG. 11, the image 1680a is input, as an input image $Im_O$, to the first compression unit 20 and the detection unit 10a.

Figure 19B:
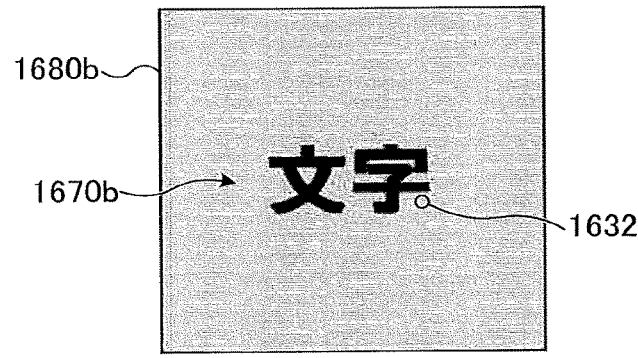
FIG. 19B is a plan view of an image equivalent to the image of FIG. 19A irreversibly compressed and decompressed.

FIG. 19B is a plan view of an image 1680b equivalent to the image 1680a of FIG. 19A irreversibly compressed by the first compression unit 20 and decompressed by the first decompression unit 23 via the memory 22. The image 1680b is input, as a decompressed input image $Im_{O4}$, to the compression processing unit 16a, the detection unit 10, and the calculation unit 14. In the image 1680b, a line drawing image 1670b corresponds to the line drawing image 1670a having an edge dulled due to the irreversible compression and decompression. In addition, the mosquito noise 1632 is generated around the line drawing image 1670b.

Referring to FIG. 11, with the detection unit 10, the calculation unit 14, and the determination unit 15, the line drawing image 1670b corresponding to the line drawing image 1670a is extracted from the image 1680b (i.e., decompressed input image $Im_{O4}$) and input, as a line drawing image $Im_{L4}$, to the compression processing unit 16a. In addition, the compression processing unit 16a receives the image 1680b as the decompressed input image $Im_{O4}$ and a decompressed line drawing image $Im_{2A}$. Specifically, the image 1680b and the decompressed line drawing image $Im_{2A}$ are input into the input image correction unit 1610a of the compression processing unit 16a.

Figure 19C:
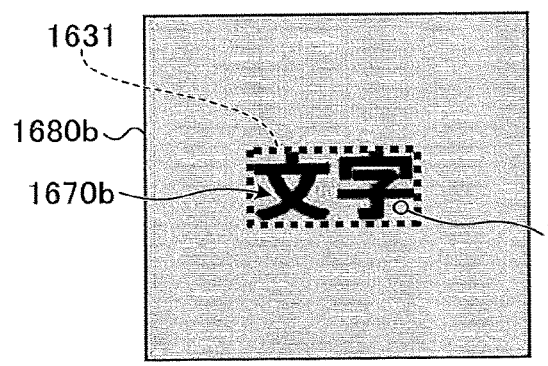
FIG. 19C is a plan view of the image of FIG. 19B with a line rectangle.

FIG. 19C is a plan view of the image 1680b of FIG. 19B with the line rectangle 1631. As exemplified in FIG. 19C, the input image correction unit 1610a sets the line rectangle 1631 so as to circumscribe each line drawing image 1670b in the image 1680b. The input image correction unit 1610a acquires the surrounding color of the line rectangle 1631 thus set (in step S500 of FIG. 15).

Figure 19D:
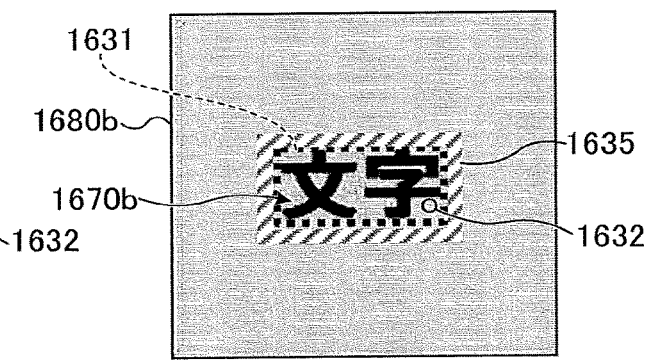
FIG. 19D is a plan view of the of FIG. 19C with a solid background determination area.

FIG. 19D is a plan view of the image 1680b of FIG. 19C with the solid background determination area 1635. As exemplified in FIG. 19D, based on the line rectangle 1631 thus set, the input image correction unit 1610a sets the solid background determination area 1635 described above with reference to FIG. 14.

Preferably, the solid background determination area 1635 is set at a position less affected by the mosquito noise 1632 generated around the line drawing image 1670b due to the irreversible compression. However, when the solid background determination area 1635 is set at a position relatively far from the line drawing image 1670b as a correction target, the solid background determination area 1635 might be affected by another line drawing image or a design image. To address such a situation, the position and the width of the solid background determination area 1635 is preferably determined according to the compressibility of irreversible compression that is performed by the first compression unit 20. The solid background determination area 1635 is herein set as an area larger than the line rectangle 1631 by two pixels in each of the vertical and lateral directions of the line rectangle 1631.

The input image correction unit 1610a determines whether the solid background determination area 1635 is a solid background based on, e.g., the tone variance and average of the solid background determination area 1635 and the number of colors of the solid background determination area 1635 (in step S501 of FIG. 15). In the example of FIG. 19D, the input image correction unit 1610a determines that the solid background determination area 1635 is a solid background (YES in step S501 of FIG. 15), and acquires the line drawing color and the background color within the line rectangle 1631 (in step S502 of FIG. 15).

The input image correction unit 1610a determines whether the background color and the surrounding color are regarded as identical (in step S503 of FIG. 15). In the example of FIG. 19D, the input image correction unit 1610a regards the background color and the surrounding color as identical (YES in step S503 of FIG. 15), and proceeds to step S504. Then, the input image correction unit 1610a executes the sequence of processes from step S504 to step S507 for all the pixels in the background portion within the line rectangle 1631 to replace the pixels of the background portion with the pixels having the surrounding color, thereby solidifying the background portion. Thus, the input image correction unit 1610a performs the correction process.

Figure 19E:
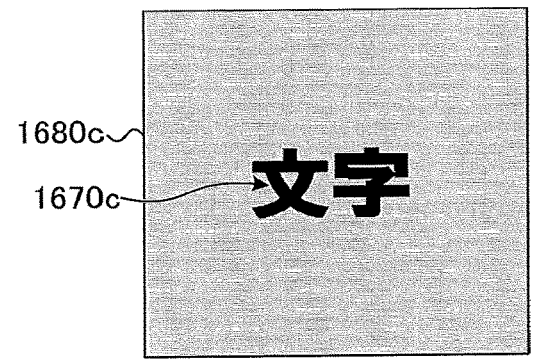
FIG. 19E is a plan view of an image at the completion of a sequence of processes according to the flowchart of FIG. 15.

FIG. 19E is a plan view of an image 1680c at the completion of the sequence of processes according to the flowchart of FIG. 15. In other words, the image 1680c is the image 1680b of FIG. 19D in which the background portion within the line rectangle 1631 is solidified. FIG. 19E illustrates the image 1680c without the mosquito noise 1632. Specifically, the mosquito noise 1632 is eliminated, through the correction process described above, from the surround of the line drawing image 1670b illustrated in FIG. 19D. As a consequence, the mosquito noise 1632 is not present around a line drawing image 1670c corresponding to the line drawing image 1670a in the image 1680c. The input image correction unit 1610a outputs the image 1680c, as a correct decompressed input image $Im_{OB}$, to the layer generation unit 1600.

Note that, upon determination in step S503, the input image correction unit 1610a may determine that the background portion is white when the solid background determination area 1635 is a white background provided that a tone average (i.e., RGB averages) of all the pixels constructing the solid background determination area 1635 is close to white and that the minimum tone is equal to or greater than a given value. The given value is, e.g., 240 when white has a tone of 255. Similarly, the input image correction unit 1610a may determine that the background portion is black when the solid background determination area 1635 is a black background.

When the input image correction unit 1610a determines that the solid background determination area 1635 is a solid background in step S501, the input image correction unit 1610a may fill the background portion with respect to the line drawing image 1670b with the tone average or a representative tone (e.g., white for white background or black for black background) within the solid background determination area 1635.

<Second Example of Correction Process>

Referring now to FIGS. 20A to 20E, a description is given of a second example of the correction process according to the first embodiment of the present disclosure.

The second example is an example of the correction process performed for an image including a line drawing image on a gradation background.

Figure 20A:
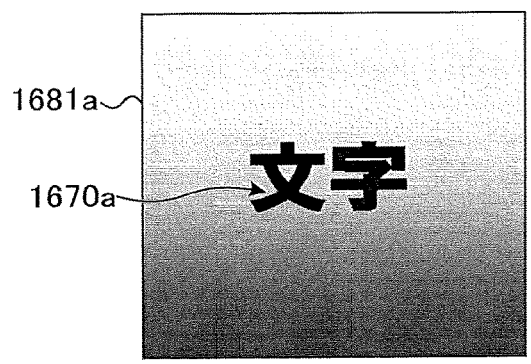
FIG. 20A is a plan view of an image that includes a line drawing image on a gradation background.

FIG. 20A is a plan view of a gradation image 1681a in which the tone or value decreases from an upper side to a lower side. Specifically, the image 1681a includes the line drawing image 1670a on a gradation background.

Figure 20B:
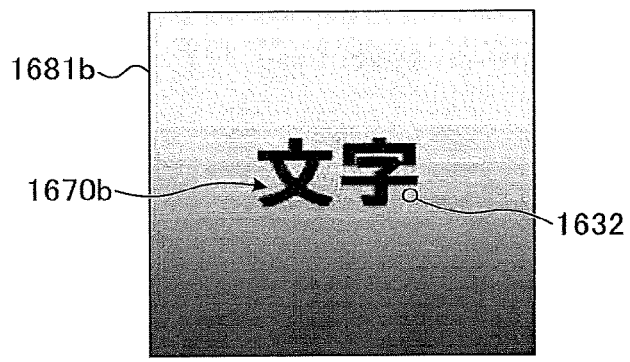
FIG. 20B is a plan view of an image equivalent to the image of FIG. 20A irreversibly compressed and decompressed.

FIG. 20B is a plan view of an image 1681b equivalent to the image 1681a of FIG. 20A irreversibly compressed by the first compression unit 20 and decompressed by the first decompression unit 23 via the memory 22. In the image 1681b, the line drawing image 1670b corresponds to the line drawing image 1670a having an edge dulled due to the irreversible compression and decompression. In addition, the mosquito noise 1632 is generated around the line drawing image 1670b.

Figure 20C:
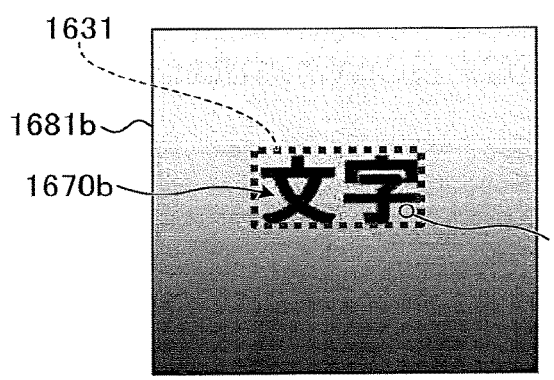
FIG. 20C is a plan view of the image of FIG. 20B with the line rectangle.

FIG. 20C is a plan view of the image 1681b of FIG. 20B with the line rectangle 1631. As exemplified in FIG. 20C, the input image correction unit 1610a sets the line rectangle 1631 so as to circumscribe each line drawing image 1670b in the image 1681b. The input image correction unit 1610a acquires the surrounding color of the line rectangle 1631 thus set (in step S500 of FIG. 15).

Figure 20D:
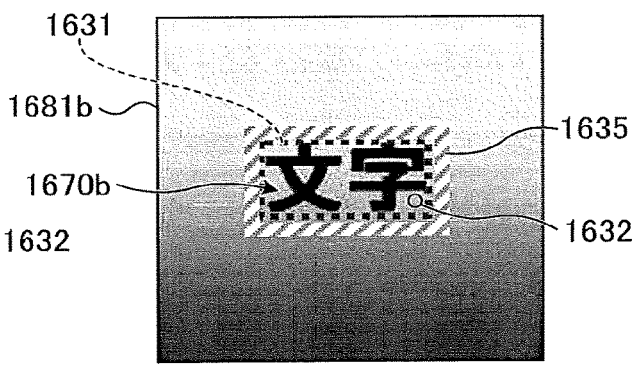
FIG. 20D is a plan view of the image of FIG. 20C with the solid background determination area.

FIG. 20D is a plan view of the image 168b of FIG. 20C with the solid background determination area 1635. As exemplified in FIG. 20D, based on the line rectangle 1631 thus set, the input image correction unit 1610a sets the solid background determination area 1635 described above with reference to FIG. 14.

The input image correction unit 1610a determines whether the solid background determination area 1635 is a solid background based on, e.g., the tone variance and average of the solid background determination area 1635 and the number of colors of the solid background determination area 1635 (in step S501 of FIG. 15). In the example of FIG. 20D, the solid background determination area 1635 including gradation increases the variance, for example. Accordingly, the input image correction unit 1610a determines that the solid background determination area 1635 is not a solid background.

Figure 20E:
FIG. 20E is a plan view of an image at the completion of a sequence of processes according to the flowchart of FIG. 15.

FIG. 20E is a plan view of an image 1681c at the completion of sequence of processes according to the flowchart of FIG. 15. As illustrated in FIG. 20E, the input image correction unit 1610a does not perform the correction process and completes the sequence of processes according to the flowchart of FIG. 15. In the example of FIG. 20E, the image 1681c includes the mosquito noise 1632 around the line drawing image 1670c.

Solidification of the surround of the line drawing image 1670b on a gradation background may cause the image defective. According to the second example, for an image including a gradation background, the surround of the line drawing image 1670b is not solidified to prevent generation of a defective image.

<Third Example of Correction Process>

Referring now to FIGS. 21A to 21E, a description is given of a third example of the correction process according to the first embodiment of the present disclosure.

The third example is an example of the correction process performed for an image including a line drawing image on a background including at least one of a design and a pattern.

Figure 21A:
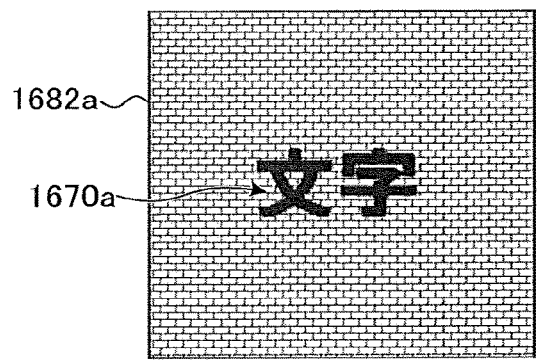
FIG. 21A is a plan view of an image that includes a line drawing image on a pattern background.

FIG. 21A is a plan view of an image 1682a with a tile pattern. Specifically, the image 1682a includes the line drawing image 1670a on a pattern background.

Figure 21B:
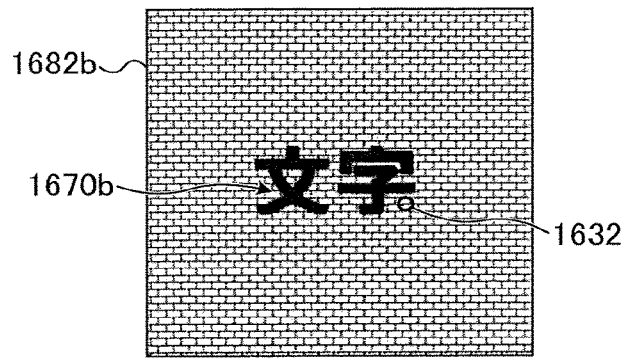
FIG. 21B is a plan view of an image equivalent to the image of FIG. 21A irreversibly compressed and decompressed.

FIG. 21B is a plan view of an image 1682b equivalent to the image 1682a of FIG. 21A irreversibly compressed by the first compression unit 20 and decompressed by the first decompression unit 23 via the memory 22. In the image 1682b, the line drawing image 1670b corresponds to the line drawing image 1670a having an edge dulled due to the irreversible compression and decompression. In addition, the mosquito noise 1632 is generated around the line drawing image 1670b.

Figure 21C:
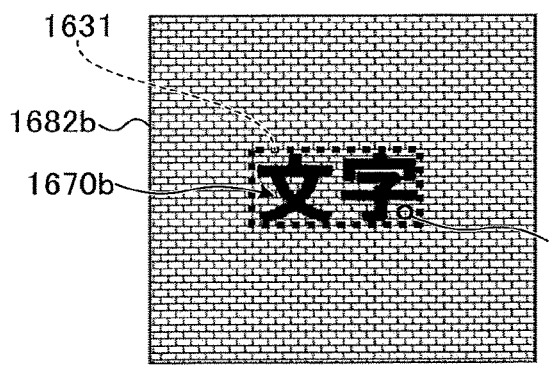
FIG. 21C is a plan view of the image of FIG. 21B with the line rectangle.

FIG. 21C is a plan view of the image 1682b of FIG. 21B with the line rectangle 1631. As exemplified in FIG. 21C, the input image correction unit 1610a sets the line rectangle 1631 so as to circumscribe each line drawing image 1670b in the image 1682b. The input image correction unit 1610a acquires the surrounding color of the line rectangle 1631 thus set (in step S500 of FIG. 15).

Figure 21D:
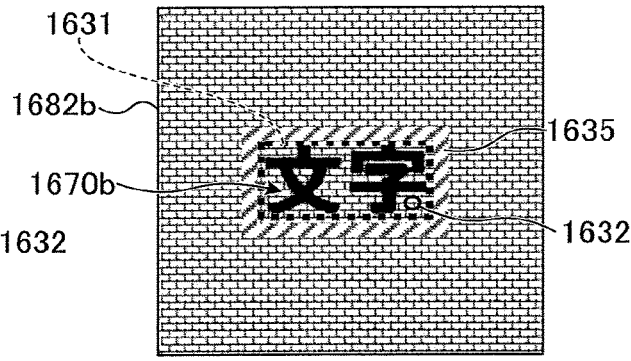
FIG. 21D is a plan view of the image of FIG. 21C with the solid background determination area.

FIG. 21D is a plan view of the image 1682b of FIG. 21C with the solid background determination area 1635. As exemplified in FIG. 21D, based on the line rectangle 1631 thus set, the input image correction unit 1610a sets the solid background determination area 1635 described above with reference to FIG. 14.

The input image correction unit 1610a determines whether the solid background determination area 1635 is a solid background based on, e.g., the tone variance and average of the solid background determination area 1635 and the number of colors of the solid background determination area 1635 (in step S501 of FIG. 15). In the example of FIG. 21D, the solid background determination area 1635 including a pattern increases the variance, for example. Accordingly, the input image correction unit 1610a determines that the solid background determination area 1635 is not a solid background.

Figure 21E:
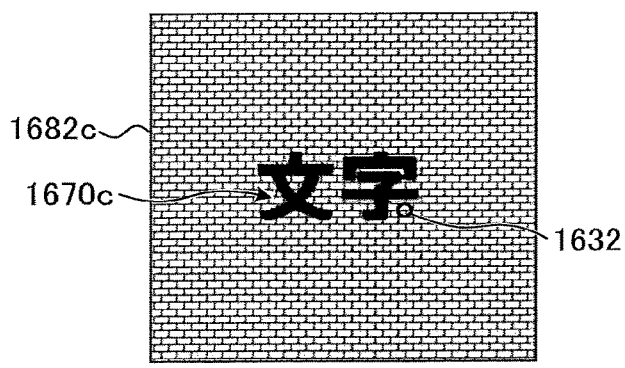
FIG. 21E is a plan view of an image at the completion of a sequence of processes according to the flowchart of FIG. 15.

FIG. 21E is a plan view of an image 1682c at the completion of the sequence of processes according to the flowchart of FIG. 15. As illustrated in FIG. 21E, the input image correction unit 1610a does not perform the correction process and completes the sequence of processes according to the flowchart of FIG. 15. In the example of FIG. 21E, the image 1682c includes the mosquito noise 1632 around the line drawing image 1670c.

Similarly to the case described above in which the image includes a gradation background, solidification of the surround of the line drawing image 1670b may cause the image defective when the image includes at least one of a design and a pattern as a part of the background. According to the third example, for an image including at least one of a design and a pattern as a part of the background, the surround of the line drawing image 1670b is not solidified to prevent generation of a defective image.

<Fourth Example of Correction Process>

Referring now to FIGS. 22A to 22F, a description is given of a fourth example of the correction process according to the first embodiment of the present disclosure.

The fourth example is an example of the correction process performed for an image including a line drawing image and a marker image in a given range from the line drawing. The marker image herein refers to an image having a color that is neither a color of the line drawing image nor a color of the background of the line drawing image.

Figure 22A:
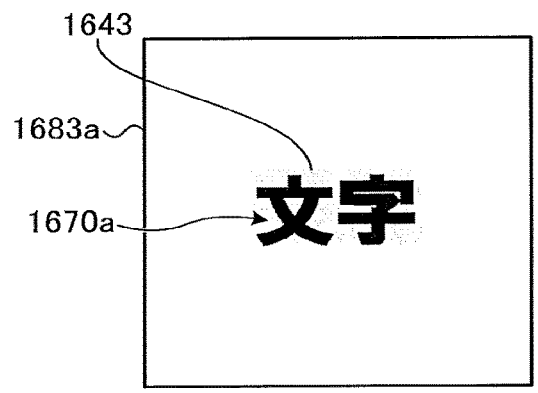
FIG. 22A is a plan view of an image that includes a line drawing image and a marker image on a solid background.

FIG. 22A is a plan view of an image 1683a that includes, on a solid background, the line drawing image 1670a and a marker image 1643 in a given range including the line drawing image 1670a. In such a case, the background color of the line drawing image 1670a is the color of the marker image 1643.

Figure 22B:
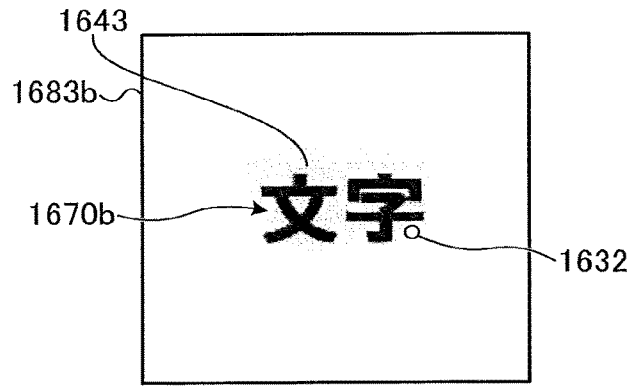
FIG. 22B is a plan view of an image equivalent to the image of FIG. 22A irreversibly compressed and decompressed.

FIG. 22B is a plan view of an image 1683b equivalent to the image 1683a of FIG. 22A irreversibly compressed by the first compression unit 20 and decompressed by the first decompression unit 23 via the memory 22. In the image 1683b, the line drawing image 1670b corresponds to the line drawing image 1670a having an edge dulled due to the irreversible compression and decompression. In addition, the mosquito noise 1632 is generated around the line drawing image 1670b.

Figure 22C:
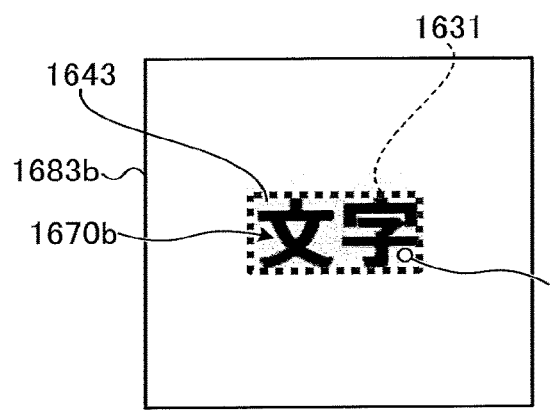
FIG. 22C is a plan view of an image equivalent to the image of FIG. 22B with the line rectangle.

FIG. 22C is a plan view of the image 1683b of FIG. 22B with the line rectangle 1631. As exemplified in FIG. 22C, the input image correction unit 1610a sets the line rectangle 1631 so as to circumscribe each line drawing image 1670b in the image 1683b. The input image correction unit 1610a acquires the surrounding color of the line rectangle 1631 thus set (in step S500 of FIG. 15).

Figure 22D:
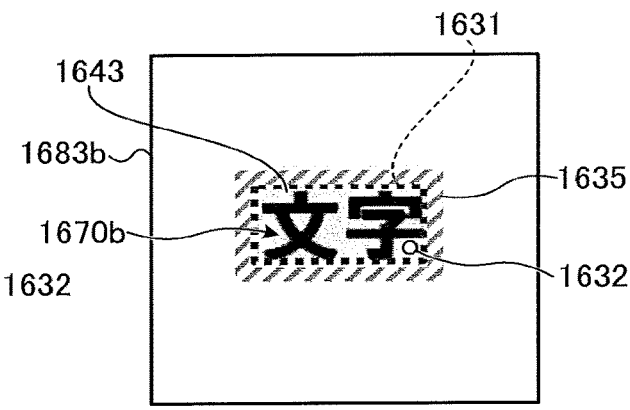
FIG. 22D is a plan view of an image equivalent to the image of FIG. 22C with the solid background determination area.

FIG. 22D is a plan view of the image 1683b of FIG. 22C with the solid background determination area 1635. As exemplified in FIG. 22D, based on the line rectangle 1631 thus set, the input image correction unit 1610a sets the solid background determination area 1635 described above with reference to FIG. 14.

The input image correction unit 1610a determines whether the solid background determination area 1635 is a solid background (in step S501 of FIG. 15). In the example of FIG. 22D, the input image correction unit 1610a determines that the solid background determination area 1635 is a solid background (YES in step S501 of FIG. 15), and acquires the line drawing color and the background color within the line rectangle 1631 (in step S502 of FIG. 15).

The input image correction unit 1610a determines whether the background color and the surrounding color are regarded as identical (in step S503 of FIG. 15). In the example of FIG. 22D, the input image correction unit 1610a regards the background color and the surrounding color as identical (YES in step S503 of FIG. 15), and proceeds to step S504. Then, the input image correction unit 1610a executes the sequence of processes from step S504 to step S507 for all the pixels in the background portion within the line rectangle 1631.

Here, the processing target pixel in determination in step S506 is a pixel of the marker image 1643. Therefore, the input image correction unit 1610a determines that the difference between the color of the processing target pixel and the surrounding color exceeds a given value (YES in step S506), and returns to step S504. Accordingly, the input image correction unit 1610a does not correct the background color in step S507 for the pixels of the marker image 1643.

Figure 22E:
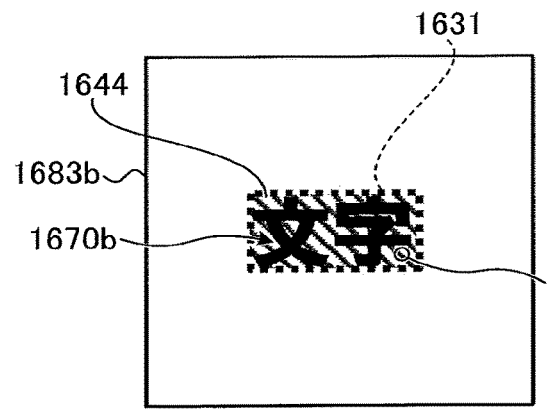
FIG. 22E is a plan view of the image of FIG. 22C with an area hatched.

FIG. 22E is a plan view of the image 1683b of FIG. 22C with an area 1644. In step S506, specifically, the input image correction unit 1610a determines whether there is a color that is neither the line drawing color nor the solid background color (i.e., surrounding color) in the area 1644 as hatched in FIG. 22E. The area 1644 is an area that is not the line drawing image 1670b within the line rectangle 1631. In the present example, the area 1644 is not solidified because of the color (e.g., yellow) of the pixels constructing the marker image 1643 present in the area 1644. The color (e.g., yellow) of the pixels constructing the marker image 1643 is neither the line drawing color (e.g., black) nor the solid background color (e.g., white).

Figure 22F:
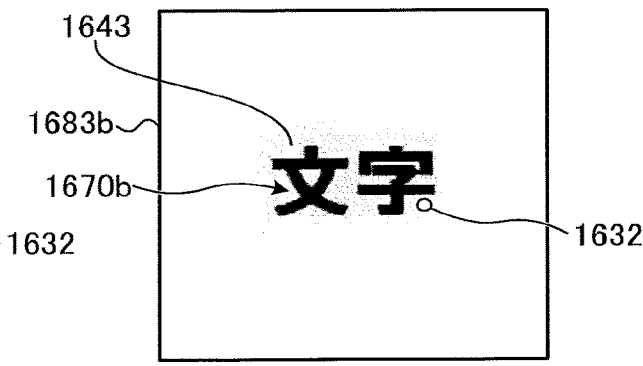
FIG. 22F is a plan view of an image at the completion of a sequence of processes according to the flowchart of FIG. 15.

FIG. 22F is a plan view of the image 1683b at the completion of the sequence of processes according to the flowchart of FIG. 15. Since the area 1644 is not solidified, the marker image 1643 remains, without being eliminated, as illustrated in FIG. 22F.

Note that, due to the influence of the mosquito noise 1632, pixels having colors different from the color of the original marker image 1643 are mixed inside the line rectangle 1631 when viewed in pixel units. Therefore, the color determination is preferably made by use of the tone average of the pixels in an area having colors that are neither the line drawing color nor the surrounding color within the line rectangle 1631.

<Second Embodiment>

Now, a description is given of the second embodiment of the present disclosure.

In the first embodiment described above, the surround of the area corresponding to the line drawing image $Im_2$ (i.e., target area) is corrected in the decompressed input image $Im_{O4}$. In the second embodiment, the line drawing $Im_{1A}$ included in the decompressed input image $Im_{O4}$ is corrected in addition to the correction according to the first embodiment.

Figure 23A:
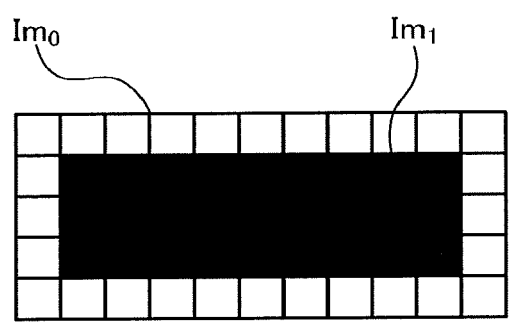
FIG. 23A is a plan view of a line drawing image included in an input image.
Figure 23B:
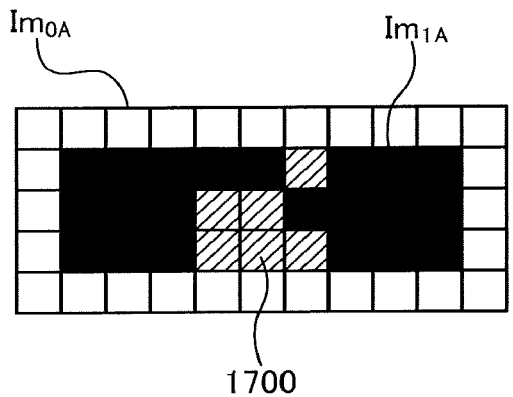
FIG. 23B is a plan view of a decompressed input image equivalent to the input image of FIG. 23A irreversibly compressed and decompressed.

Referring now to FIGS. 23A and 23B, a description is given of advantages of a correction process according to the second embodiment of the present disclosure.

Note that each cell represents a pixel in FIGS. 23A and 23B.

FIG. 23A is a plan view of a line drawing image $Im_{1A}$ included in an input image $Im_0$. The line drawing image $Im_1$ is herein constructed of black pixels while the background color is white.

FIG. 23B is a plan view of a decompressed input image $Im_{0A}$ equivalent to the input image $Im_0$ irreversibly compressed by the first compression unit 20 and decompressed by the first decompression unit 23 via the memory 22. The irreversible compression and decompression affects and partially changes the line drawing image $Im_1$ included in the input image $Im_0$, resulting in a line drawing image $Im_{1A}$ in the decompressed input image $Im_{0A}$. Specifically, the irreversible compression and decompression decreases the tone or value of a part of the pixels constructing the line drawing image $Im_1$ to a halftone. In the example of FIG. 23B, the line drawing image $Im_{1A}$ includes an area 1700 as hatched in FIG. 23B. The area 1700 is constructed of the halftone pixels.

The pixels constructing the area 1700 may become, e.g., white pixels by binarization performed by the first image layer compression processing unit 1601. In such a case, the corrected image is degraded with the original line drawing image $Im_0$ interrupted by the area 1700. To address such a situation, the line drawing image $Im_{1A}$ is corrected in the second embodiment.

Figure 24:
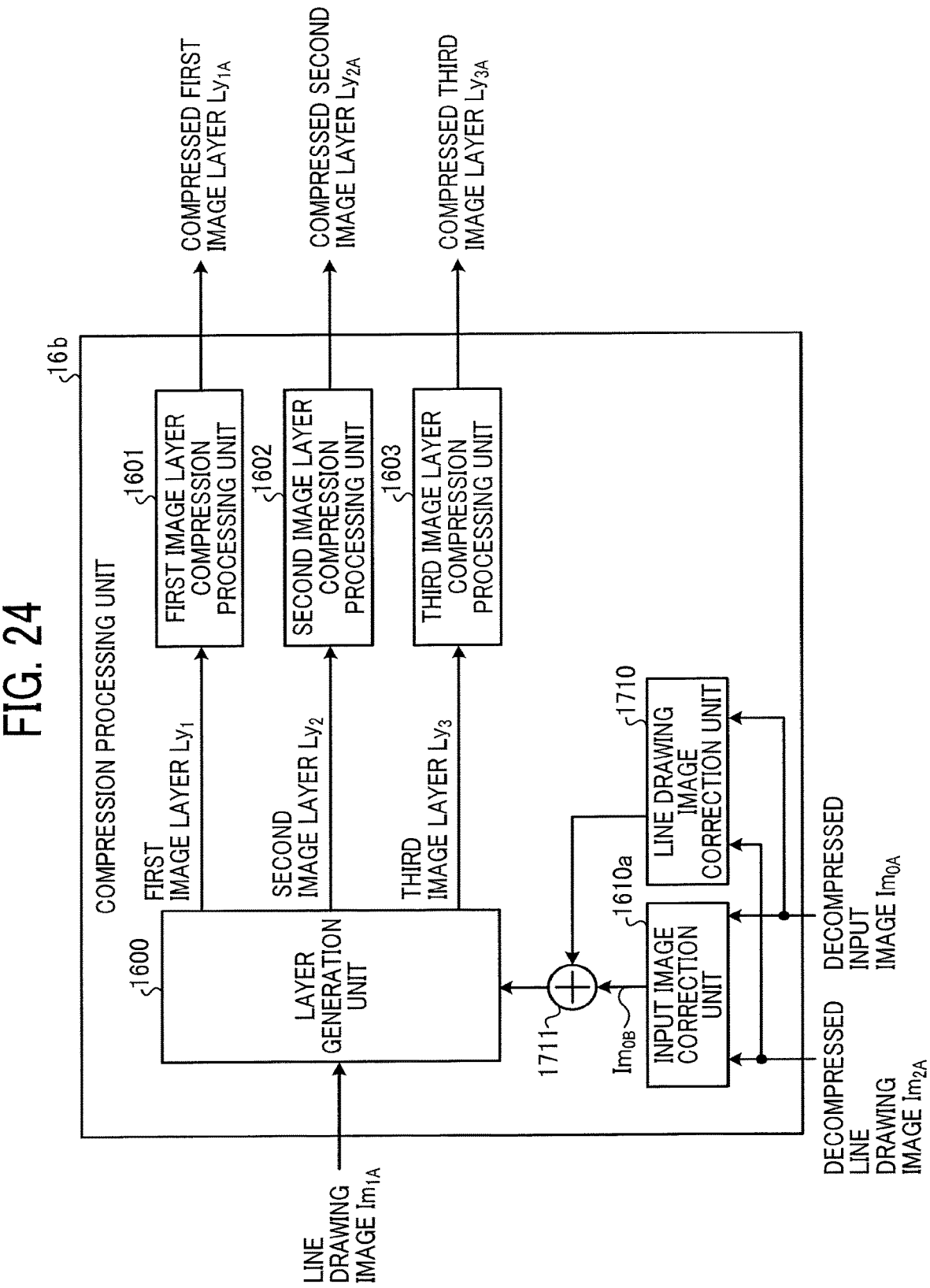
FIG. 24 is a functional block diagram illustrating a function of a compression processing unit according to a second embodiment of the present disclosure.

Referring now to FIG. 24, a description is given of a function of a compression processing unit 16b according to the second embodiment of the present disclosure.

FIG. 24 is a functional block diagram illustrating the function of the compression processing unit 16b according to the second embodiment of the present disclosure.

Note that, in FIGS. 12 and 24, for the sake of simplicity, like reference numerals are given to identical or corresponding constituent elements having substantially the same functions. Redundant descriptions thereof are herein omitted unless otherwise required.

Compared to the configuration of the compression processing unit 16a illustrated in FIG. 12, the compression processing unit 16b illustrated in FIG. 24 further includes a line drawing image correction unit 1710 and a superimposition unit 1711. Specifically, a decompressed line drawing image $Im_{2A}$ and the decompressed input image $Im_{0A}$ are input into each of the input image correction unit 1610a and the line drawing image correction unit 1710. The correction process performed by the input image correction unit 1610a is substantially the same as the correction process described above in the first embodiment. Redundant descriptions thereof are herein omitted. A correct decompressed input image $Im_{0B}$ is input into an input terminal (hereinafter referred to as a first input terminal) of the superimposition unit 1711 from the input image correction unit 1610a.

The line drawing image correction unit 1710 corrects a portion corresponding to the line drawing image $Im_1$, as a target area, in the decompressed input image $Im_{0A}$ based on the decompressed line drawing image $Im_{2A}$ and the decompressed input image $Im_{0A}$. Thus, the line drawing image correction unit 1710 serves as a second correction unit. Specifically, the line drawing image correction unit 1710 sets a line rectangle 1631 in the decompressed input image $Im_{0A}$ based on the decompressed line drawing image $Im_{2A}$. When a tone of a background pixel within the line rectangle 1631 is closer to the tone of a pixel of the decompressed line drawing image $Im_{2A}$ than the solid background color (i.e., surrounding color) and when the background pixel is adjacent to a line drawing pixel within the line rectangle 1631, the line drawing image correction unit 1710 regards the background pixel as a line drawing pixel. Then, the line drawing image correction unit 1710 replaces the color of the background pixel with the line drawing color, thus performing correction.

Figure 25:
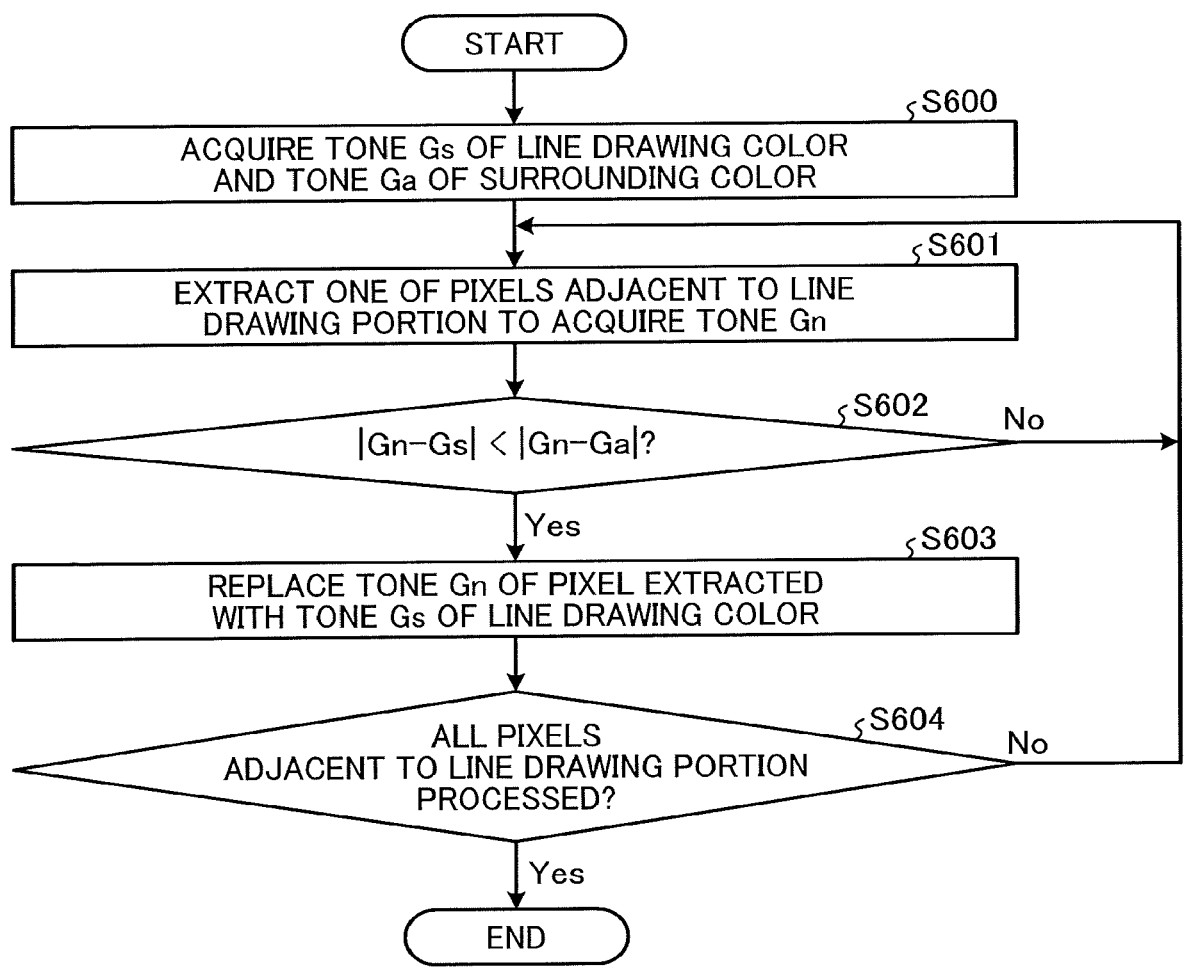
FIG. 25 is a flowchart illustrating a correction process performed by a line drawing image correction unit according to the second embodiment of the present disclosure.

Referring now to FIG. 25, a description is given of a flow of the correction process performed by the line drawing image correction unit 1710 according to the second embodiment of the present disclosure.

FIG. 25 is a flowchart illustrating the correction process performed by the line drawing image correction unit 1710 according to the second embodiment of the present disclosure.

In step S600, similarly to the process in step S502 of the flowchart illustrated in FIG. 15, for example, the line drawing image correction unit 1710 identifies a line drawing portion in the line rectangle 1631 based on the decompressed line drawing image $Im_{2A}$, to acquire a tone Gs of the line drawing color. In step S600, the line drawing image correction unit 1710 also acquires a tone Ga of the surrounding color.

In step S601, the line drawing image correction unit 1710 extracts one pixel adjacent to the line drawing portion to acquire a tone Gn of the pixel thus extracted.

In step S602, the line drawing image correction unit 1710 determines whether a difference between the tone Gn and the tone Gs is smaller than a difference between the tone Gn and the tone Ga. Specifically, the line drawing image correction unit 1710 compares the difference between the tone Gn and the tone Gs with the difference between the tone Gn and the toner Ga for each of the RGB values.

When the line drawing image correction unit 1710 determines that the difference between the tone Gn and the tone Gs is equal to or greater than the difference between the tone Gn and the tone Ga (NO in step S602), the line drawing image correction unit 1710 returns to step S601 for processing of the next pixel. On the other hand, when the line drawing image correction unit 1710 determines that the difference between the tone Gn and the tone Gs is smaller than the difference between the tone Gn and the tone Ga (YES in step S602), the line drawing image correction unit 1710 proceeds to step S603.

In step S603, the line drawing image correction unit 1710 replaces the tone Gn of the pixel extracted in step S601 with the tone Gs of the line drawing color.

In step S604, the line drawing image correction unit 1710 determines whether all the pixels adjacent to the line drawing portion are processed. When the line drawing image correction unit 1710 determines that at least one pixel is left unprocessed (NO in step S604), the line drawing image correction unit 1710 returns to step S601 for processing of the next pixel. On the other hand, when the line drawing image correction unit 1710 determines that all the pixels adjacent to the line drawing portion are processed (YES in step S604), the line drawing image correction unit 1710 completes a sequence of the processes according to the flowchart of FIG. 25.

Upon completing correction of the line drawing portion in the decompressed input image $Im_{0A}$ according to the flowchart of FIG. 25, the line drawing image correction unit 1710 inputs an image of the line drawing portion thus corrected (hereinafter referred to as a corrected line drawing image) to another input terminal (hereinafter referred to as a second input terminal) of the superimposition unit 1711. As described above, the correct decompressed input image $Im_{0B}$ is input into the first input terminal of the superimposition unit 1711. The superimposition unit 1711 replaces, with the corrected line drawing image, an area of the correct decompressed input image $Im_{0B}$ corresponding to the corrected line drawing image input into the second input terminal. That is, the line drawing image included in the correct decompressed input image $Im_{OB}$ is corrected to the corrected line drawing image.

The superimposition unit 1711 outputs the correct decompressed input image $Im_{OB}$ including the corrected line drawing image to the layer generation unit 1600. Based on the correct decompressed input image $Im_{OB}$ including the corrected line drawing image received from the superimposition unit 1711, the layer generation unit 1600 generates a first image layer $Ly_1$, a second image layer $Ly_2$, and a third image layer $Ly_3$. Generation of the first image layer $Ly_1$ based on the correct decompressed input image $Im_{OB}$ including the corrected line drawing image prevents interruption of the line drawing image when the first image layer compression processing unit 1601 binarizes the line drawing image.

Note that adding a line drawing image might increase the possibility of erroneous separation of a design image as a line drawing image. Correction of a background area around the line drawing image alone prevents such erroneous separation and degradation of the entire image due to irreversible compression. Accordingly, a highly compressed PDF file FIm is created at high quality.

<Third Embodiment>

Now, a description is given of a third embodiment of the present disclosure.

In the third embodiment, an original or document type of an input image $Im_O$ is determined. In addition to the correction process according to the first embodiment described above, a correction process according to the original type determined is performed on a correct decompressed input image $Im_{OB}$ input to the compression processing unit 16a.

Note that the original type is determined according to classification of the input image $Im_O$ by e.g., the background color and the text or line drawing color of the input image $Im_O$, and the presence or absence of a design. Specifically, for example, the input image $Im_O$ is roughly classified into the following five original types: (1) text-only original; (2) newspaper original with outlined text; (3) newspaper original without outlined text; (4) pale original; and (5) other original. Original type (4), namely, pale original, is further classified into six sub-original types. A description of the six sub-original types is deferred.

Figure 26:
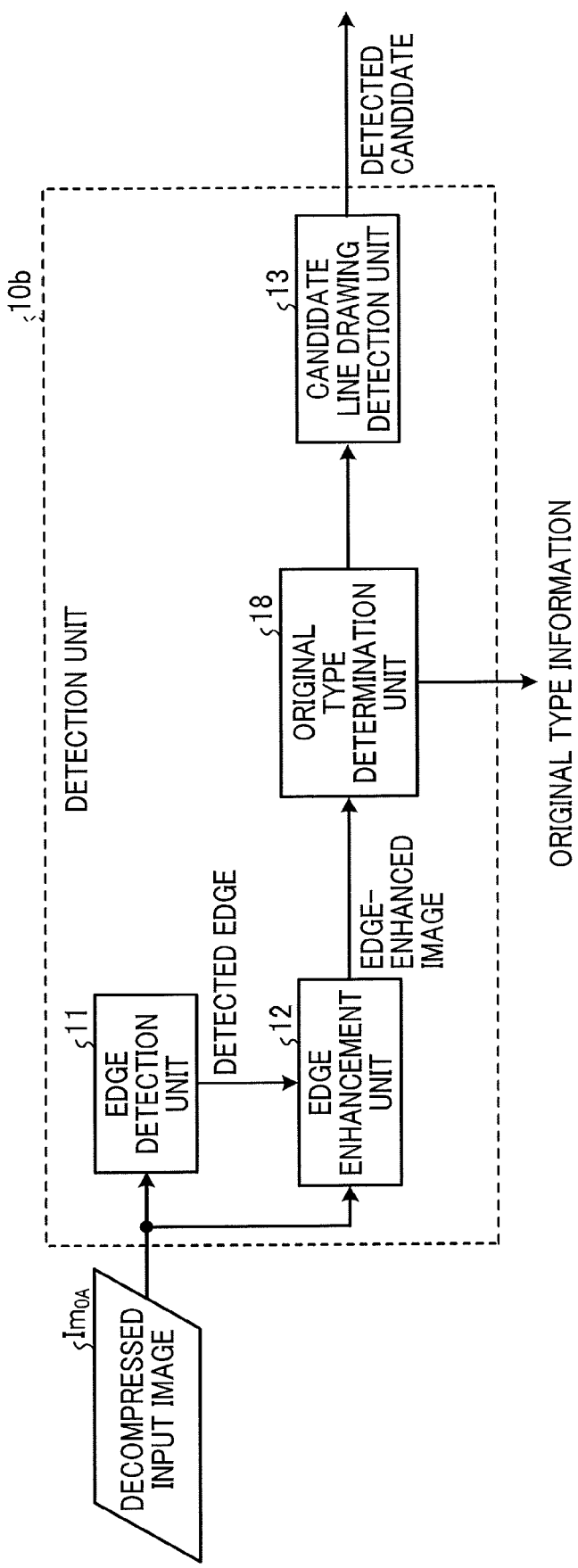
FIG. 26 is a functional block diagram illustrating a function of a detection unit according to the third embodiment of the present disclosure.

Referring now to FIG. 26, a description is given of a function of a detection unit 10b that detects the original type according to the third embodiment of the present disclosure.

FIG. 26 is a functional block diagram illustrating the function of the detection unit 10b according to the third embodiment of the present disclosure.

Note that, in FIGS. 4 and 26, for the sake of simplicity, like reference numerals are given to identical or corresponding constituent elements having substantially the same functions. Redundant descriptions thereof are herein omitted unless otherwise required.

Compared to the configuration of the detection unit 10 illustrated in FIG. 4, the detection unit 10b illustrated in FIG. 26 further includes an original type determination unit 18. The detection unit 10b corresponds to the detection unit 10 illustrated in FIG. 11. That is, an input image $Im_O$ is irreversibly compressed by the first compression unit 20, sent to the memory 22, and decompressed by the first decompression unit 23 as a decompressed input image $Im_{OA}$. The detection unit 10b receives the decompressed input image $Im_{OA}$.

The original type determination unit 18 receives an edge-enhanced image output from the edge enhancement unit 12 based on the decompressed input image $Im_{OA}$. The original type determination unit 18 then determines the original type, as a type of the input image $Im_O$, based on the edge-enhanced image thus received. Then, the original type determination unit 18 outputs original type information as image type information indicating the original type (i.e., type of the input image $Im_O$) determined. In other words, the original type determination unit 18 serves as a determination unit that determines the image type information indicating the type of the input image $Im_O$. In addition, the original type determination unit 18 transmits the edge-enhanced image received from the edge enhancement unit 12 to the candidate line drawing detection unit 13.

Figure 27:
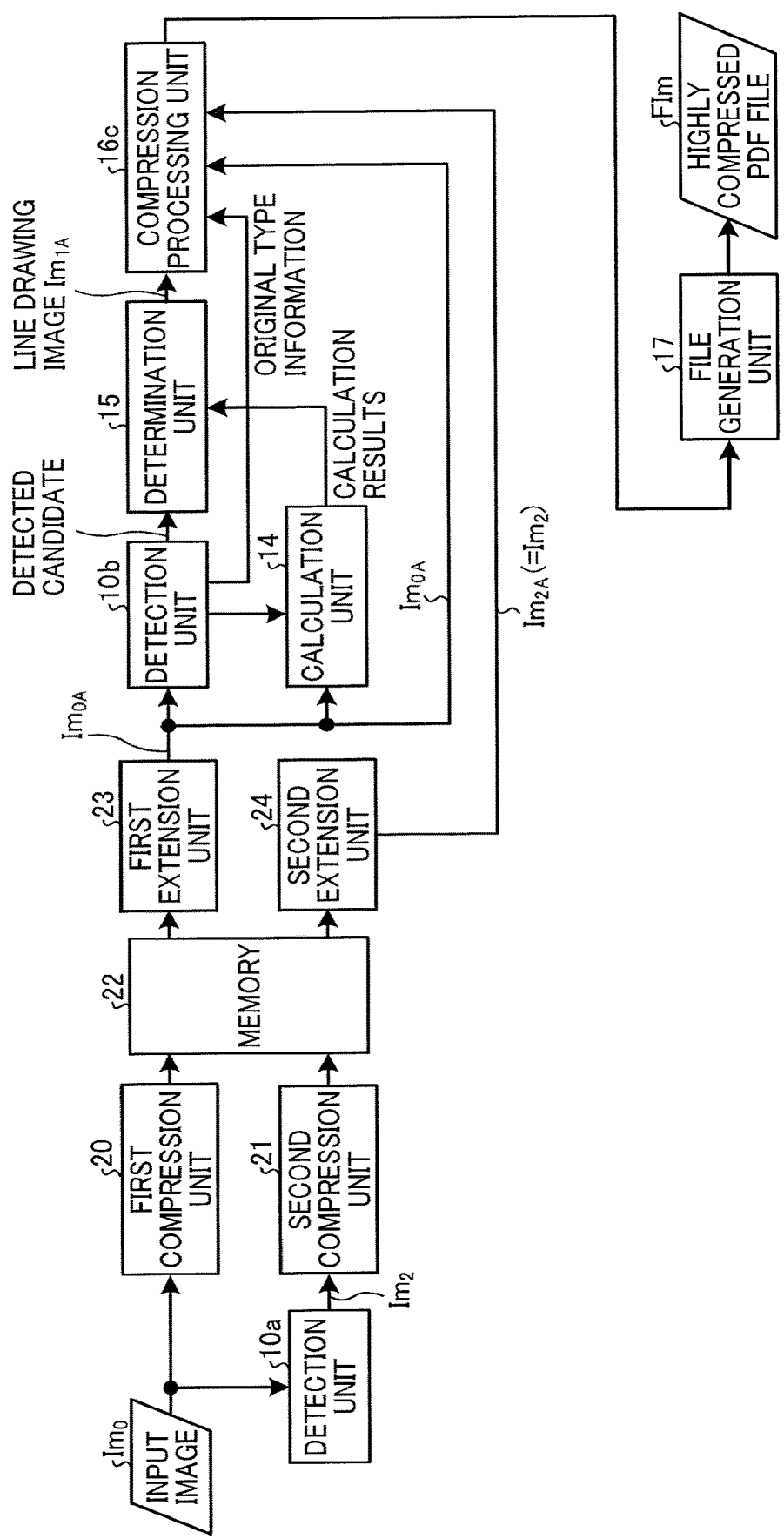
FIG. 27 is a functional block diagram illustrating a functional configuration of an image processing apparatus according to a third embodiment of the present disclosure.

Referring now to FIG. 27, a description is given of a functional configuration of the image forming apparatus 100 as an image processing apparatus according to the third embodiment of the present disclosure.

FIG. 27 is a functional block diagram illustrating the functional configuration of the image forming apparatus 100 according to the third embodiment of the present disclosure.

Note that, in FIGS. 11 and 27, for the sake of simplicity, like reference numerals are given to identical or corresponding constituent elements having substantially the same functions. Redundant descriptions thereof are herein omitted unless otherwise required.

The detection unit 10 and the compression processing unit 16a illustrated in FIG. 11 are changed to the detection unit 10b described above and a compression processing unit 16c, respectively, in the configuration illustrated in FIG. 27. A detailed description of the compression processing unit 16c is deferred. The compression processing unit 16c receives the original type information from the original type determination unit 18 of the detection unit 10b.

Figure 28:
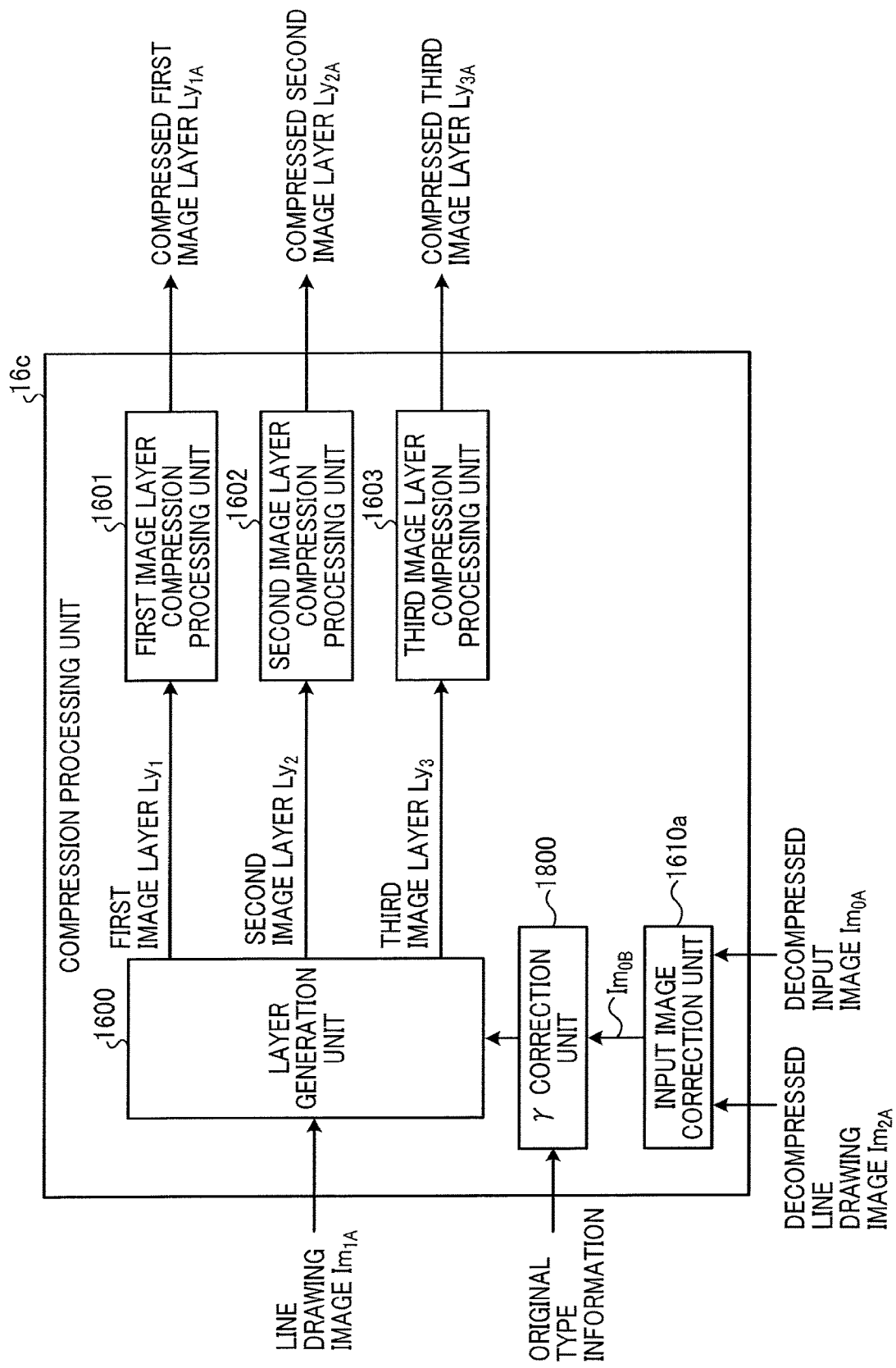
FIG. 28 is a functional block diagram illustrating a function of a compression processing unit according to the third embodiment of the present disclosure.

Referring now to FIG. 28, a description is given of a function of the compression processing unit 16c according to the third embodiment of the present disclosure.

FIG. 28 is a functional block diagram illustrating the function of the compression processing unit 16c according to the third embodiment of the present disclosure.

Note that, in FIGS. 12 and 28, for the sake of simplicity, like reference numerals are given to identical or corresponding constituent elements having substantially the same functions. Redundant descriptions thereof are herein omitted unless otherwise required.

Compared to the configuration of the compression processing unit 16a illustrated in FIG. 12, the compression processing unit 16c illustrated in FIG. 28 further includes a gamma ($\gamma$) correction unit 1800.

The $\gamma$ correction unit 1800 receives the original type information from the detection unit 10b. The $\gamma$ correction unit 1800 also receives the correct decompressed input image $Im_{OB}$ from the input image correction unit 1610a to perform a $\gamma$ correction process on the correct decompressed input image $Im_{OB}$ thus received, according to the original type information. The $\gamma$ correction unit 1800 then outputs the correct decompressed input image $Im_{OB}$ corrected according to the original type information. Based on the correct decompressed input image $Im_{OB}$ subjected to the $\gamma$ correction process by the $\gamma$ correction unit 1800, the layer generation unit 1600 generates a first image layer $Ly_1$, a second image layer $Ly_2$, and a third image layer $Ly_3$.

Figure 29:
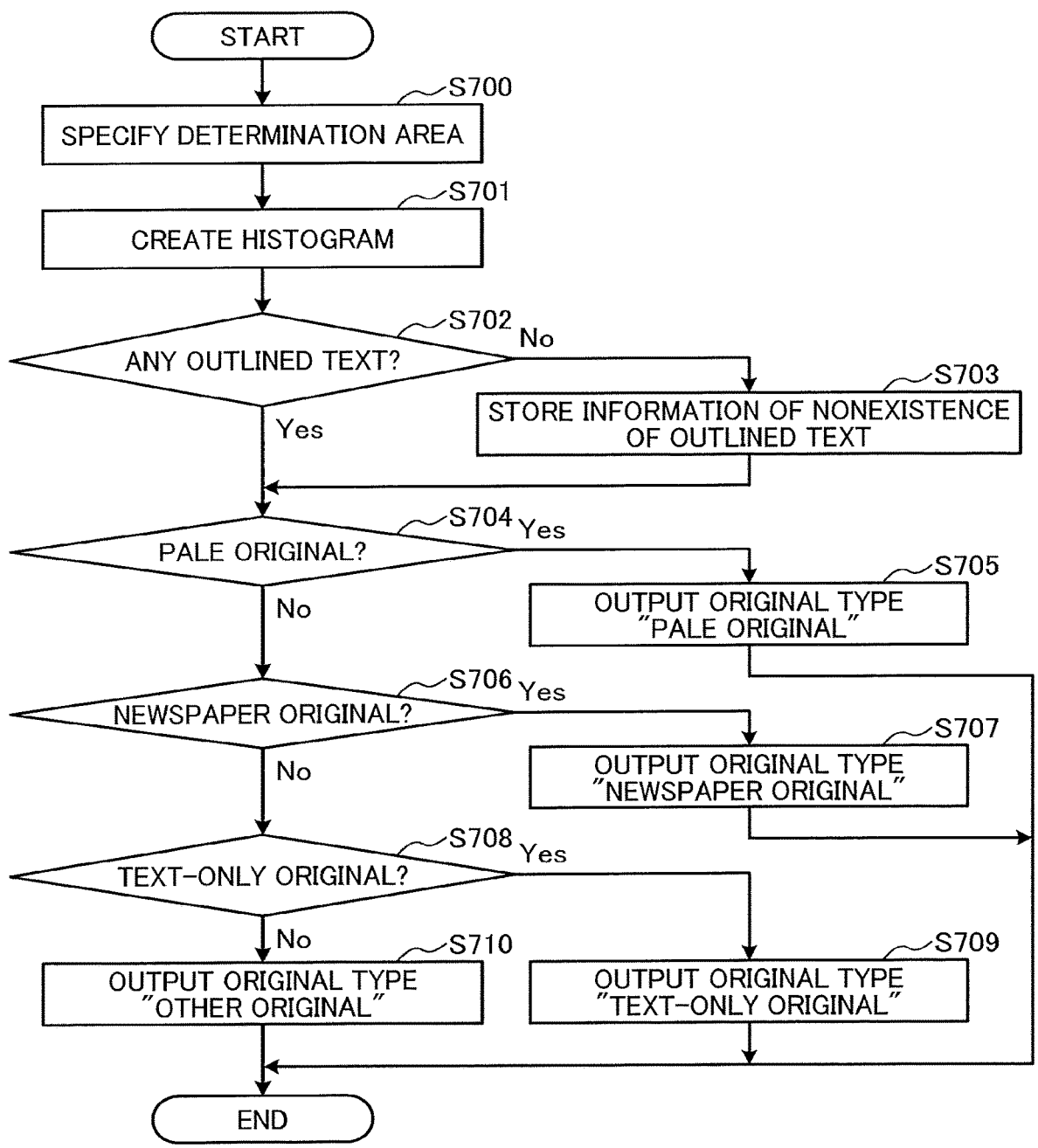
FIG. 29 is a flowchart illustrating an original type determination process performed by an original type determination unit according to the third embodiment of the present disclosure.
Figure 30:
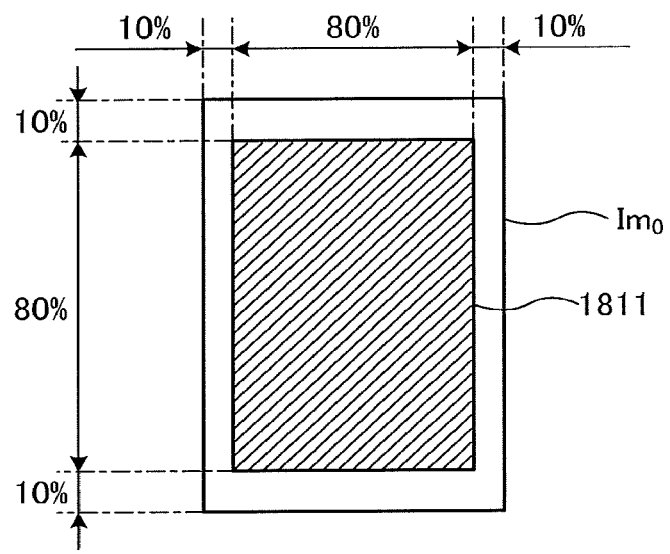
FIG. 30 is a plan view of an input image including a rectangular area as a candidate determination area.
Figure 31:
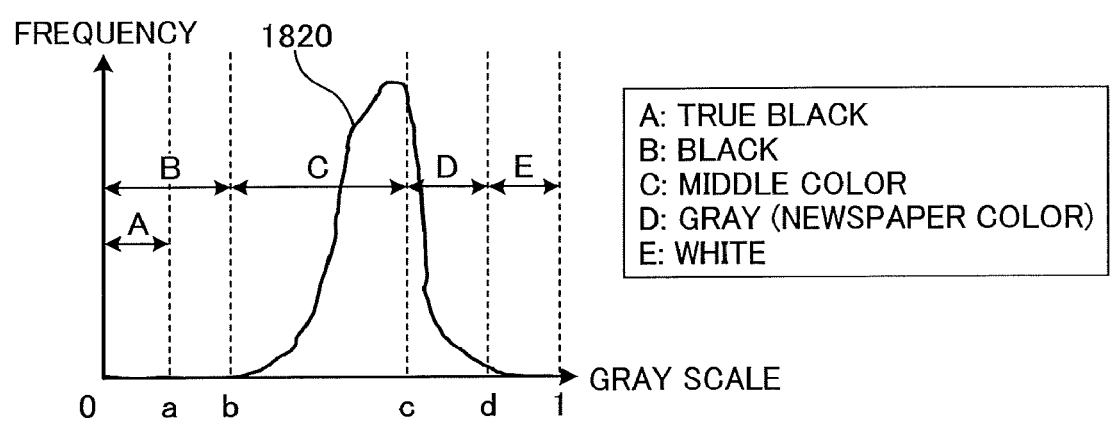
FIG. 31 is a histogram created according to the third embodiment of the present disclosure.

Referring now to FIGS. 29 to 31, a description is given of a flow of an original type determination process performed by the original type determination unit 18 according to the third embodiment of the present disclosure.

FIG. 29 is a flowchart illustrating the original type determination process performed by the original type determination unit 18 according to the third embodiment of the present disclosure.

In step S700, the original type determination unit 18 specifies, in the input image $Im_O$, a determination area as a target of the original type determination process. Specifically, the original type determination unit 18 specifies the determination area on the input image $Im_O$ in step S700 to create a histogram of the determination area in a subsequent step S701.

More specifically, the original type determination unit 18 specifies the determination area in the edge-enhanced image received from the edge enhancement unit 12. As described above, the edge enhancement unit 12 generates the edge-enhanced image based on the decompressed input image $Im_{OA}$, which is an outcome of irreversible compression and decompression of the input image $Im_O$.

The original type determination unit 18 herein specifies the determination area as a target for creating a histogram, in consideration of the following two areas on the input image $Im_O$.

A first area of the two areas is a rectangular area set on the input image $Im_O$.

FIG. 30 is a plan view of the input image $Im_O$ including a rectangular area 1811 as a candidate determination area. For example, as exemplified in FIG. 30, the rectangular area 1811 is set, as a candidate determination area, by excluding 10% of a vertical width of the input image $Im_O$ from each of upper and lower ends of the input image $Im_O$ and excluding 10% of a lateral width of the input image $Im_O$ from each of right and left ends of the input image $Im_O$. A second area of the two areas is an edge area that is enhanced in the edge-enhanced image. The edge area is excluded from the determination area.

The first area is set to exclude entry of, e.g., a shadow of an original when the input image $Im_O$ is an image of an original (hereinafter referred to as an original image) read by the scanner 1131 illustrated in FIG. 1, for example.

The second area is set to exclude entry of pixels between the line drawing portion and the background portion. The shadow of the original and the pixels between the line drawing portion and the background portion are not designs but might be erroneously determined as designs. To prevent such erroneous determination, the first and second areas are set to exclude, e.g., the shadow of the original and the pixels between the line drawing portion and the background portion from the determination area in advance.

Referring back to FIG. 29, in step S701, the original type determination unit 18 creates a histogram based on a tone of a pixel of the determination area specified in step S700. For example, the original type determination unit 18 converts a focused pixel within the determination area into a gray-scale pixel and quantizes the tone of the gray-scale pixel with a plurality of threshold to obtain the frequency. Thus, the original type determination unit 18 creates a histogram.

FIG. 31 is an example of the histogram created in step S701 according to the third embodiment of the present disclosure.

In FIG. 31, the horizontal axis indicates a normalized gray scale in which tones increase in a right direction. The vertical axis indicates the frequency in each of tone areas into which the gray scale is divided at given intervals. A characteristic line 1820 connects the frequencies across the tone areas.

The original type determination unit 18 classifies the gray scale into five values (i.e., Classes A to E) using four tones (i.e., Tones "a" to "d") determined by, e.g., experiments as thresholds. A relationship of Tones "a" to "d" satisfies $0<a<b<c<d<1$. In the example of FIG. 31, the gray scale is classified as below with the tone represented by X:

$0 \leq X < a$: Class A;
$0 \leq X < b$: ClassB;
$b \leq X < c$: Class C;
$c \leq X < d$: Class D; and
$d \leq X \leq 1$: Class E.

Among the tones classified as above, the color represented by the tone classified as Class A is hereinafter referred to as a true black. Similarly, the colors represented by the tones classified as Classes B to E are hereinafter referred to as black, middle color, newspaper color (or gray), and white, respectively.

Now, a description is given of a method of determining Tones "a" to "d" used as thresholds for classifying the gray scale into Classes A to E described above, that is, true black, black, middle color, newspaper color, and white.

Tone "a" is a threshold for defining Class A, that is, true black. Tone "a" is lower than a tone of a text color of general newspaper.

Tone "b" is a threshold for defining a boundary between Class B and Class C, that is, a boundary between black and the middle color. Tone "b" classifies the tone of the text color of general newspaper as Class B (i.e., black). Tone "b" has an influence on the determination as to whether the original type is newspaper type.

In addition, Tone "b" classifies a tone of a text color, particularly black text, of a general text-only original as Class B (i.e., black). Therefore, Tone "b" also has an influence on the determination as to whether the original type is text-only original.

Tone "c" is a threshold for defining a boundary between Class C and Class D, that is, a boundary between the middle color and the newspaper color. Tone "c" classifies a tone of black text of a light-color original or pale original (i.e., input image $Im_O$) as Class C (i.e., middle color). Tone "c" has an influence on the determination as to whether the original type is light-color original (i.e., pale original).

Tone "d" is a threshold for defining a boundary between Class D and Class E, that is, a boundary between the newspaper color and white. Tone "d" classifies a tone of a background color of general newspaper as Class D (i.e., newspaper color). Tone "d" has an influence on the determination as to whether the original type is newspaper original.

In addition, Tone "d" classifies a white background as Class E (i.e., white). Therefore, Tone "d" also has an influence on the determination as to whether the original type is white background. Further, Tone "d" classifies a tone of outlined text as Class E (i.e., white). Therefore, Tone "d" further has an influence on the determination as to whether the original type is outlined text.

The original type determination unit 18 determines a peak value from the histogram created, to obtain a class to which the peak value belongs from Classes A to E. Note that a plurality of peak values may be detected from one histogram. In such a case, the original type determination unit 18 obtains a class to which each of the plurality of peak values belongs from Classes A to E.

Referring back to FIG. 29, in step S702, the original type determination unit 18 determines whether there is outlined text, based on the histogram. For example, when a narrow peak exists in a high-tone area (e.g., Classes D or E) while the frequencies gather in a low-tone area (e.g., Class B) in the histogram, the original type determination unit 18 determines that there is outlined text in a dark-color input image $Im_O$.

When the original type determination unit 18 determines that there is outlined text (YES in step S702), the original type determination unit 18 proceeds to step S704. On the other hand, when the original type determination unit 18 determines that there is no outlined text (NO in step S702), the original type determination unit 18 proceeds to step S703.

In step S703, the original type determination unit 18 stores information indicating that there is no outlined text or white background, and proceeds to step S704. This information is used upon detection of outlined text on a newspaper original, a pale original, and other originals.

In step S704, the original type determination unit 18 determines whether the original type of the input image $Im_O$ is "pale original", based on the histogram. In a histogram of "pale original", the frequency is lower in the areas of Classes A and B, that is, true black and black areas, than the frequency in the areas of Classes C, D, and E, that is, middle color, newspaper color, and white areas. With such characteristics, for example, the original type determination unit 18 performs threshold determination on the frequency of the tone belonging to each of Classes A to E to determine whether the original type is "pale original".

When the original type determination unit 18 determines that the original type of the input image $Im_O$ is "pale original" (YES in step S704), the original type determination unit 18 proceeds to step S705.

In step S705, the original type determination unit 18 outputs original type information indicating "pale original". Then, the original type determination unit 18 completes a sequence of processes according to the flowchart of FIG. 29.

On the other hand, when the original type determination unit 18 determines that the original type of the input image $Im_O$ is not "pale original" (NO in step S704), the original type determination unit 18 proceeds to step S706.

In step S706, the original type determination unit 18 determines whether the original type of the input image $Im_O$ is "newspaper original", based on the histogram. In a histogram of "newspaper original", the frequency is relatively high in the area of Class D, that is, gray or newspaper color area, while the frequency is relatively low in the areas of Classes A and B, that is, true black and black areas. With such characteristics, for example, the original type determination unit 18 performs threshold determination on the frequency of the tone belonging to each of Classes A to E, to determine whether the original type is "newspaper original".

When the original type determination unit 18 determines that the original type of the input image $Im_O$ is "newspaper original" (YES in step S706), the original type determination unit 18 proceeds to step S707.

In step S707, the original type determination unit 18 outputs original type information indicating "newspaper original". Then, the original type determination unit 18 completes a sequence of processes according to the flowchart of FIG. 29.

On the other hand, when the original type determination unit 18 determines that the original type of the input image $Im_O$ is not "newspaper original" (NO in step S706), the original type determination unit 18 proceeds to step S708.

In step S708, the original type determination unit 18 determines whether the original type of the input image $Im_O$ is "text-only original", based on the histogram. In a histogram of "text-only original", the frequency is relatively high in the areas of Classes A, B, and E, that is, true black, black, and white areas, while the frequency is relatively low in the areas of Classes C, and D, that is, middle color and newspaper color areas. With such characteristics, for example, the original type determination unit 18 performs threshold determination on the frequency of the tone belonging to each of Classes A to E, to determine whether the original type is "text-only original".

When the original type determination unit 18 determines that the original type of the input image $Im_O$ is "text-only original" (YES in step S708), the original type determination unit 18 proceeds to step S709.

In step S709, the original type determination unit 18 outputs original type information indicating "text-only original". Then, the original type determination unit 18 completes a sequence of processes according to the flowchart of FIG. 29.

On the other hand, when the original type determination unit 18 determines that the original type of the input image $Im_O$ is not "text-only original" (NO in step S708), the original type determination unit 18 proceeds to step S710.

In step S710, the original type determination unit 18 determines that the original type of the input image $Im_O$ is "other original", and outputs original type information indicating "other original". Then, the original type determination unit 18 completes a sequence of processes according to the flowchart of FIG. 29.

<γ Correction Process According to Third Embodiment>

As described above, in the third embodiment, the γ correction unit 1800 of the compression processing unit 16c, performs a γ correction process on the correct decompressed input image $Im_{O4}$ received from the input image correction unit 1610a, according to the original type indicated by the original type information.

FIGS. 32A to 32D illustrate examples of γ correction tables that define γ correction parameters according to the third embodiment of the present disclosure.

Specifically, FIGS. 32A to 32D illustrate input and output characteristics of tones in the γ correction unit 1800. In each of FIGS. 32A to 32D, the vertical axis indicates a normalized output tone while the horizontal axis indicates a normalized input tone. More specifically, FIGS. 32A to 32D are γ correction tables 1900a to 1900d as first to fourth γ correction tables, respectively, defining the input and output characteristics.

Figure 32A:
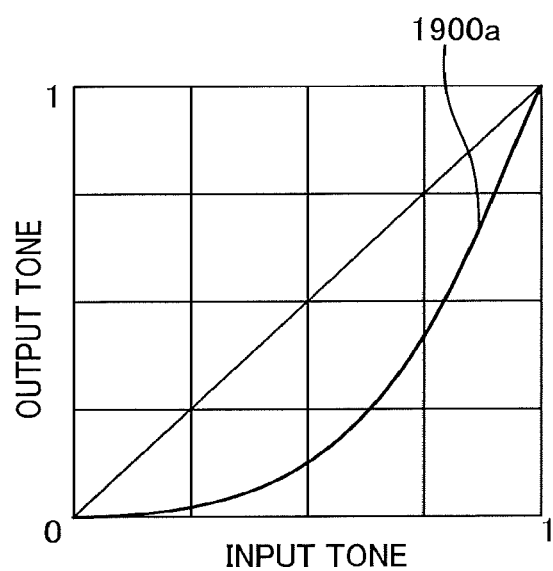
FIG. 32A is a first gamma correction table that defines a gamma correction parameter according to the third embodiment of the present disclosure.

The γ correction table 1900a illustrated in FIG. 32A has characteristics of reducing an entire image brightness, that is, darkening an entire image. Each of the γ correction tables 1900b to 1900d illustrated in FIGS. 32B to 32D, respectively, have characteristics of further darkening a dark-tone area (i.e., low-brightness area) and further brightening a light-tone area (i.e., high-brightness area) in an image. The degree of acutance improvement increases in the order of the γ correction tables 1900b, the γ correction table 1900c, and the γ correction table 1900d.

Figure 32B:
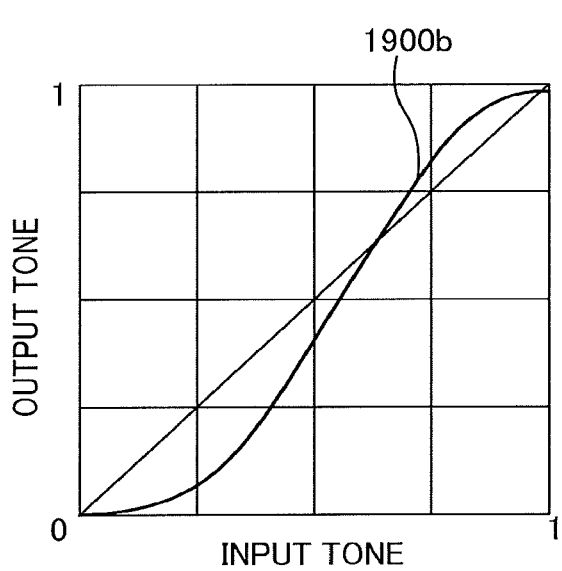
FIG. 32B is a second gamma correction table that defines a gamma correction parameter according to the third embodiment of the present disclosure.
Figure 32C:
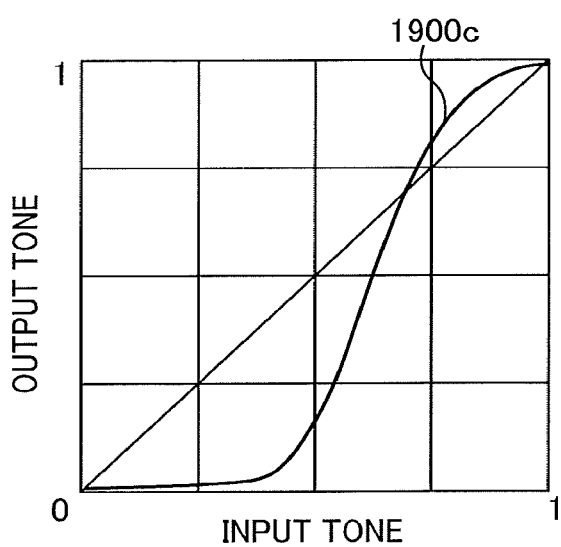
FIG. 32C is a third gamma correction table that defines a gamma correction parameter according to the third embodiment of the present disclosure.
Figure 32D:
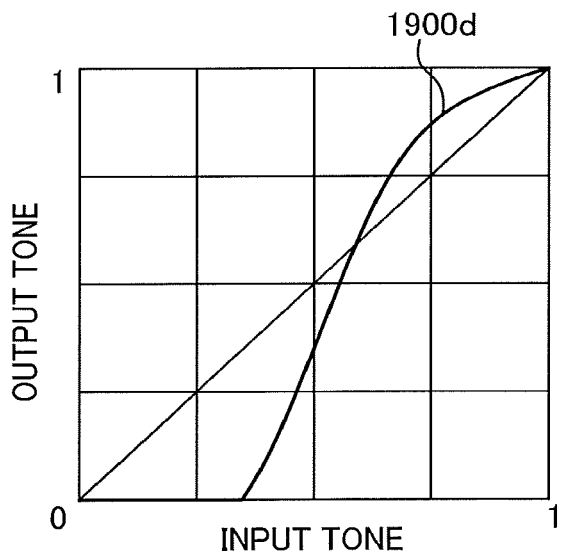
FIG. 32D is a fourth gamma correction table that defines a gamma correction parameter according to the third embodiment of the present disclosure.

The original type "text-only original" herein includes low-tone text (i.e., line drawing) alone on a white background. Darkening the text color (i.e., line drawing color) and lightening the color of the background portion with respect to the text (i.e., background color) enhances readability of the original type "text-only original". Therefore, when the original type information indicates "text-only original", the γ correction table 1900d of FIG. 32D is applied, for example.

Note that a portion other than a text (i.e., line drawing) portion of an image may be hereinafter simply referred to as a background with respect to text. The color of the background may be hereinafter referred to as a background color with respect to a text color (i.e., line drawing color).

The original type "newspaper original" herein includes a high-brightness background and a low-brightness text. Therefore, when the original type information indicates "newspaper original", lightening the background color and darkening the text color (i.e., line drawing color) enhances the readability. Preferably, an input image $Im_0$ of the original type "newspaper original" is corrected with a γ correction table having smaller changes in output tone with respect to input tone, compared to a γ correction table (e.g., γ correction table 1900*d*) applied for correction of an input image $Im_0$ of the original type "text-only original" described above. For example, the γ correction table 1900*c* of FIG. 32C is applied for correction of the input image $Im_0$ of the original type "newspaper original".

Darkening both the background color and the line drawing color enhances appearance of the original type "pale original". Therefore, when the original type information indicates "pale original", the γ correction table 1900*a* of FIG. 32A is used to darken the entire image. Preferably, a γ correction table is selected that darkens an input image $Im_0$ of the original type "pale original" than an input image $Im_0$ of the original type "other original".

Further darkening a low-brightness portion and further lightening a high-brightness portion enhances appearance of the original type "other original". In order to prevent impairment of gradation, an input image $Im_0$ of the original type "other original" is preferably corrected selecting a γ correction table having a relatively small degree of acutance improvement. For example, the γ correction table 1900*b* of FIG. 32B is applied for correction of the input image $Im_0$ of the original type "other original".

The original type determination unit 18 further classifies the original type "pale original" into a plurality of sub-original types. FIGS. 33A to 33F illustrates six sub-original types into which the original type "pale original" is classified by the original type determination unit 18 according to the third embodiment of the present disclosure. Specifically, the original type "pale original" is classified into "pale original A" to "pale original F".

Figure 33A:
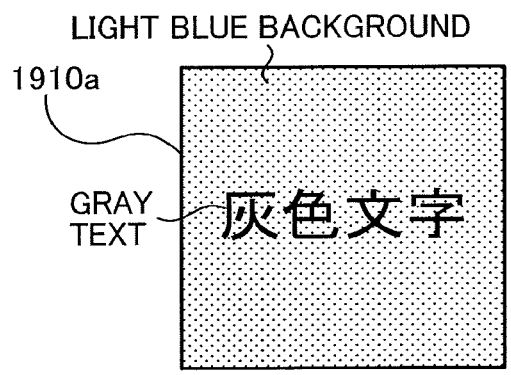
FIG. 33A is a plan view of an image of a first sub-original type of an original type "pale original"

FIG. 33A is a plan view of an image 1910*a* of an original type "pale original A" as a first sub-original type of an original type "pale original". A main portion of the image 1910*a* is a colored background of the middle color or newspaper color. The image 1910*a* includes no outlined text. That is, white is equal to or less than a threshold. In the example of FIG. 33A, the image 1910*a* includes gray text on a light blue background.

Figure 33B:
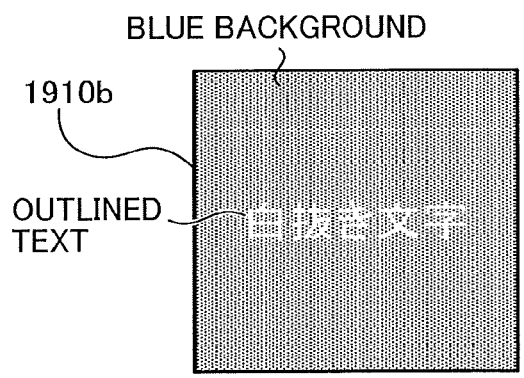
FIG. 33B is a plan view of an image of a second sub-original type of the original type "pale original"

FIG. 33B is a plan view of an image 1910*b* of an original type "pale original B" as a second sub-original type of an original type "pale original". A main portion of the image 1910*b* is a colored background of the middle color or newspaper color. The image 1910*b* includes outlined text. That is, white is equal to or greater than the threshold. In the example of FIG. 33B, the image 1910*b* includes outlined text on a blue background. The blue background of the image 1910*b* is herein darker than the light blue background of the image 1910*a* described above, for example.

Figure 33C:
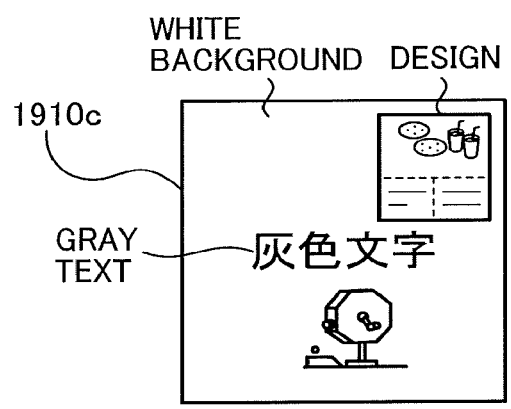
FIG. 33C is a plan view of an image of a third sub-original type of the original type "pale original"

FIG. 33C is a plan view of an image 1910*c* of an original type "pale original C" as a third sub-original type of an original type "pale original". The image 1910*c* includes a design as a multivalued image with a large number of colors. A "pale original" including an image of which the background color is hardly determined may be also classified as "pale original C". That is, when it is hardly determined whether the background of the image is a colored background of the middle color or newspaper color or a white background, the original may be classified as "pale original C".

Figure 33D:
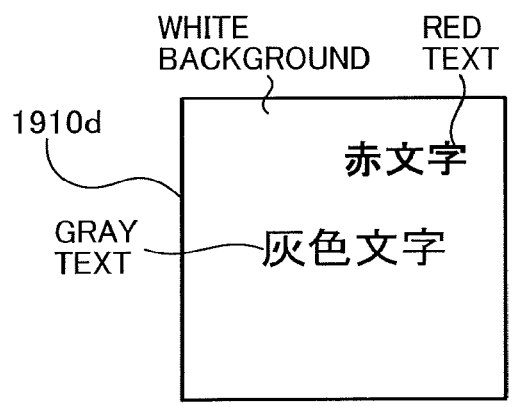
FIG. 33D is a plan view of an image of a fourth sub-original type of the original type "pale original"

FIG. 33D is a plan view of an image 1910*d* of an original type "pale original D" as a fourth sub-original type of an original type "pale original". A main portion of the image 1910*d* is a white background (i.e., white). The image 1910*d* includes text (i.e., line drawings) of two colors (e.g., gray and another color except black).

Figure 33E:
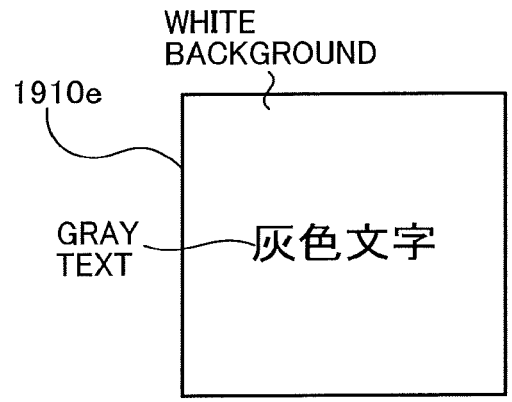
FIG. 33E is a plan view of an image of a fifth sub-original type of an original type "pale original"

FIG. 33E is a plan view of an image 1910*e* of an original type "pale original E" as a fifth sub-original type of an original type "pale original". A main portion of the image 1910*e* is a white background (i.e., white). The image 1910*e* includes text (i.e., line drawing) of a single color except black (e.g., gray).

Figure 33F:
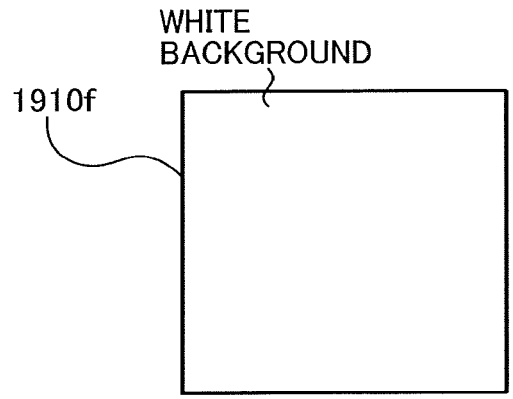
FIG. 33F is a plan view of an image of a sixth sub-original type of the original type "pale original"

FIG. 33F is a plan view of an image 1910*f* of an original type "pale original F" as a sixth sub-original type of an original type "pale original". The image 1910*f* includes a white background alone. In other words, the image 1910*f* is a white image. A "pale original" including a substantially white image, which slightly includes text or a line drawing on a white background, may be also classified as "pale original F".

Referring back to FIG. 29, when the original type determination unit 18 determines that the original type of the input image $Im_0$ is "pale original" (YES in step S704), the original type determination unit 18 analyzes in detail the histogram created in step S701 to determine a sub-original type among the sub-original types "pale original A" to "pale original F".

In step S705, the original type determination unit 18 outputs the original type information indicating the sub-original type determined among the sub-original types "pale original A" to "pale original F". Then, the original type determination unit 18 completes the sequence of processes according to the flowchart of FIG. 29.

FIGS. 34A to 34D illustrate examples of γ correction tables that define γ correction parameters according to the sub-original type of the original type "pale original" determined as described above according to the third embodiment of the present disclosure.

Specifically, FIGS. 34A to 34D illustrate input and output characteristics of tones in the γ correction unit 1800. In each of FIGS. 34A to 34D, the vertical axis indicates a normalized output tone while the horizontal axis indicates a normalized input tone. More specifically, FIGS. 34A to 34D are γ correction tables 1920*a* to 1920*d* as first to fourth γ correction tables, respectively, defining the input and output characteristics.

Figure 34A:
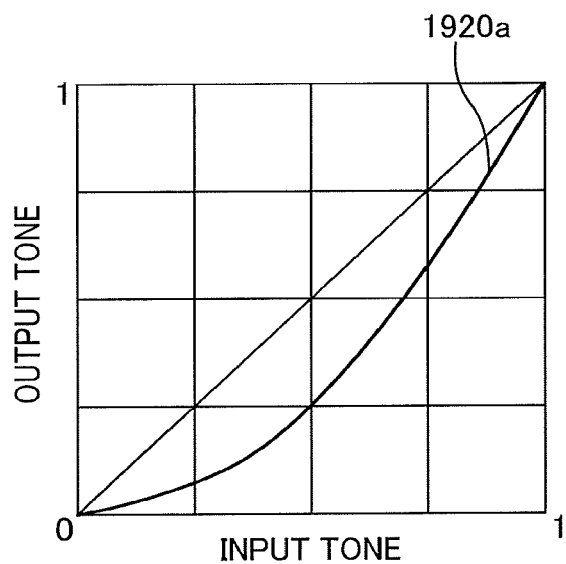
FIG. 34A is a first gamma correction table that defines a gamma correction parameter according to a sub-original type of the original type "pale original" determined according to the third embodiment of the present disclosure.
Figure 34B:
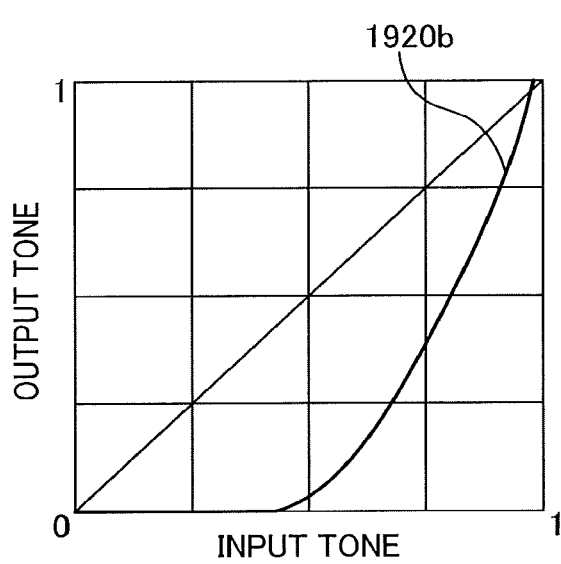
FIG. 34B is a second gamma correction table that defines a gamma correction parameter according to a sub-original type of the original type "pale original" determined according to the third embodiment of the present disclosure.
Figure 34C:
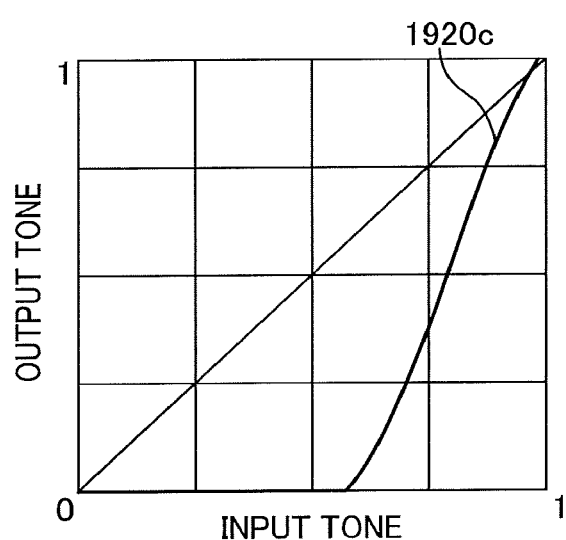
FIG. 34C is a third gamma correction table that defines a gamma correction parameter according to a sub-original type of the original type "pale original" determined according to the third embodiment of the present disclosure.
Figure 34D:
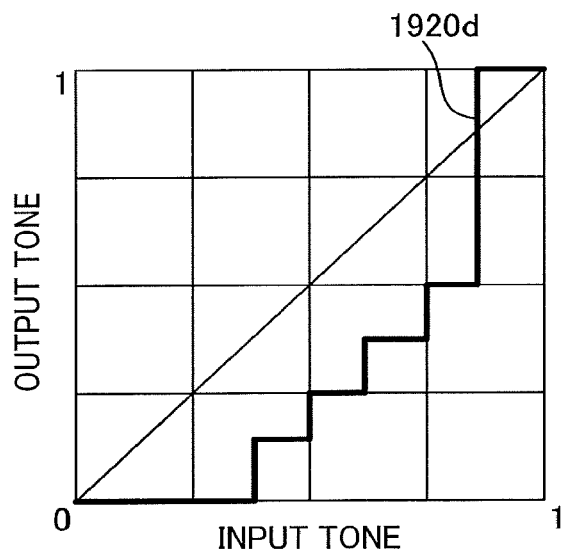
FIG. 34D is a fourth gamma correction table that defines a gamma correction parameter according to a sub-original type of the original type "pale original" determined according to the third embodiment of the present disclosure.

The γ correction tables 1920*a* to 1920*c* illustrated in FIGS. 34A to 34C, respectively, have characteristics of reducing an entire image brightness, that is, darkening an entire image. The degree of darkening an image increases in the order of the γ correction tables 1920*a*, the γ correction table 1920*b*, and the γ correction table 1920*c*. The γ correction table 1920*d* illustrated in FIG. 34D is an example in which the classification of the gray scale is roughened to reduce the data amount.

Images of the sub-original types "pale original A" and "pale original B" include less white. Therefore, when a γ correction table that further darkens an image is used, a darker or lower-brightness portion than a white portion of the image is further enhanced in sharpness.

In such a case, based on the image corrected by use of γ correction table that further darkens an image, the layer generation unit 1600 may generate, e.g., a third image layer $Ly_3$ that includes an increased portion other than a solid background. As a consequence, the third image layer compression processing unit 1603 may output an increased data size of compressed third image layer $Ly_3$. Similarly, based on the image corrected by use of the γ correction table that further darkens an image, the layer generation unit 1600 may generate, e.g., a first image layer $Ly_1$ that includes an increased compression target portion. As a consequence, the first image layer compression processing unit 1601 may output the compressed first image layer $Ly_{1A}$ increased in data size.

To prevent such a situation, according to the third embodiment, input images $Im_O$ of the sub-original types "pale original A" and "pale original B" are corrected by use of the γ correction table 1920a illustrated in FIG. 34A.

An image of the sub-original type "pale original C" includes a greater white area than a white area of the images of the sub-original type "pale original A" and "pale original B". Therefore, when the γ correction table that further darkens an image is used, the data size of each image layer generated by the layer generation unit 1600 is not increased after compression, compared to the images of the sub-original type "pale original A" and "pale original B". Accordingly, an input image $Im_O$ of the sub-original type "pale original C" is corrected by use of the γ correction table 1920b illustrated in FIG. 34B, for example.

Alternatively, for the sub-original types "pale original A", "pale original B", and "pale original C", a γ correction table may be calculated according to the number of pixels in a white area of the images to reduce the data size of compressed images.

An image of the sub-original type "pale original D" includes a white background, facilitating separation of line drawing portions (i.e., text portions) therefrom. Therefore, when the image is corrected by use of the γ correction table that further darkens an image, each image layer generated by the layer generation unit 1600 does not become so large in data size after compression. Accordingly, an input image $Im_O$ of the sub-original type "pale original D" is corrected by use of the γ correction table 1920c illustrated in FIG. 34C, for example.

Similarly to the image of the sub-original type "pale original D", an image of the sub-original type "pale original E" includes a white background. Since the image of the sub-original type "pale original E" includes a line drawing (i.e., text) of a single color, the line drawing portion (i.e., text portion) is more easily separated from the white background, compared to the sub-original type "pale original D". Therefore, when the image is corrected by use of a γ correction table that further darkens the image than the image of the sub-original type "pale original D", each image layer generated by the layer generation unit 1600 does not become so large in data size after compression. Accordingly, an input image $Im_O$ of the sub-original type "pale original E" is corrected by use of a γ correction table that further darkens an image than the γ correction table 1920c illustrated in FIG. 34C, for example.

An entire image of the sub-original type "pale original F" is a white background. That is, the background (i.e., entire image) can be whitened. The image of the sub-original type "pale original F" may be corrected by use of the γ correction table 1920d illustrated in FIG. 34D having reduced gradation with roughened classification. Using the γ correction table 1920d reduces the compressed data size of each image layer generated by the layer generation unit 1600.

Thus, according to the third embodiment, the original type determination unit 18 determines an original type (or image type information) based on the decompressed input image $Im_{OA}$. In the compression processing unit 16c, the input image correction unit 1610a corrects and outputs the decompressed input image $Im_{OA}$ as the correct decompressed input image $Im_{OB}$ to the γ correction unit 1800. The γ correction unit 1800 further corrects the correct decompressed input image $Im_{OB}$ by use of a γ correction table selected according to the original type determined. Based on the image (i.e., correct decompressed input image $Im_{OB}$ corrected by the γ correction unit 1800 by use of the γ correction table), the layer generation unit 1600 generates the first image layer $Ly_1$, the second image layer $Ly_2$, and the third image layer $Ly_3$.

In short, the present embodiment facilitates generation of the first image layer $Ly_1$, the second image layer $Ly_2$, and the third image layer $Ly_3$ in the layer generation unit 1600. In addition, the present embodiment reduces the size of the first image layer $Ly_1$, the second image layer $Ly_2$, and the third image layer $Ly_3$ compressed by the first image layer compression processing unit 1601, the second image layer compression processing unit 1602, and the third image layer compression processing unit 1603, respectively. In other words, the present embodiment reduces the size of the compressed first image layer $Ly_{1A}$, the compressed second image layer $Ly_{2A}$, and the compressed third image layer $Ly_{3A}$.

<Modification of Third Embodiment>

Now, a description is given of a modification of the third embodiment of the present disclosure.

In the third embodiment described above, the γ correction unit 1800 corrects the correct decompressed input image $Im_{OB}$ with a selected γ correction table based on the original type information output from the original type determination unit 18. In the modification of the third embodiment, the original type information is also used for control of the calculation unit 14 and the determination unit 15.

Figure 35:
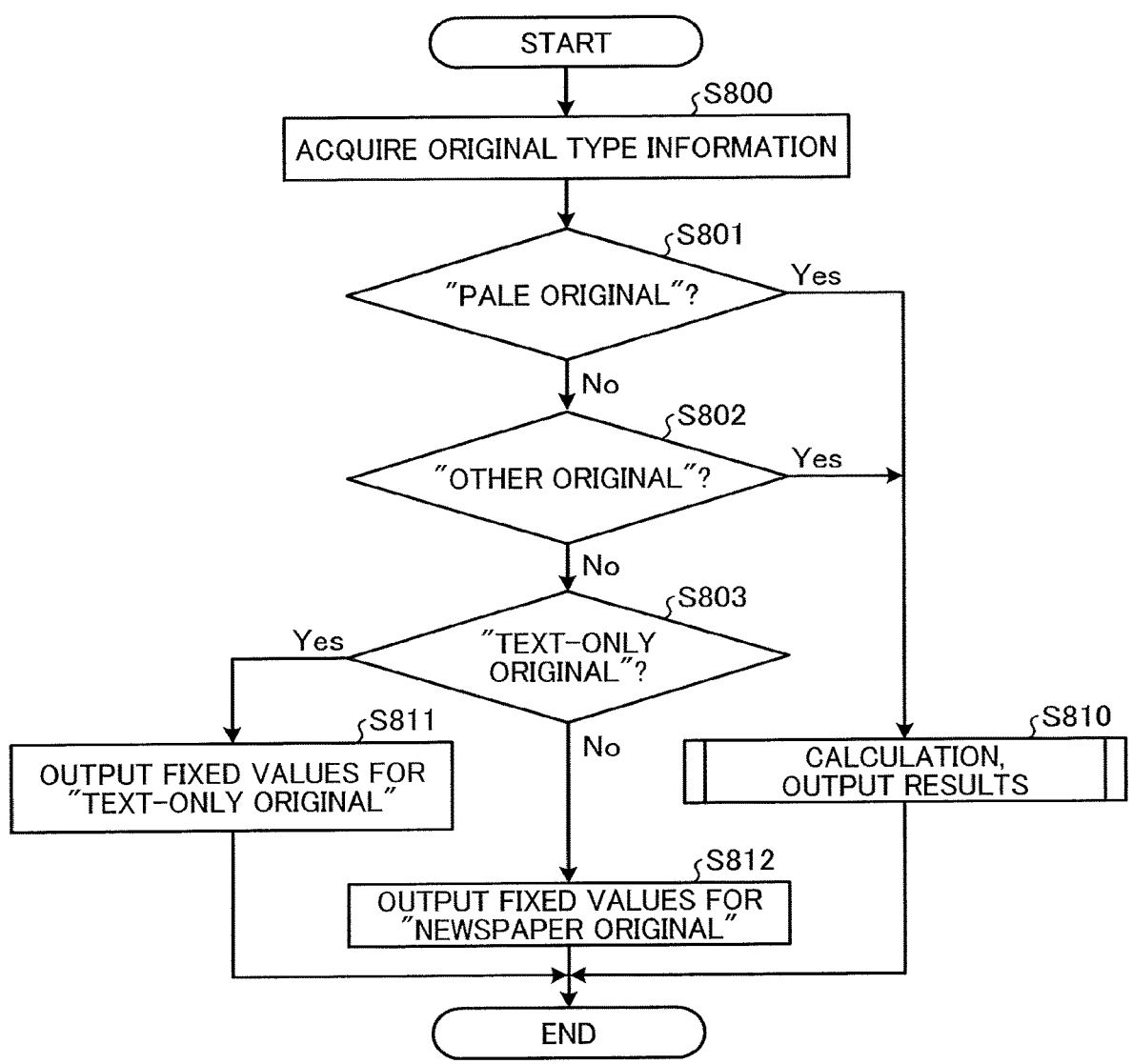
FIG. 35 is a flowchart illustrating a process performed by the calculation unit according to a modification of the third embodiment of the present disclosure.

Referring now to FIG. 35, a description is given of a flow of a process performed by the calculation unit 14 according to the modification of the third embodiment of the present disclosure.

FIG. 35 is a flowchart illustrating the process performed by the calculation unit 14 according to the modification of the third embodiment of the present disclosure.

In step S800, the calculation unit 14 acquires original type information from the original type determination unit 18 of the detection unit 10b.

In step S801, the calculation unit 14 determines whether the original type information thus acquired indicates the original type "pale original". When the calculation unit 14 determines that the original type information indicates the original type "pale original" (YES in step S801), the calculation unit 14 proceeds to step S810.

In step S810, the calculation unit 14 executes the sequence of calculation processes described above with reference to the flowchart of FIG. 6 to output calculation results. With output of the calculation results, the calculation unit 14 completes a sequence of processes according to the flowchart of FIG. 35.

On the other hand, when the calculation unit 14 determines that the original type information acquired does not indicate the original type "pale original" (NO in step S801), the calculation unit 14 proceeds to step S802.

In step S802, the calculation unit 14 determines whether the original type information acquired in step S800 indicates the original type "other original". When the calculation unit 14 determines that the original type information indicates the original type "other original" (YES in step S802), the calculation unit 14 proceeds to step S810.

In step S810, the calculation unit 14 executes the sequence of calculation processes described above with reference to the flowchart of FIG. 6 to output calculation results. With output of the calculation results, the calculation unit 14 completes a sequence of processes according to the flowchart of FIG. 35.

On the other hand, when the calculation unit 14 determines that the original type information acquired does not indicate the original type "other original" (NO in step S802), the calculation unit 14 proceeds to step S803.

In step S803, the calculation unit 14 determines whether the original type information acquired in step S800 indicates the original type "text-only original". When the calculation unit 14 determines that the original type information indicates the original type "text-only original" (YES in step S803), the calculation unit 14 proceeds to step S811.

In step S811, the calculation unit 14 outputs, as calculation results, fixed values predetermined for the original type "text-only original" and corresponding to values calculated in the flowchart of FIG. 6. That is, a text image (i.e., line drawing image) included in an input image hnmo determined as the original type "text-only original" herein has predetermined values of, e.g., color, size, and line width. The calculation unit 14 stores these values in advance. In step S811, the calculation unit 14 outputs the stored values.

On the other hand, when the calculation unit 14 determines that the original type information acquired does not indicate the original type "text-only original" (NO in step S803), the calculation unit 14 proceeds to step S812. In such a case, the original type information acquired is obviously the original type "newspaper original".

In step S812, the calculation unit 14 outputs, as calculation results, fixed values predetermined for the original type "newspaper original" and corresponding to values calculated in the flowchart of FIG. 6. That is, a text image (i.e., line drawing image) included in an input image $Im_0$ determined as the original type "newspaper original" herein has predetermined values of, e.g., color, size, and line width. The calculation unit 14 stores these values in advance. In step S812, the calculation unit 14 outputs the stored values.

With completion of the process in step S810, S811, or S812, the calculation unit 14 completes a sequence of processes according to the flowchart of FIG. 35.

Figure 36:
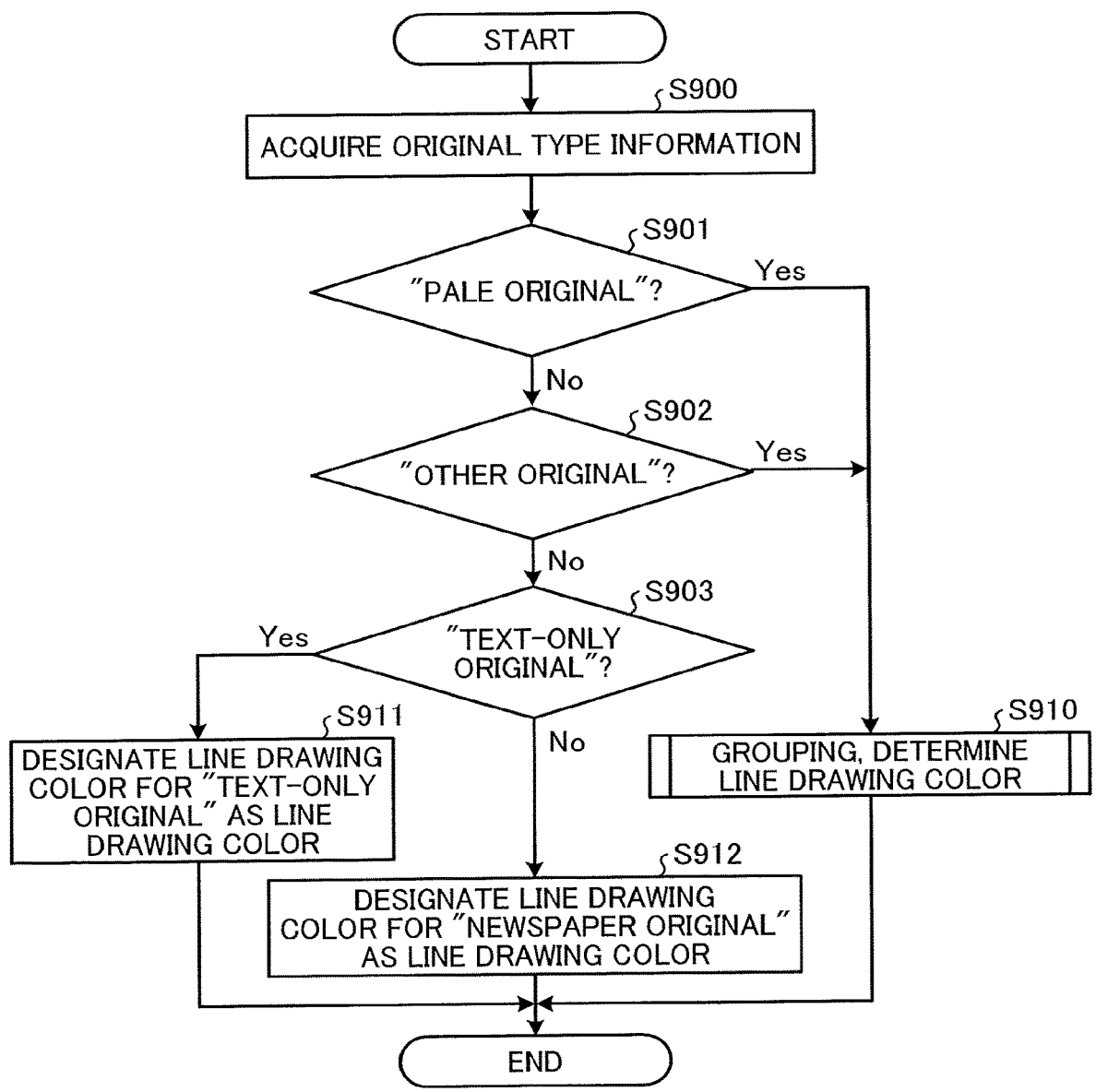
FIG. 36 is a flowchart illustrating a process performed by the determination unit according to the modification of the third embodiment of the present disclosure.

Referring now to FIG. 36, a description is given of a flow of a process performed by the determination unit 15 according to the modification of the third embodiment of the present disclosure.

FIG. 36 is a flowchart illustrating the process performed by the determination unit 15 according to the modification of the third embodiment of the present disclosure.

In step S900, the determination unit 15 acquires original type information from the original type determination unit 18 of the detection unit 10b.

In step S901, the determination unit 15 determines whether the original type information thus acquired indicates the original type "pale original". When the determination unit 15 determines that the original type information indicates the original type "pale original" (YES in step S901), the determination unit 15 proceeds to step S910.

In step S910, the determination unit 15 executes the sequence of processes described above with reference to the flowchart of FIG. 7 to determine a line drawing color. With determination of the line drawing color, the determination unit 15 completes a sequence of processes according to the flowchart of FIG. 36.

On the other hand, when the determination unit 15 determines that the original type information acquired does not indicate the original type "pale original" (NO in step S901), the determination unit 15 proceeds to step S902.

In step S902, the determination unit 15 determines whether the original type information acquired in step S900 indicates the original type "other original". When the determination unit 15 determines that the original type information indicates the original type "other original" (YES in step S902), the determination unit 15 proceeds to step S910.

In step S910, the determination unit 15 executes the sequence of processes described above with reference to the flowchart of FIG. 7 to determine a line drawing color. With determination of the line drawing color, the determination unit 15 completes a sequence of processes according to the flowchart of FIG. 36.

On the other hand, when the determination unit 15 determines that the original type information acquired does not indicate the original type "other original" (NO in step S902), the determination unit 15 proceeds to step S903.

In step S903, the determination unit 15 determines whether the original type information acquired in step S900 indicates the original type "text-only original". When the determination unit 15 determines that the original type information indicates the original type "text-only original" (YES in step S903), the determination unit 15 proceeds to step S911.

In step S911, the determination unit 15 designates a line drawing color prepared in advance for the original type "text-only original" as the line drawing color. That is, an input image $Im_0$ determined as the original type "text-only original" herein includes a predetermined color of a text image (i.e., line drawing image). The determination unit 15 stores information indicating the color in advance. In step S911, the determination unit 15 designates the stored color as the line drawing color for the original type "text-only original".

On the other hand, when the determination unit 15 determines that the original type information acquired does not indicate the original type "text-only original" (NO in step S903), the determination unit 15 proceeds to step S912. In such a case, the original type information acquired is obviously the original type "newspaper original".

In step S912, the determination unit 15 designates a line drawing color prepared in advance for the original type "newspaper original" as the line drawing color. That is, an input image $Im_0$ determined as the original type "newspaper original" herein includes a predetermined color of a text image (i.e., line drawing image). The determination unit 15 stores information indicating the color in advance. In step S912, the determination unit 15 designates the stored color as the line drawing color for the original type "newspaper original".

With completion of the process in step S910, S911, or S912, the determination unit 15 completes a sequence of processes according to the flowchart of FIG. 36.

Thus, in the modification of the third embodiment, omitting a part of the processes according to the original type speeds up the processing.

<Fourth Embodiment>

Now, a description is given of a fourth embodiment of the present disclosure.

In the first embodiment described above, a line drawing image $Im_2$ is extracted from an input image $Im_0$. The input image $Im_0$ is irreversibly compressed while the line drawing image $Im_2$ is reversibly compressed. The input image $Im_0$ irreversibly compressed and the line drawing image $Im_2$ reversibly compressed are then decompressed, via the memory 22, as a decompressed input image $Im_{O4}$ and a decompressed line drawing image $Im_{2A}$, respectively. The decompressed input image $Im_{OA}$ is corrected with the decompressed line drawing image $Im_{2A}$.

By contrast, in the fourth embodiment, the line drawing image $Im_2$ is not extracted from the input image $Im_0$ before compression. That is, the input image $Im_0$ is irreversibly compressed and then decompressed, via the memory 22, as the decompressed input image $Im_{OA}$. The decompressed input image $Im_{OA}$ is corrected without the decompressed line drawing image $Im_{2A}$.

Figure 37:
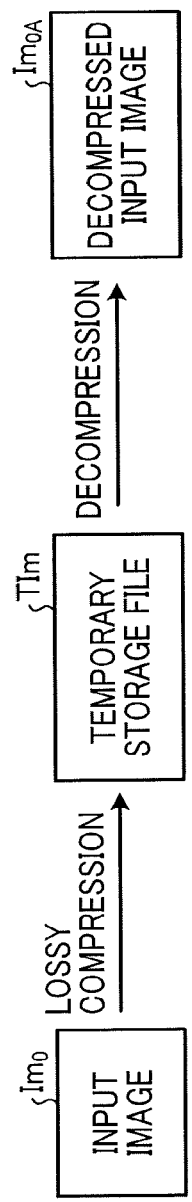
FIG. 37 is a schematic diagram of a procedure of creating a highly compressed PDF file according to a fourth embodiment of the present disclosure, particularly illustrating compression and decompression of an input image.
Figure 38:
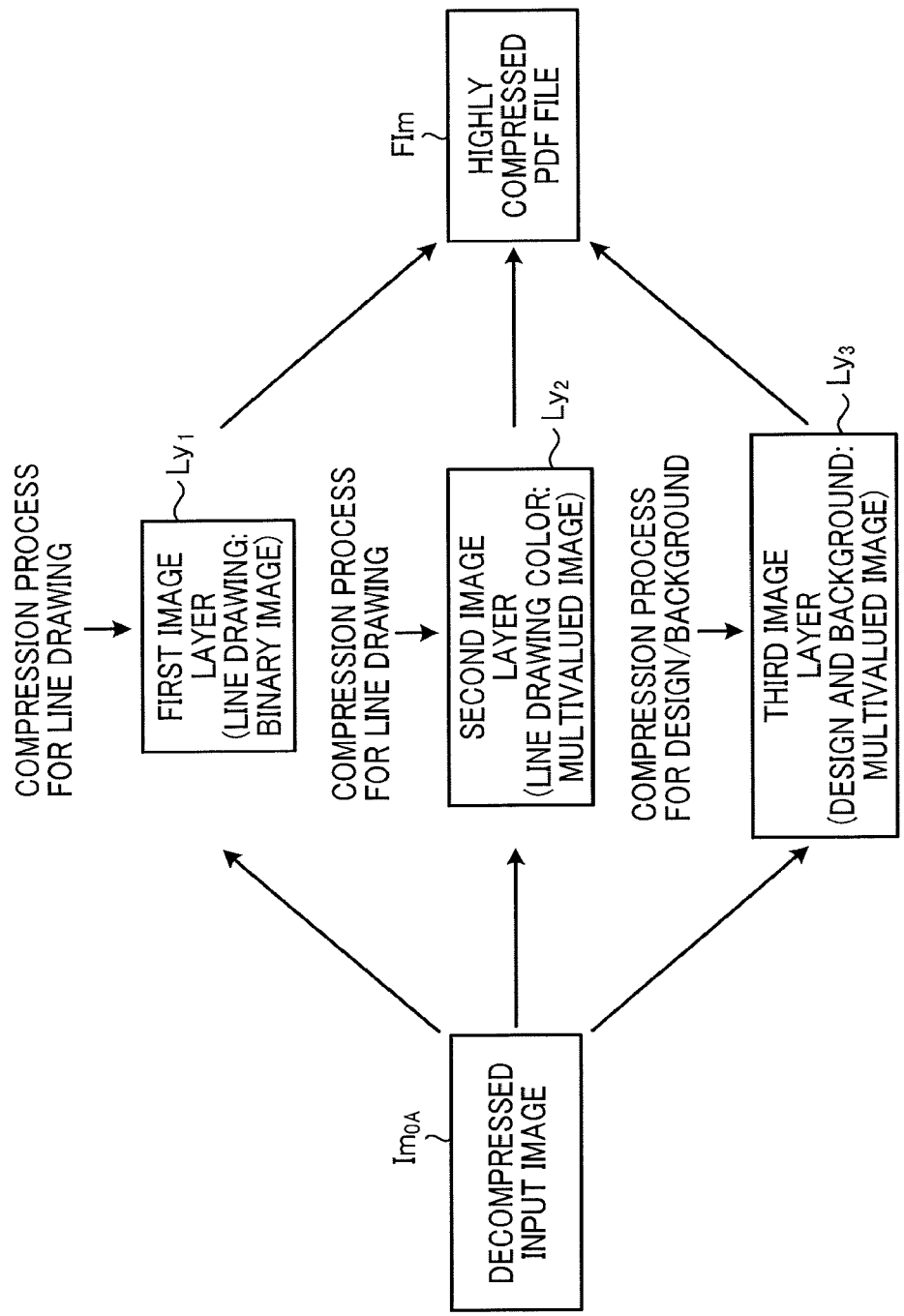
FIG. 38 is a schematic diagram of a procedure of creating a highly compressed PDF file according to the fourth embodiment of the present disclosure, particularly illustrating creation of the highly compressed PDF file from a decompressed input image.

Referring now to FIGS. 37 and 38, a description is given of a procedure of creating a highly compressed PDF file FIm according to the fourth embodiment of the present disclosure.

FIG. 37 is a schematic diagram of the procedure of creating a highly compressed PDF file FIm according to the fourth embodiment of the present disclosure, particularly illustrating compression and decompression of an input image $Im_0$. FIG. 38 is a schematic diagram of the procedure of creating a highly compressed PDF file FIm according to the fourth embodiment of the present disclosure, particularly illustrating creation of the highly compressed PDF file FIm from a decompressed input image $Im_{OA}$.

In FIG. 37, the input image $Im_0$ is irreversibly compressed and stored in the temporary storage file TIm.

The input image $Im_0$ compressed and stored in the temporary storage file TIm is then decompressed as the decompressed input image $Im_{OA}$. Since the input image $Im_0$ is irreversibly compressed, the decompressed input image $Im_{OA}$ includes changes (e.g., mosquito noise) caused by the irreversible compression and decompression of the original input image $Im_0$.

In the fourth embodiment, as exemplified in FIG. 38, a first image layer $Ly_1$, a second image layer $Ly_2$, and a third image layer $Ly_3$ are generated based on the decompressed input image $Im_{OA}$. At this time, an area corresponding to a line drawing image $Im_1$ included in the input image $Im_0$ is specified as a line drawing image area in the decompressed input image $Im_{OA}$ based on the decompressed input image $Im_{OA}$, to correct the surround of the line drawing image area.

For example, when the input image $Im_0$ is an original image read by a scanner having poor MTF characteristics, it might be hard for the detection unit 10a described above with reference to FIG. 11 to accurately extract a line drawing image from the input image $Im_0$ at high speed. To address such a situation, the line drawing image may be detected from a wide range of the input image $Im_0$ with the configuration illustrated as the detection unit 10, the calculation unit 14, and the determination unit 15 in FIG. 11, for example. However, when this configuration is adopted, the detection process might take time.

To shorten the time taken for the detection process, according to the fourth embodiment, a line drawing image is detected based on the decompressed input image $Im_{OA}$, which is an outcome of the input image $Im_0$ irreversible compression and decompression of the input image $Im_0$. When the input image $Im_0$ irreversibly compressed is stored in the temporary storage file TIm, the next process proceeds. The input image $Im_0$ irreversibly compressed and stored in the temporary storage file TIm is then decompressed as the decompressed input image $Im_{OA}$. The subsequent processes are substantially the same as the processes described above in the first embodiment.

Different from the first embodiment, in the fourth embodiment, extraction of the line drawing image is after storing, in the temporary storage file Tim, the input image $Im_0$ irreversibly compressed. Accordingly, the first image layer $Ly_1$, the second image layer $Ly_2$, and the third image layer $Ly_3$ are generated from the decompressed input image $Im_{OA}$.

Figure 39:
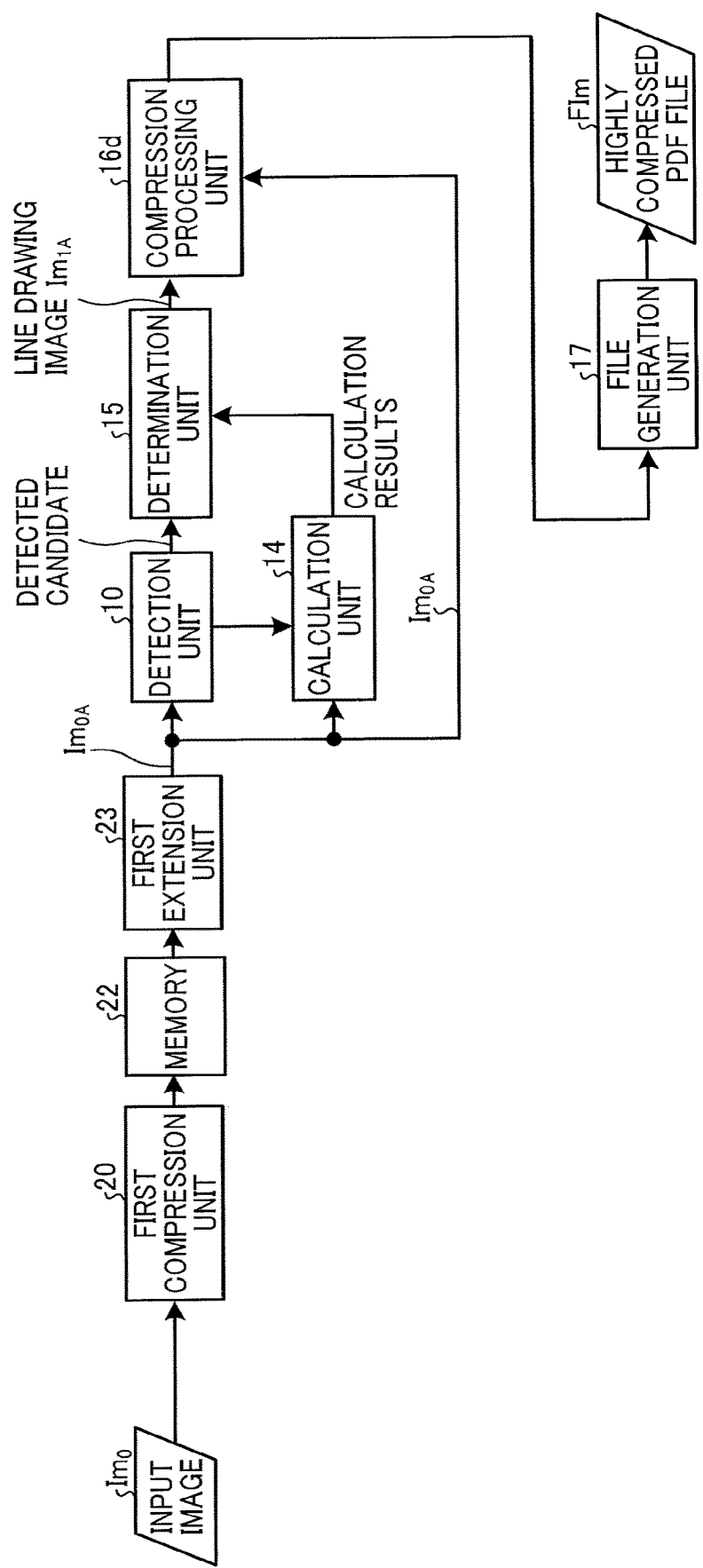
FIG. 39 is a functional block diagram illustrating a functional configuration of an image processing apparatus according to the fourth embodiment of the present disclosure.

Referring now to FIG. 39, a description is given of a functional configuration of the image forming apparatus 100 as an image processing apparatus according to the fourth embodiment of the present disclosure.

FIG. 39 is a functional block diagram illustrating the functional configuration of the image forming apparatus 100 according to the fourth embodiment of the present disclosure.

Note that, in FIGS. 11 and 39, for the sake of simplicity, like reference numerals are given to identical or corresponding constituent elements having substantially the same functions. Redundant descriptions thereof are herein omitted unless otherwise required.

The image forming apparatus 100 of FIG. 39 excludes the detection unit 10a, the second compression unit 21, and the second decompression unit 24 described above with reference to FIG. 11. On the other hand, the image forming apparatus 100 of FIG. 39 includes a compression processing unit 16d, which receives a line drawing image $Im_{1A}$ and the decompressed input image $Im_{OA}$ that is output from the first decompression unit 23. The compression processing unit 16d has a function in addition to the function of the compression processing unit 16a illustrated in FIG. 11. A detailed description of the additional function is deferred.

An input image $Im_0$ is input into the first compression unit 20. The input image $Im_0$ is herein an original image read by the scanner 1131. The first compression unit 20 irreversibly compresses the input image $Im_0$ by, e.g., JPEG method. Note that the compression method applicable to the first compression unit 20 is not limited to the JPEG method.

The input image $Im_0$ compressed by the first compression unit 20 (herein serving as an irreversibly compressed image or a first compressed image) is input into the memory 22. The memory 22 receives and stores, in the temporary storage file Tim, the input image $Im_0$ (i.e., first compressed image). The memory 22 then stores the temporary storage file TIm in a recording medium (e.g., storage 1120).

The temporary storage file TIm is read from the memory 22, allowing the input image $Im_0$ (i.e., first compressed image) to be input into the first decompression unit 23 from the temporary storage file TIm. The first decompression unit 23 receives and decompresses the input image $Im_0$ (i.e., first compressed image) by a decompression method corresponding to the first compression method. The first decompression unit 23 then outputs, as a decompressed input image $Im_{OA}$, the input image $Im_0$ thus decompressed. As described above, the decompressed input image $Im_{OA}$ includes changes caused by the irreversible compression and decompression of the original input image $Im_0$.

The decompressed input image $Im_{OA}$ is input into the detection unit 10, the calculation unit 14, and the compression processing unit 16d from the first decompression unit 23. The detection unit 10, the calculation unit 14, the determination unit 15 process the decompressed input image $Im_{OA}$ according to the flowcharts of FIGS. 5, 6, and 7, respectively, to extract a line drawing image $Im_{1A}$ corresponding to a line drawing image included in the input image $Im_0$. The line drawing image $Im_{1A}$ is input into the compression processing unit 16d.

Figure 40:
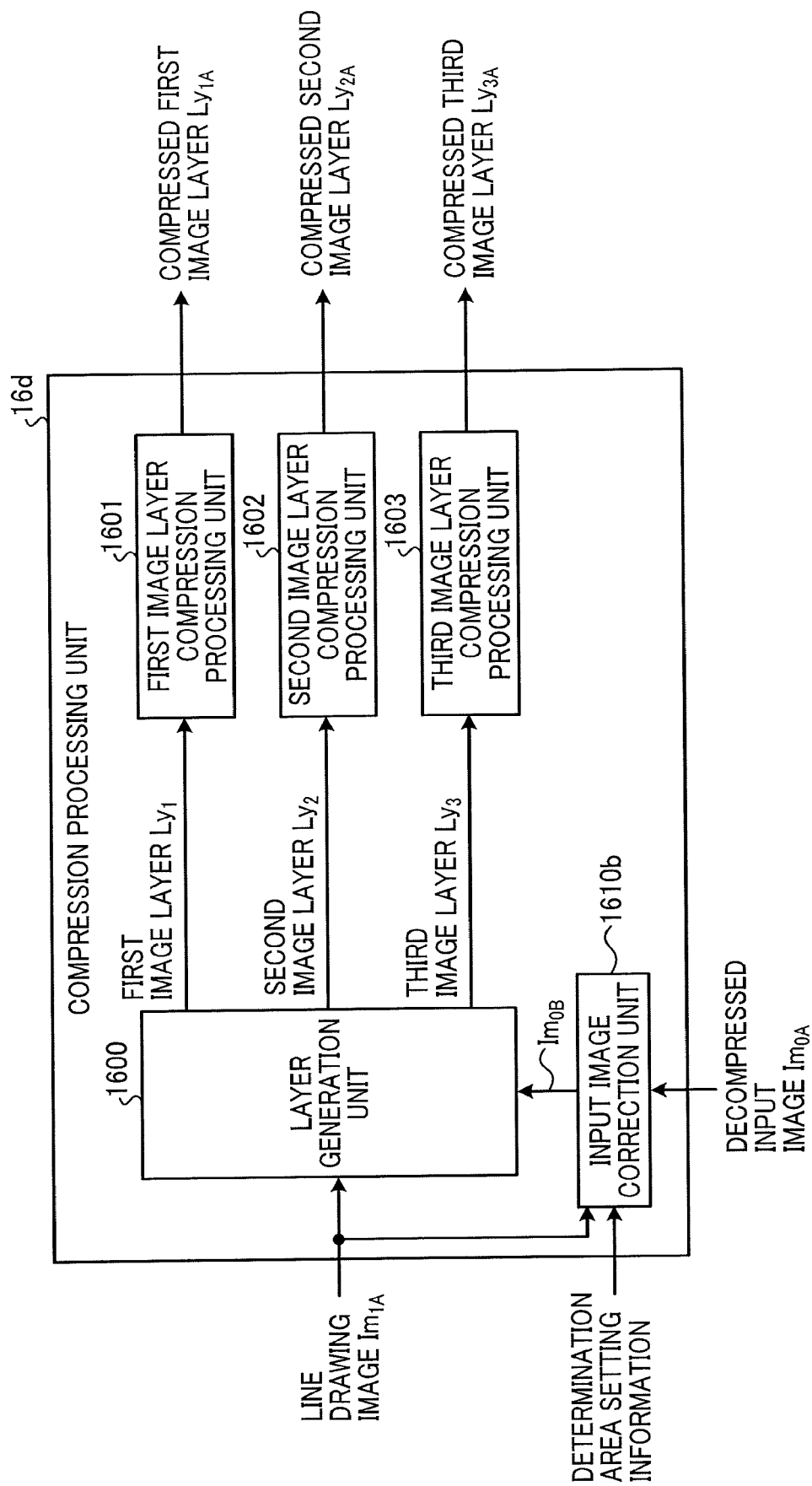
FIG. 40 is a functional block diagram illustrating a function of a compression processing unit according to the fourth embodiment of the present disclosure.

Referring now to FIG. 40, a description is given of a function of the compression processing unit 16d according to the fourth embodiment of the present disclosure.

FIG. 40 is a functional block diagram illustrating the function of the compression processing unit 16d according to the fourth embodiment of the present disclosure.

Note that, in FIGS. 12 and 40, for the sake of simplicity, like reference numerals are given to identical or corresponding constituent elements having substantially the same functions. Redundant descriptions thereof are herein omitted unless otherwise required.

The compression processing unit 16d illustrated in FIG. 40 includes an input image correction unit 1610b corresponding to the input image correction unit 1610a of FIG. 12.

The input image correction unit 1610b receives the line drawing image $Im_{1A}$ and the decompressed input image $Im_{OA}$. In addition, the input image correction unit 1610b receives determination area setting information. The determination area setting information is information for setting the solid background determination area 1635 described above with reference to FIG. 14. A description of the determination area setting information is deferred.

The input image correction unit 1610b uses the line drawing image $Im_{1A}$ instead of the decompressed line drawing image $Im_{2A}$ illustrated in FIG. 12 to specify the line drawing image area in the decompressed input image $Im_{OA}$ serving as a decompressed image. As described above, the line drawing image area corresponds to a line drawing image included in the input image $Im_O$. Thus, the input image correction unit 1610b serves as a second detection unit that detects, in a decompressed image, a line drawing image area corresponding to a line drawing image included in the original image. The input image correction unit 1610b solidifies the surround of the line drawing image area thus specified, according to the solid background determination area 1635 set based on the determination area setting information. Thus, the input image correction unit 1610b corrects and outputs the decompressed input image $Im_{OA}$ as a correct decompressed input image $Im_{OB}$. The input image correction unit 1610b performs substantially the same correction process as the process described above with reference to FIGS. 13 to 22F in the first embodiment.

In the compression processing unit 16d, the layer generation unit 1600 generates a first image layer $Ly_1$, a second image layer $Ly_2$, and a third image layer $Ly_3$ based on the correct decompressed input image $Im_{OB}$ received from the input image correction unit 1610b. The first image layer compression processing unit 1601, the second image layer compression processing unit 1602, and the third image layer compression processing unit 1603 compress and output the first image layer $Ly_1$, the second image layer $Ly_2$, and the third image layer $Ly_3$ as a compressed first image layer $Ly_{1A}$, a compressed second image layer $Ly_{2A}$, and a compressed third image layer $Ly_{3A}$, respectively.

Referring now to FIGS. 41A to 43B, a description is given of setting the solid background determination area 1635 based on the determination area setting information according to the fourth embodiment of the present disclosure.

Figure 41A:
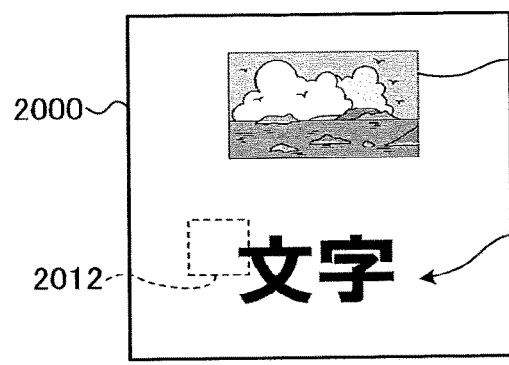
FIG. 41A is a plan view of an original image before being read.

FIG. 41A is a plan view of an original image 2000 as a reading target for, e.g., the scanner 1131. In other words, FIG. 41A illustrates an image before being read by the scanner 1131. The original image 2000 exemplified in FIG. 41A includes a black text image (i.e., line drawing image) 2010 and a design 2011 as a multivalued image on a white background.

Figure 41B:
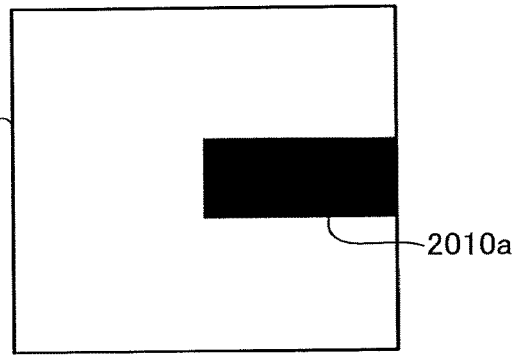
FIG. 41B is an enlarged view of an area surrounded by a broken line in FIG. 41A.

FIG. 41B is an enlarged view of an area 2012 surrounded by a broken line in FIG. 41A. As illustrated in FIG. 41B, the area 2012 includes a portion 2010a of the text image 2010. The portion 2010a has little dullness in the edge portion. In other words, the text image 2010 has a clear edge portion in the original image 2000.

Figure 42A:
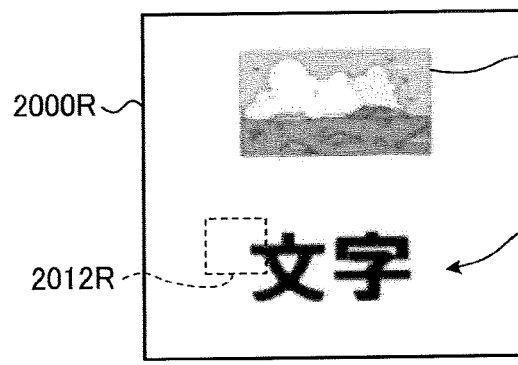
FIG. 42A is a plan view of an original image after being read.

FIG. 42A is a plan view of a read image 2000R equivalent to the original image 2000 of FIG. 41A read by, e.g., the scanner 1131. In other words, FIG. 42A illustrates an image after being read by the scanner 1131. The read image 2000R exemplified in FIG. 42A includes a text image 2010R and a design 2011R, each being dulled in, e.g., an edge portion, compared to the text image 2010 and the design 2011 of FIG. 41A.

Figure 42B:
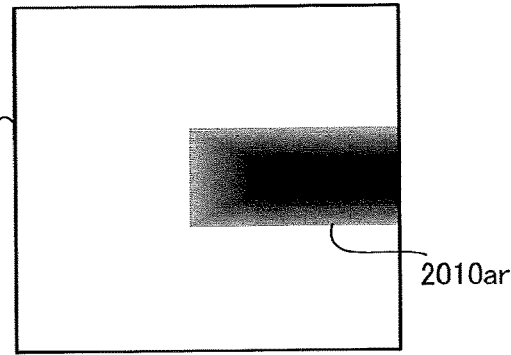
FIG. 42B is an enlarged view of an area surrounded by a broken line in FIG. 42A.

FIG. 42B is an enlarged view of an area 2012R surrounded by a broken line in FIG. 42A. In other words, FIG. 42B illustrates an image corresponding to the image of FIG. 41B after being read by the scanner 1131. As illustrated in FIG. 42B, the area 2012R includes a portion 2010ar of the text image 2010R. Compared to the portion 2010a illustrated in FIG. 41B, the portion 2010ar is dulled in the edge portion, expanding a text area into a background area.

Figure 43A:
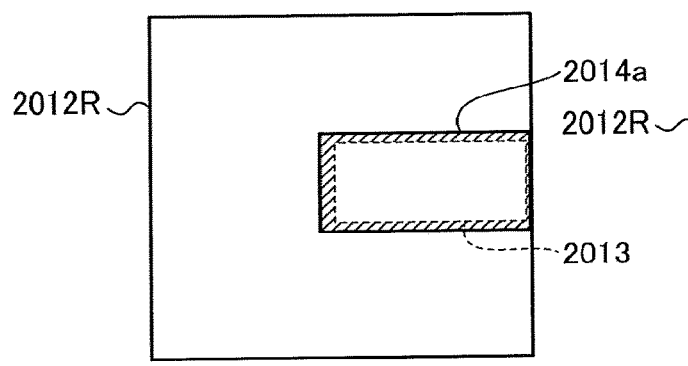
FIG. 43A is a schematic view of the area of FIG. 42B, with an expanded area.
Figure 43B:
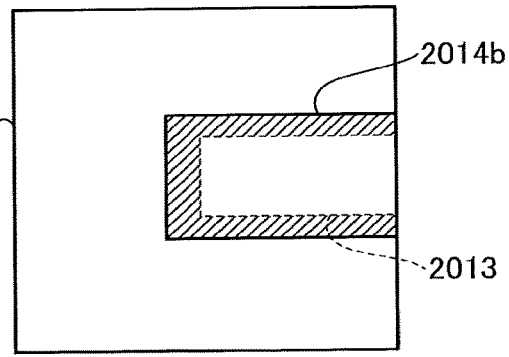
FIG. 43B is a schematic view of the area of FIG. 42B, with a greater expanded area.

FIGS. 43A and 43B schematically illustrate the expansion of the text area due to dullness.

FIG. 43A is a schematic view of the area 2012R of FIG. 42B, with an expanded area 2014a. FIG. 43B is a schematic view of the area 2012R of FIG. 42B, with an expanded area 2014b.

In the area 2012R, the dullness expands a text area 2013 into the background area by an expanded area 2014a (i.e., hatched area). Note that the text area 2013 corresponds to the portion 2010a of FIG. 41B. That is, the text area 2013 is a portion of the text image 2010 of the original image 2000. The expansion of the text area 2013 due to dullness is caused by, e.g., the MTF characteristics of the scanner 1131 that reads the original image 2000.

The MTF characteristics may be deteriorated when, for example, a γ correction is performed on an image captured with a reduced light amount of a light source for cost reduction or because of a glossy subject such as a noble or precious metal. In an image having poor MTF characteristics (i.e., image read by a scanner having poor MTF characteristics), the dullness expands the text area 2013 by a wider or greater area (e.g., an expanded area 2014b as hatched in FIG. 43B) than the expanded area 2014a of FIG. 43A, increasing an expanded amount of the text area into the background area.

As described above, the input image $Im_O$ is irreversibly compressed by the first compression unit 20 and decompressed, via the memory 22, as the decompressed input image $Im_{OA}$. When the input image $Im_O$ is the read image 2000R including the text image 2010R, which corresponds to the original text image 2010 dulled due to, e.g., poor MTF characteristics, the decompressed input image $Im_{OA}$ might include a wider expanded area due to dullness through the compression and decompression process.

To suppress such expansion, according to the fourth embodiment, the input image correction unit 1610b uses the determination region setting information to set, e.g., the position and size of the solid background determination area 1635 (illustrated in FIG. 14) and determination conditions in the solid background determination area 1635. For example, when poor MTF characteristics are assumed, the offset 1633 between the solid background determination area 1635 and the line rectangle 1631 is enlarged by one pixel to several pixels compared to a normal case in which such poor MTF characteristics are not assumed. Alternatively, thresholds or conditions for determination in the solid background determination area 1635 may be loosened compared to the normal case. For example, when poor MTF characteristics are assumed, the thresholds for the RGB values for determination in the solid background determination area 1635 may be increased by about 10 tones.

The determination area setting information is input according to a user instruction through the OP 102 in the configuration illustrated in FIG. 1, for example. Alternatively, the determination area setting information may be stored in the ROM 1101 or the storage 1120 in advance, so that the input image correction unit 1610b reads the determination area setting information from the ROM 1101 or the storage 1120. Alternatively, the determination area setting information may be stored, in advance, in a register included in the input image correction unit 1610b.

In the fourth embodiment, e.g., the position and size of the solid background determination area 1635 and the determination conditions is settable. Even when an input image $Im_O$ having poor MTF characteristics is irreversibly compressed and decompressed as a decompressed input image $Im_{OA}$, setting the determination conditions according to the MTF characteristics of the input image $Im_O$ enables appropriate solidification of the surround of the line drawing image area (i.e., area corresponding to the line drawing image included in the input image $Im_O$) in the decompressed input image $Im_{OA}$.

In short, according to the present embodiment, an image of a highly compressed PDF file FIm is generated at high quality even when the original input image $Im_O$ has poor MTF characteristics. In addition, since a solid image is efficiently compressed by, e.g., the JPEG method, a reduced size of highly compressed PDF file FIm is created.

Note that the correction process performed by the input image correction unit 1610b according to the fourth embodiment is applicable to the correction process according to the first embodiment. That is, also in the first embodiment, the amount of the offset 1633 between the solid background determination area 1635 and the line rectangle 1631 is determinable based on the MTF characteristics.

In a case in which the input image $Im_O$ is an original image read by the scanner 1131, the line drawing image included in the input image $Im_O$ may expand into the background area according to the MTF characteristics of the scanner 1131. That is, compared to the line drawing image on the original image, the line drawing image $Im_2$ detected from the input image $Im_O$ by the detection unit 10a expands into the background area in the input image $Im_O$.

On the other hand, unlike the mosquito noise 1632, expansion due to the MTF characteristics does not affect pixels apart from the original line drawing image. Therefore, the amount of the offset 1633 may be smaller than that in the case of correction based on the line drawing image $Im_{1A}$ detected from the decompressed input image $Im_{OA}$, which is an outcome of irreversibly compression and decompression of the input image $Im_O$, as described above with reference to FIGS. 37 to 39.

<Other Embodiments>

The second embodiment, the third embodiment, and the fourth embodiment are described above as implementable independently. Alternatively, a combination of two or more of the second embodiment, the third embodiment, and the fourth embodiment may be implemented.

Further, the operation mode of the image processing apparatus according to one or more of the first to fourth embodiments may include a first operation mode that emphasizes a design and a second operation mode that emphasizes text (i.e., line drawing).

In the first operation mode, an area other than an area always determinable as text (i.e., line drawing) may not be determined as text (i.e., line drawing). Even in such a case, the background area is to be corrected to prevent the image quality from being degraded when the first compression unit 20 irreversibly compresses the input image $Im_O$. The first operation mode is implementable in any of the first to fourth embodiments.

The second operation mode reduces the size of a highly compressed PDF file FIm while maintaining the readability of text (or recognition of a line drawing). That is, in the second operation mode, priority is given to enhancement in the readability of text, rather than erroneous separation of a design as text. The second operation mode is preferably implemented in the third embodiment, for example.

Furthermore, the first to fourth embodiments are described above as applicable to the image forming apparatus 100 illustrated in FIG. 1. Alternatively, for example, the first to fourth embodiments may be applied to a general computer that includes, e.g., a CPU, a ROM, a RAM, a storage, and a communication I/F and that is connectable with input and output devices.

According to the embodiments described above, a reduced sized of PDF file is created including a high-quality image.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Any one of the above-described operations may be performed in various other ways, for example, in an order different from that described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by an application-specific integrated circuit (ASIC), prepared by interconnecting an appropriate network of conventional component circuits or by a combination thereof with one or more conventional general-purpose microprocessors and/or signal processors programmed accordingly.

What is claimed is:

1. An image processing apparatus, comprising:
circuitry configured to:
irreversibly compress an input image to generate an irreversibly compressed image;
decompress the irreversibly compressed image to generate a decompressed image;
correct a surrounding of a target area in the decompressed image to generate a corrected image, the target area corresponding to a line drawing image included in the input image;
generate a first image layer, a second image layer and a third image layer from the corrected image, the first image layer being a binary image that contains a line drawing, the second image layer includes a line drawing area, and the third image layer includes a background area;
reversibly compress the first image layer to generate a reversibly compressed first image layer;
irreversibly compress the second image layer to generate an irreversibly compressed second image layer;
irreversibly compress the third image layer to generate an irreversibly compressed third image layer; and
generate an output file based on the reversibly compressed first image layer, the irreversibly compressed second image layer, and the irreversibly compressed third image layer.

2. The image processing apparatus according to claim 1, wherein the circuitry is further configured to:
detect the line drawing image from the input image;
reversibly compress the line drawing image to generate a reversibly compressed image;
decompress the reversibly compressed image to generate a decompressed line drawing image; and
specify the target area based on the decompressed line drawing image.

3. The image processing apparatus according to claim 2, wherein the circuitry is further configured to correct the target area in the decompressed image with the decompressed line drawing image.

4. The image processing apparatus according to claim 2, wherein the circuitry is further configured to:
determine image type information indicating a type of the input image based on the decompressed image; and
correct the surrounding of the target area in the decompressed image with the decompressed line drawing image and the image type information to generate the corrected image.

5. The image processing apparatus according to claim 1, wherein the circuitry is further configured to:
detect a line drawing image area corresponding to the line drawing image from the decompressed image; and
correct, with the decompressed image, a second surrounding of the line drawing image area based on an area set according to characteristics of the input image with respect to the line drawing image area, to generate the corrected image.

6. The image processing apparatus according to claim 1, wherein the circuitry is configured to replace pixels around the target area with single-color pixels.

7. The image processing apparatus according to claim 1, wherein in response to the decompressed image including a given percentage or more of white pixels, the circuitry is configured to replace a pixel in an area other than the line drawing image in the decompressed image with a white pixel.

8. The image processing apparatus according to claim 1, wherein the circuitry is further configured to:
detect an edge of the line drawing; and
enhance the edge of the line drawing to generate an edge-enhanced image.

9. The image processing apparatus according to claim 8, wherein the circuitry is further configured to:
binarize the edge-enhanced image to acquire the binary image; and
extract a low-brightness object from the binary image, the low-brightness object being distinguishable from the background area.

10. An image processing method, comprising:
irreversibly compressing an input image to generate an irreversibly compressed image;
decompressing the irreversibly compressed image to generate a decompressed image;
correcting a surrounding of a target area in the decompressed image to generate a corrected image, the target area corresponding to a line drawing image included in the input image;
generating a first image layer, a second image layer and a third image layer from the corrected image, the first image layer being a binary image that contains a line drawing, the second image layer includes a line drawing area, and the third image layer includes a background area;
reversibly compressing the first image layer to generate a reversibly compressed first image layer;
irreversibly compressing the second image layer to generate an irreversibly compressed second image layer;
irreversibly compressing the third image layer to generate an irreversibly compressed third image layer; and
generating an output file based on the reversibly compressed first image layer, the irreversibly compressed second image layer, and the irreversibly compressed third image layer.

11. The image processing method according to claim 10, further comprising:
detecting the line drawing image from the input image;
reversibly compressing the line drawing image to generate a reversibly compressed image;
decompressing the reversibly compressed image to generate a decompressed line drawing image; and
specifying the target area based on the decompressed line drawing image.

12. The image processing method according to claim 11, further comprising correcting the target area in the decompressed image with the decompressed line drawing image.

13. The image processing method according to claim 11, further comprising:
determining image type information indicating a type of the input image based on the decompressed image; and
correcting the surrounding of the target area in the decompressed image with the decompressed line drawing image and the image type information to generate the corrected image.

14. The image processing method according to claim 10, further comprising:
detecting a line drawing image area corresponding to the line drawing image from the decompressed image; and
correcting, with the decompressed image, a second surrounding of the line drawing image area based on an area set according to characteristics of the input image with respect to the line drawing image area, to generate the corrected image.

15. The image processing method according to claim 10, further comprising replacing pixels around the target area with single-color pixels.

16. The image processing method according to claim 10, further comprising:

replacing, in response to the decompressed image including a given percentage or more of white pixels, a pixel in an area other than the line drawing image in the decompressed image with a white pixel.

17. The image processing method according to claim 10, further comprising:

detecting an edge of the line drawing; and enhancing the edge of the line drawing to generate an edge-enhanced image.

18. The image processing method according to claim 17, further comprising:

binarizing the edge-enhanced image to acquire the binary image; and extracting a low-brightness object from the binary image, the low-brightness object being distinguishable from the background area.

19. A non-transitory, computer-readable storage medium storing computer-readable program code that causes a computer to perform an image processing method, the image processing method comprising:

irreversibly compressing an input image to generate an irreversibly compressed image;

decompressing the irreversibly compressed image to generate a decompressed image;

correcting a surrounding of a target area in the decompressed image to generate a corrected image, the target area corresponding to a line drawing image included in the input image;

generating a first image layer, a second image layer and a third image layer from the corrected image, the first image layer being a binary image that contains a line drawing, the second image layer includes a line drawing area, and the third image layer includes a background area;

reversibly compressing the first image layer to generate a reversibly compressed first image layer;

irreversibly compressing the second image layer to generate an irreversibly compressed second image layer;

irreversibly compressing the third image layer to generate an irreversibly compressed third image layer; and generating an output file based on the reversibly compressed first image layer, the irreversibly compressed second image layer, and the irreversibly compressed third image layer.

* * * * *